US010594485B2

(12) United States Patent
Maezawa et al.

(10) Patent No.: US 10,594,485 B2
(45) Date of Patent: Mar. 17, 2020

(54) SYSTEM, METHOD, PROGRAM, AND RECORDING MEDIUM STORING PROGRAM FOR AUTHENTICATION

(71) Applicant: ISAO Corporation, Tokyo (JP)

(72) Inventors: Toshiki Maezawa, Tokyo (JP);
Takahiro Nishida, Tokyo (JP);
Hiroyuki Kikuchi, Tokyo (JP);
Hiroyuki Torii, Tokyo (JP)

(73) Assignee: ISAO CORPORATION, Tokyo (JP)

( * ) Notice: Subject to any disclaimer, the term of this patent is extended or adjusted under 35 U.S.C. 154(b) by 0 days.

(21) Appl. No.: 16/362,728

(22) Filed: Mar. 25, 2019

(65) Prior Publication Data
US 2019/0222420 A1 Jul. 18, 2019

Related U.S. Application Data

(63) Continuation of application No. PCT/JP2018/040465, filed on Oct. 31, 2018.

(30) Foreign Application Priority Data

Dec. 28, 2017 (JP) ................................. 2017-253951
Jul. 13, 2018 (JP) ................................. 2018-133539

(51) Int. Cl.
*H04W 12/08* (2009.01)
*H04L 9/32* (2006.01)
(Continued)

(52) U.S. Cl.
CPC ............ *H04L 9/3213* (2013.01); *A63F 13/48* (2014.09); *A63F 13/71* (2014.09); *H04L 9/083* (2013.01);
(Continued)

(58) Field of Classification Search
CPC . G06F 9/32; G06F 21/31; G06F 21/35; G06F 21/42; G06F 21/44; H04L 63/08;
(Continued)

(56) References Cited

U.S. PATENT DOCUMENTS 9,065,819 B1 * 6/2015 Shanmugam ....... H04L 63/0815
2014/0108810 A1 * 4/2014 Chenna .................. H04L 9/321
713/179

(Continued)

FOREIGN PATENT DOCUMENTS

| JP | 2015-99470 A | 5/2015 |
|---|---|---|
| JP | 6104439 B1 | 3/2017 |
| JP | 2017-107440 A | 6/2017 |

*Primary Examiner* — Jeffrey Nickerson
*Assistant Examiner* — Kalish K Bell
(74) *Attorney, Agent, or Firm* — HEA Law PLLC

(57) ABSTRACT

An authentication system includes first and second terminals, and an authentication subsystem. The authentication subsystem: generates a first token based on reception of a code image authentication start request, generates and stores a code image key in association with the first token, generates and stores a code image including the code image key at a URL of the storage unit, transmits the first token and the URL to the first terminal, registers the received first token as a key in an information transmitting and receiving unit, checks whether a received ID of the second terminal is a unique ID, when the received unique ID of the second terminal is the unique ID, checks whether the received code image key is stored in the storage unit, and transmits a first response code to the information transmitting and receiving unit using, as a key.

26 Claims, 36 Drawing Sheets

(51) Int. Cl.
  *G06F 21/31*     (2013.01)
  *G06F 21/35*     (2013.01)
  *G06F 21/42*     (2013.01)
  *G06F 21/44*     (2013.01)
  *H04L 9/08*      (2006.01)
  *A63F 13/71*     (2014.01)
  *A63F 13/48*     (2014.01)
  *H04L 12/433*    (2006.01)
  *H04L 12/46*     (2006.01)

(52) U.S. Cl.
  CPC ......... *H04L 9/0894* (2013.01); *H04L 12/433* (2013.01); *H04L 12/4625* (2013.01); *A63F 2300/401* (2013.01)

(58) Field of Classification Search
  CPC ......... H04L 63/10; H04L 63/18; H04L 67/02; H04W 12/08
  See application file for complete search history.

(56) References Cited

U.S. PATENT DOCUMENTS

| | | |
|---|---|---|
| 2014/0173125 A1 | 6/2014 | Selvanandan |
| 2014/0317713 A1* | 10/2014 | Gadotti ............... H04L 63/0853 726/7 |
| 2015/0222435 A1* | 8/2015 | Lea .................... H04L 63/0823 713/155 |
| 2016/0057135 A1 | 2/2016 | Jiang et al. |

* cited by examiner

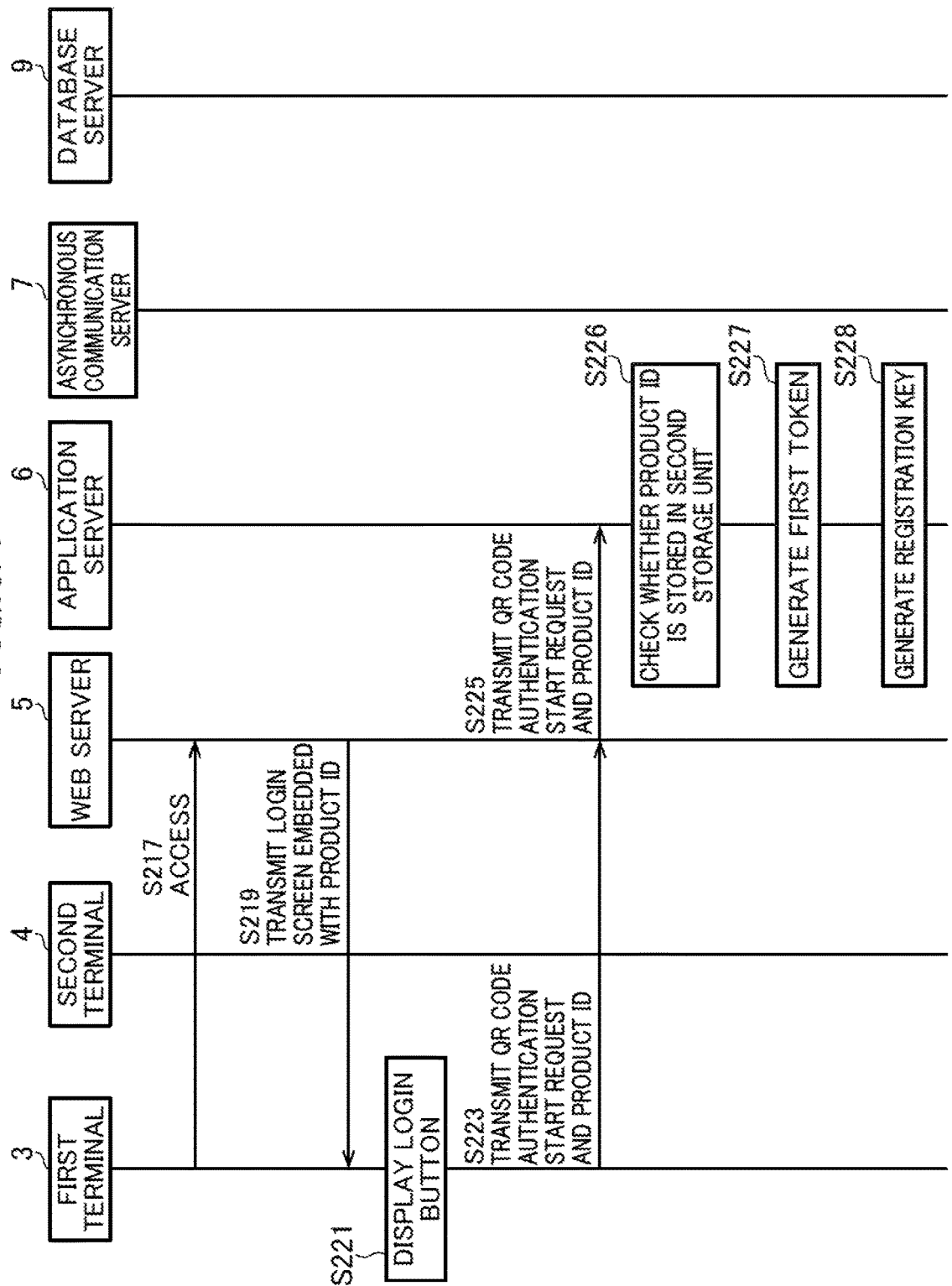

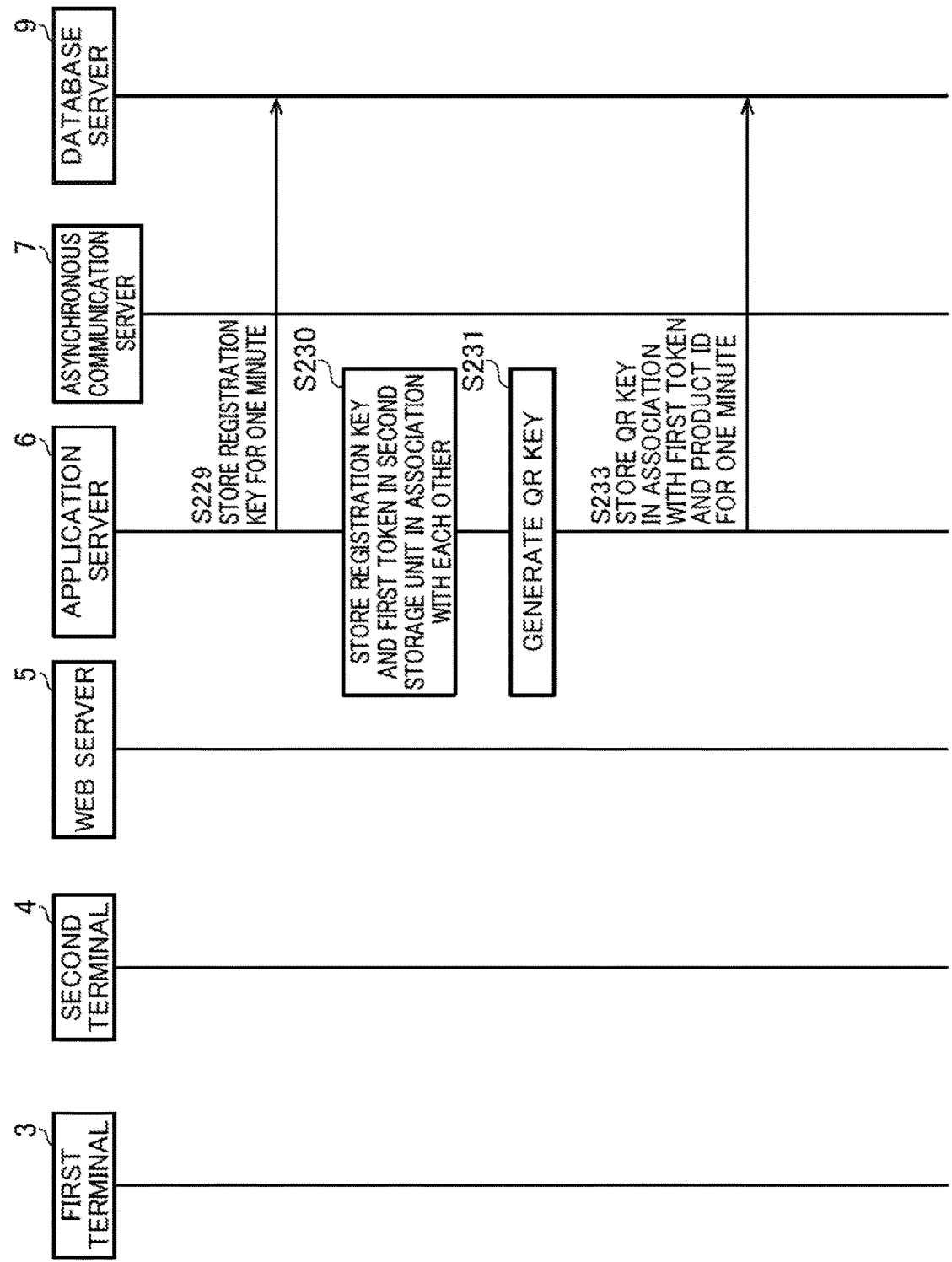

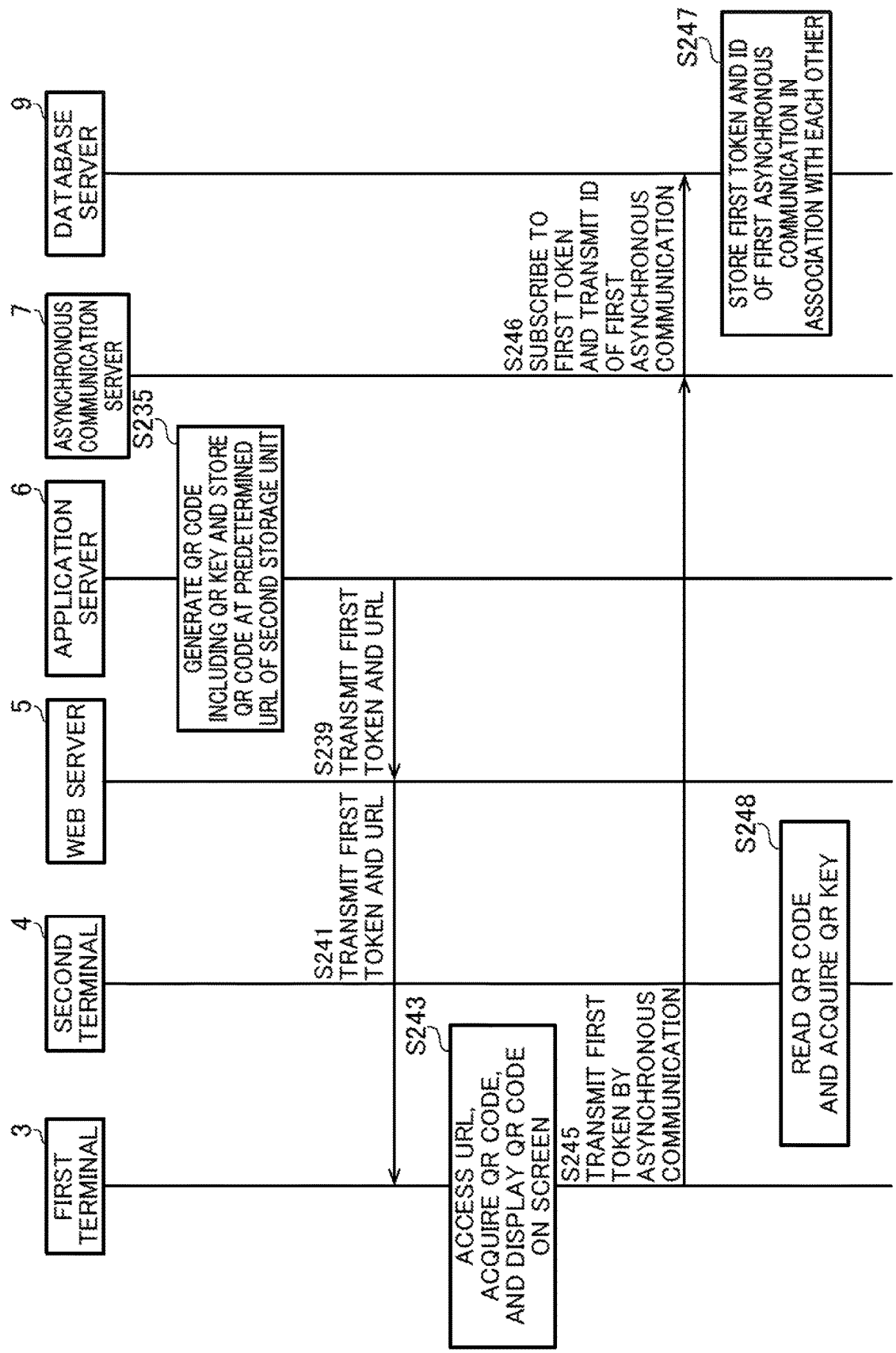

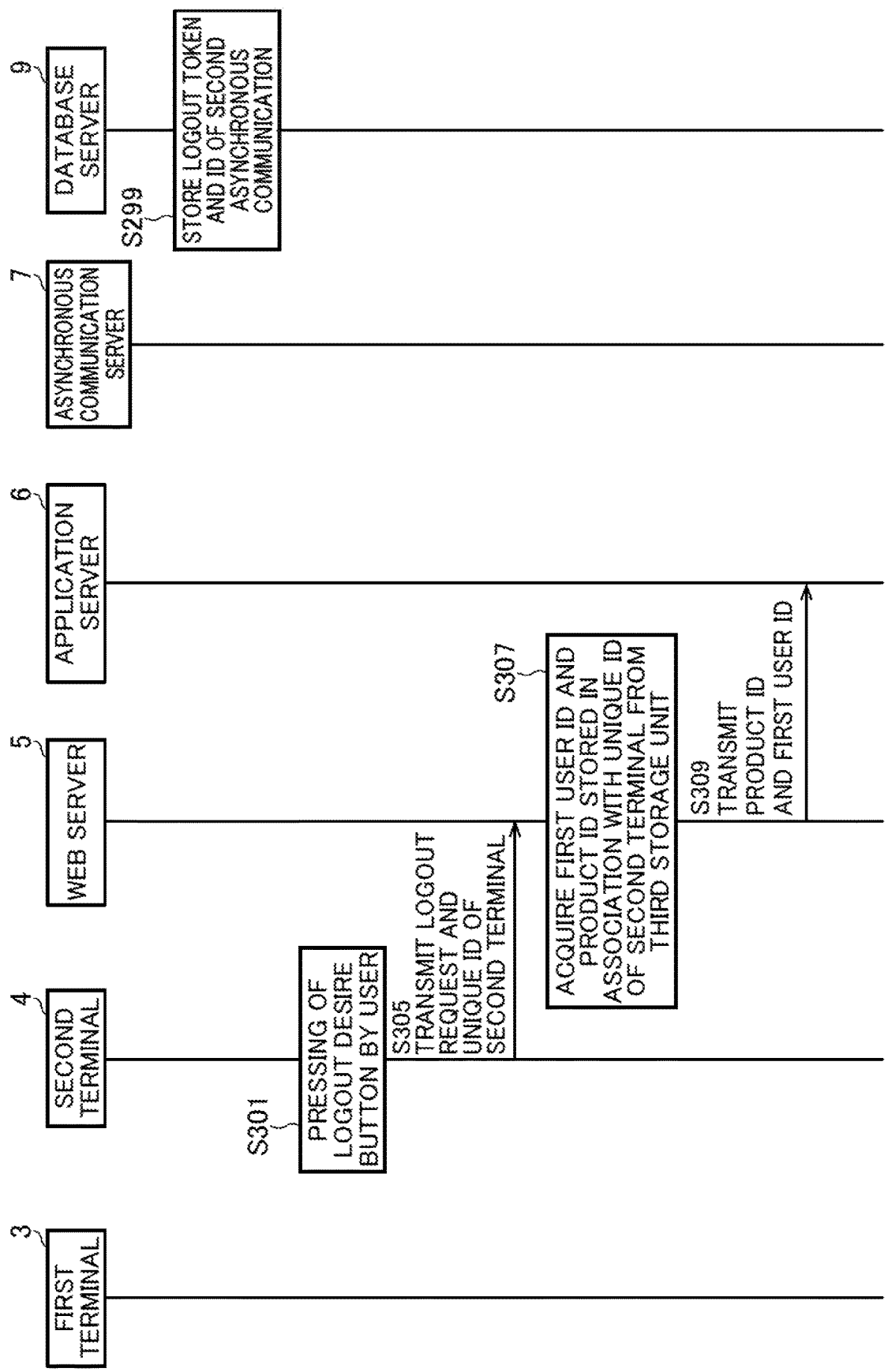

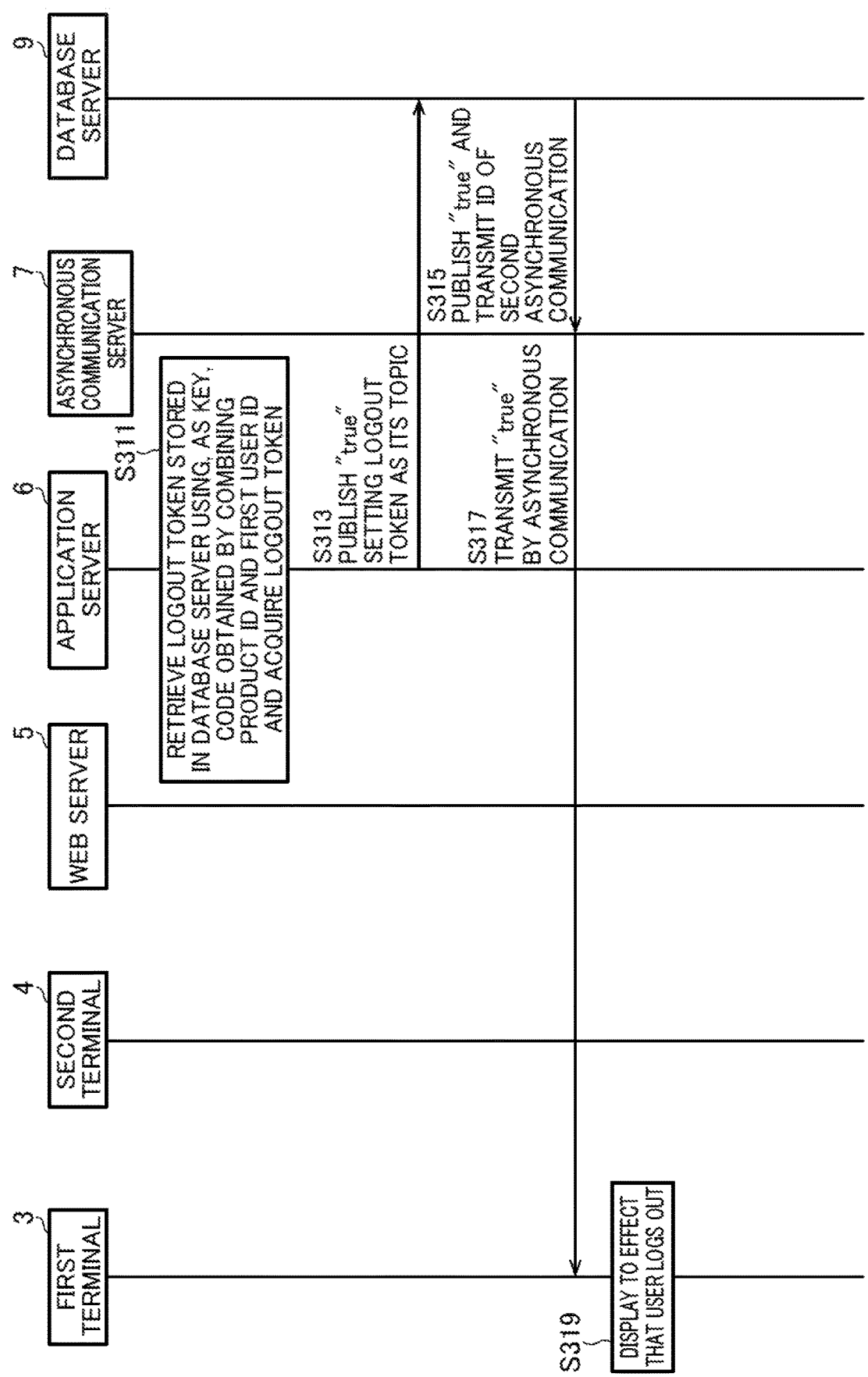

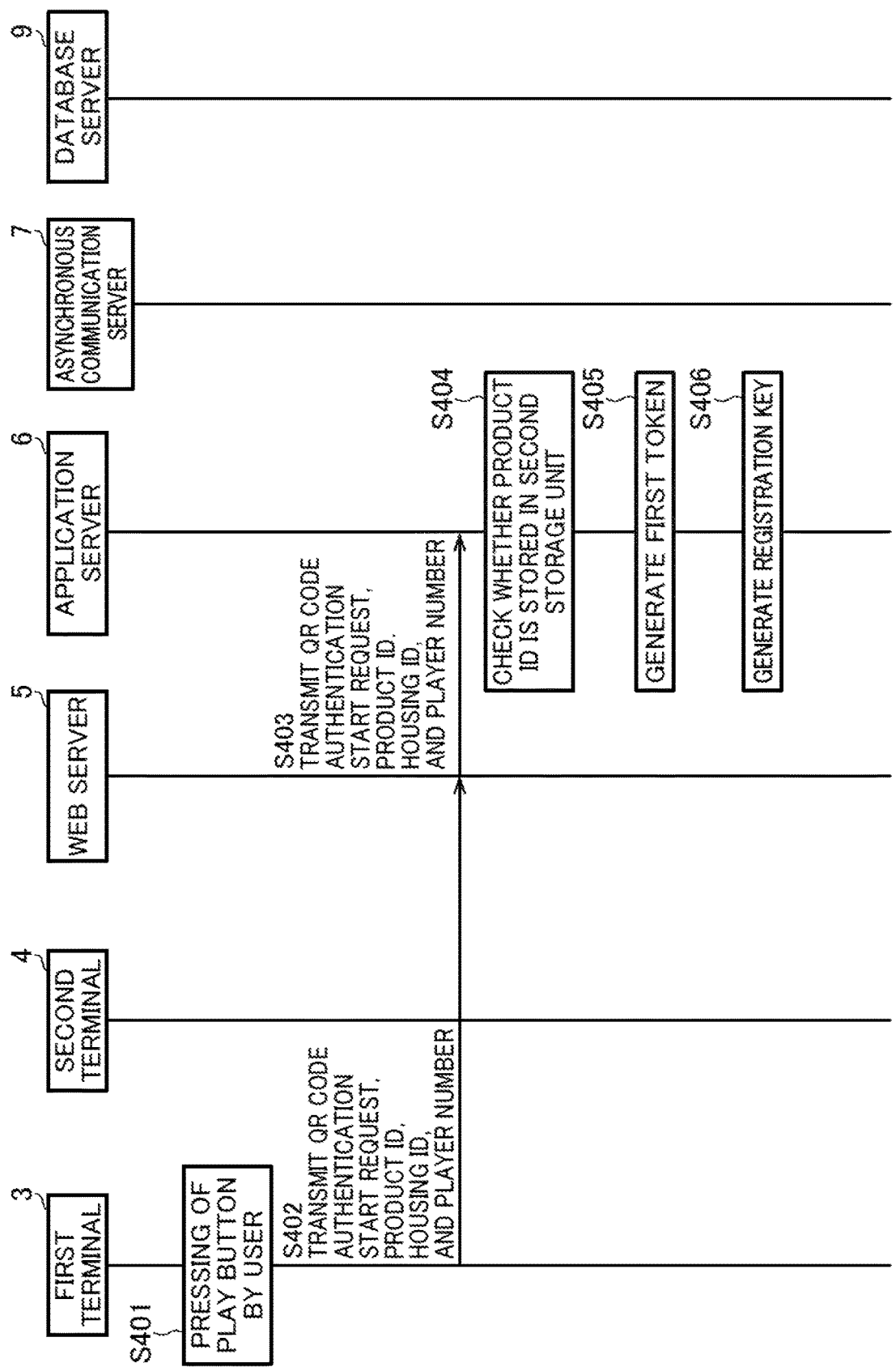

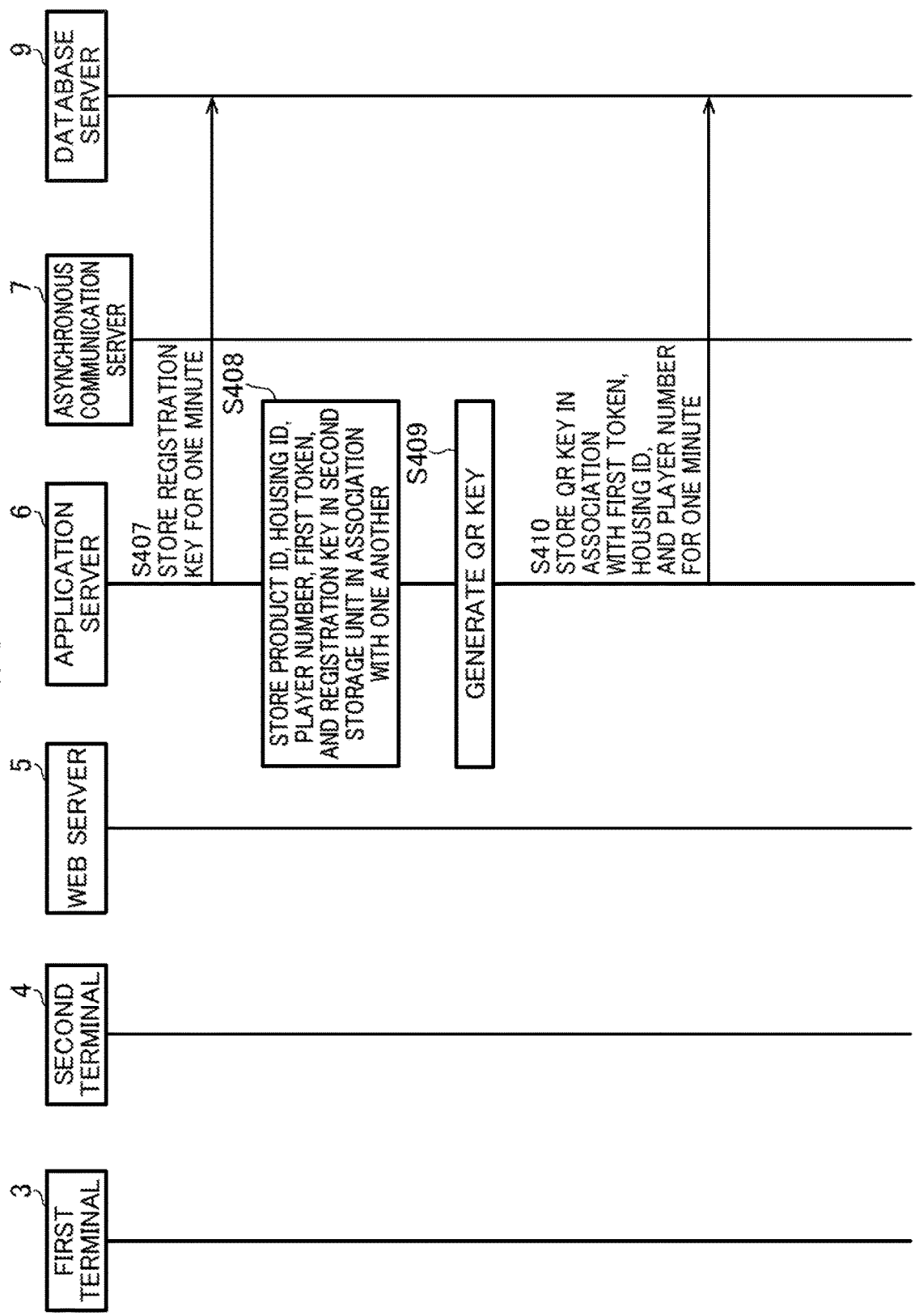

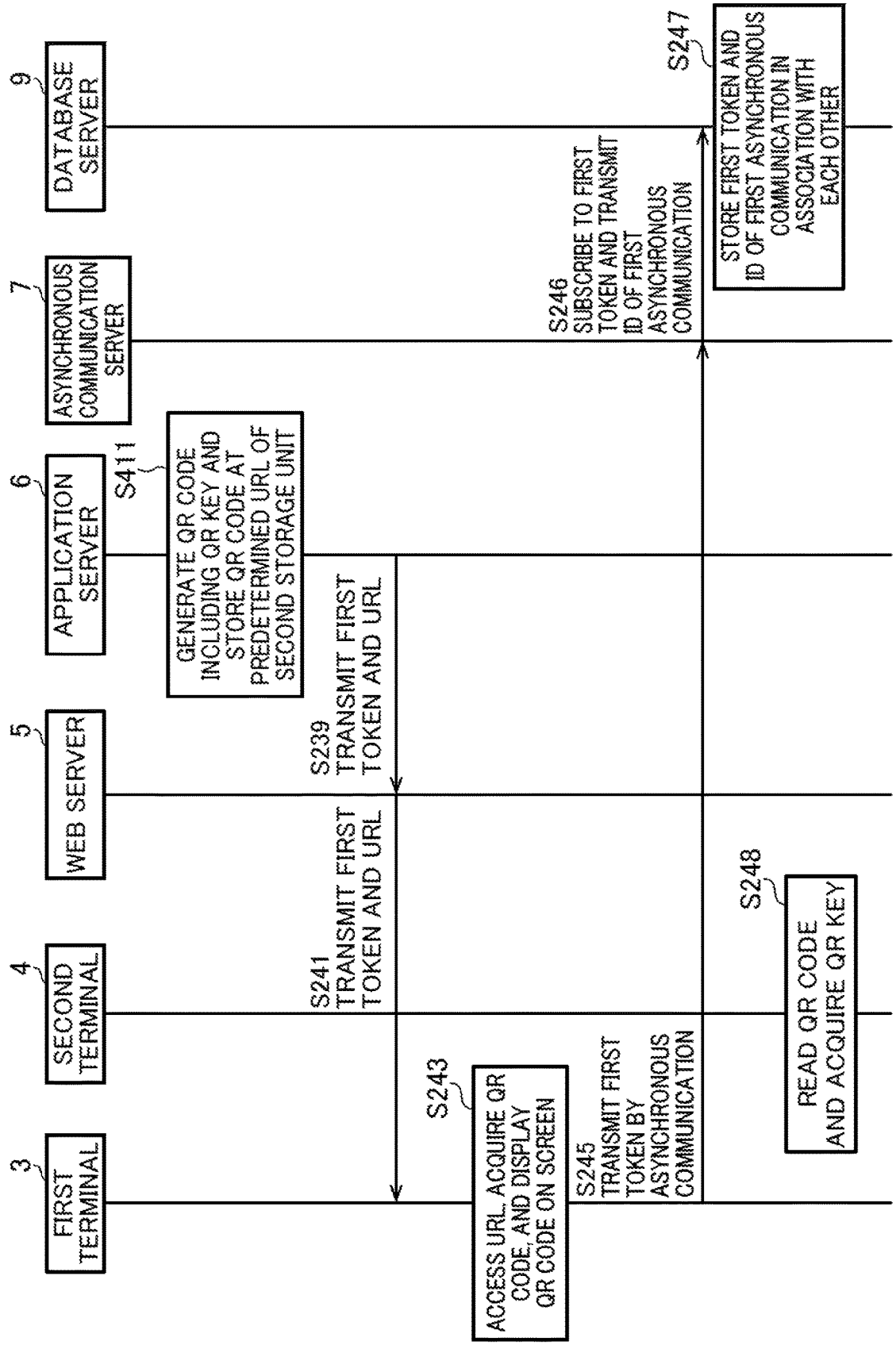

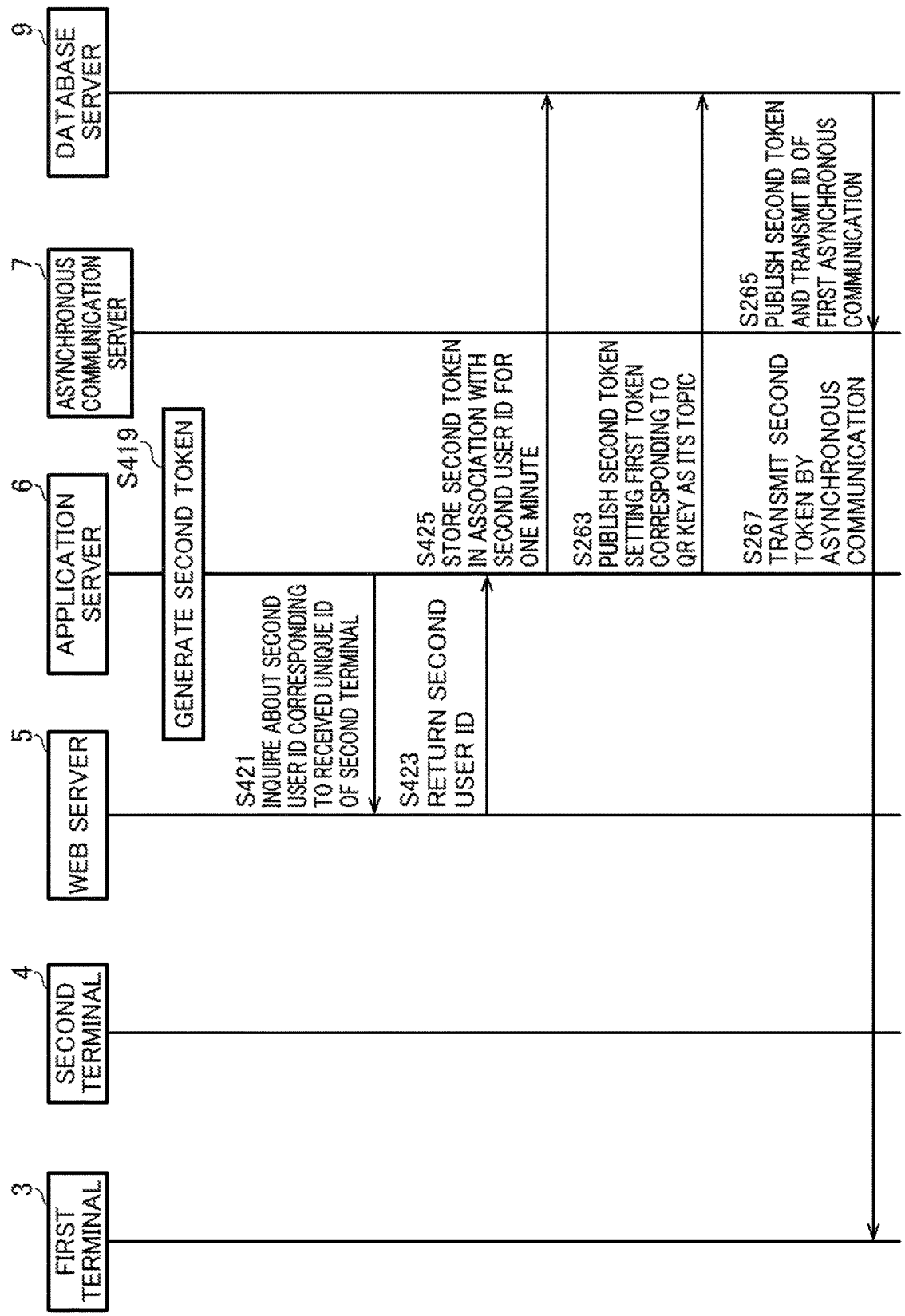

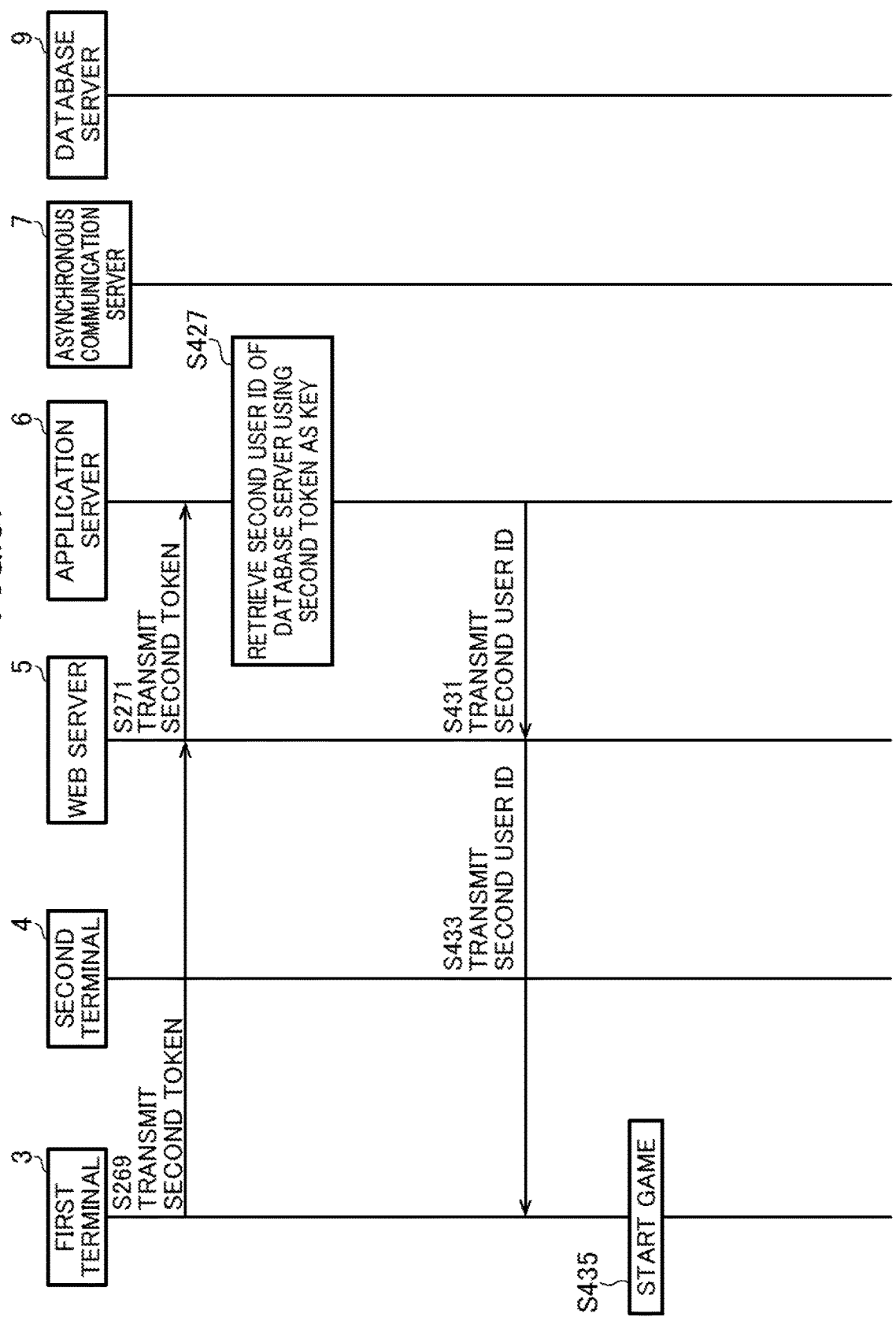

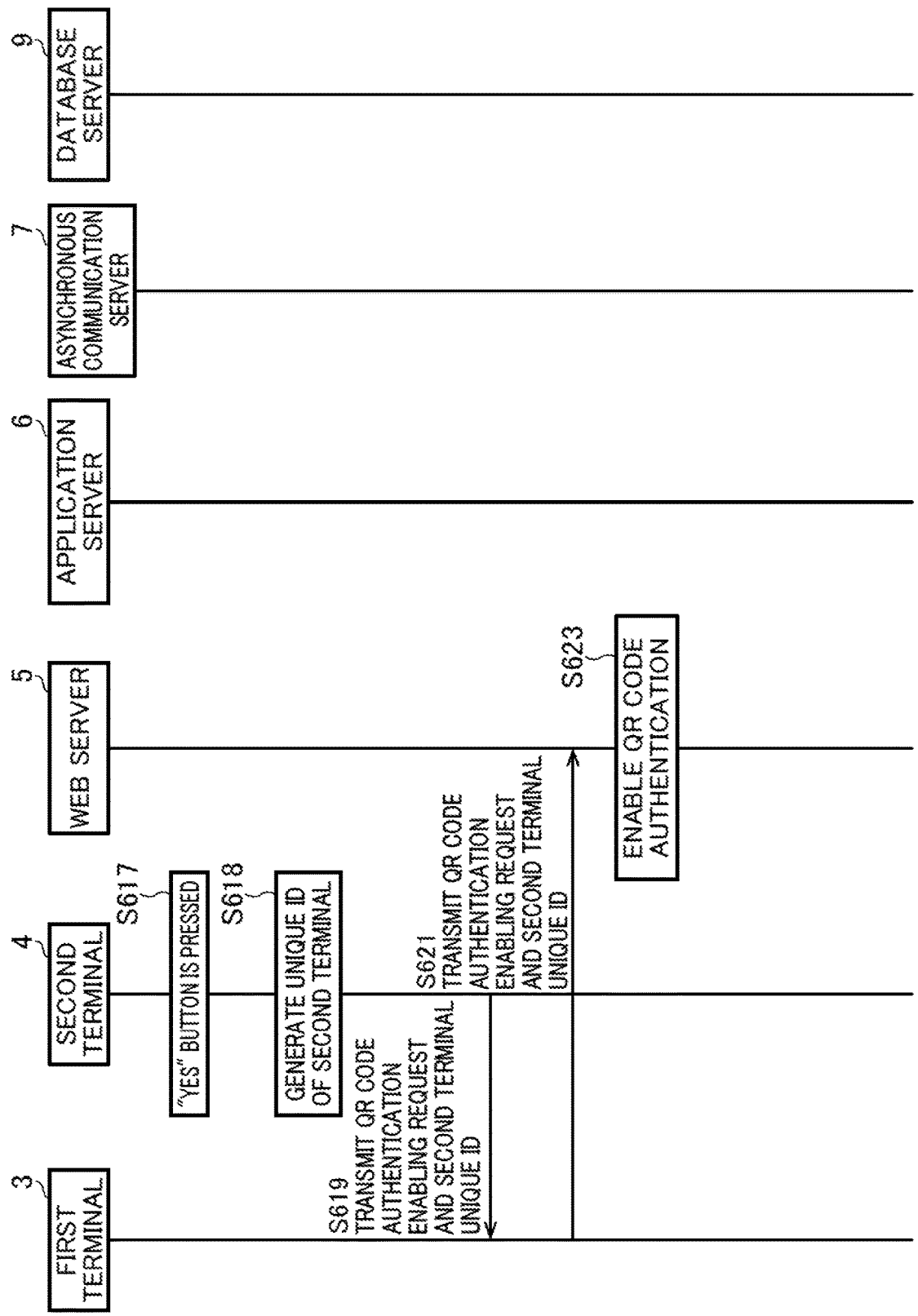

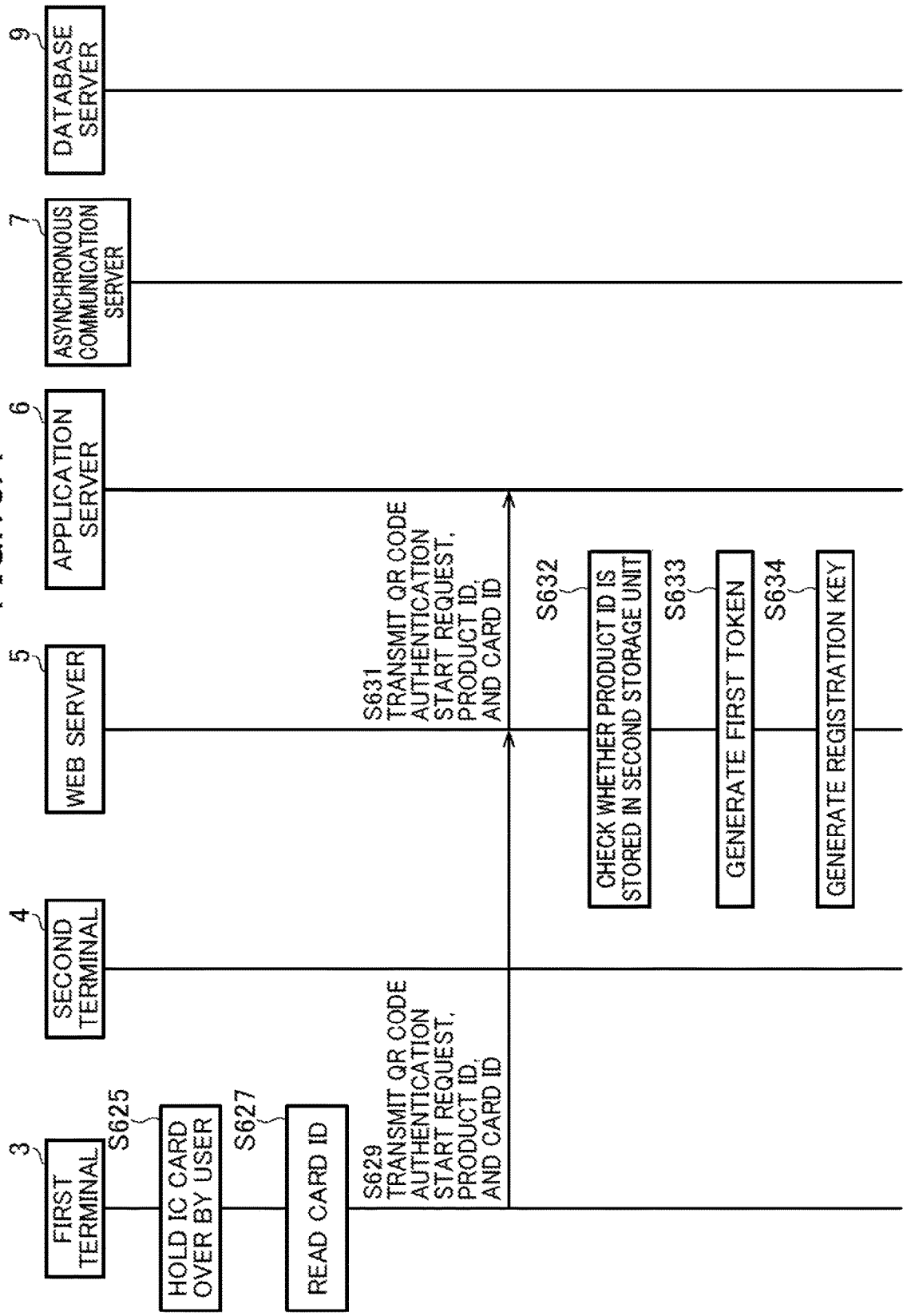

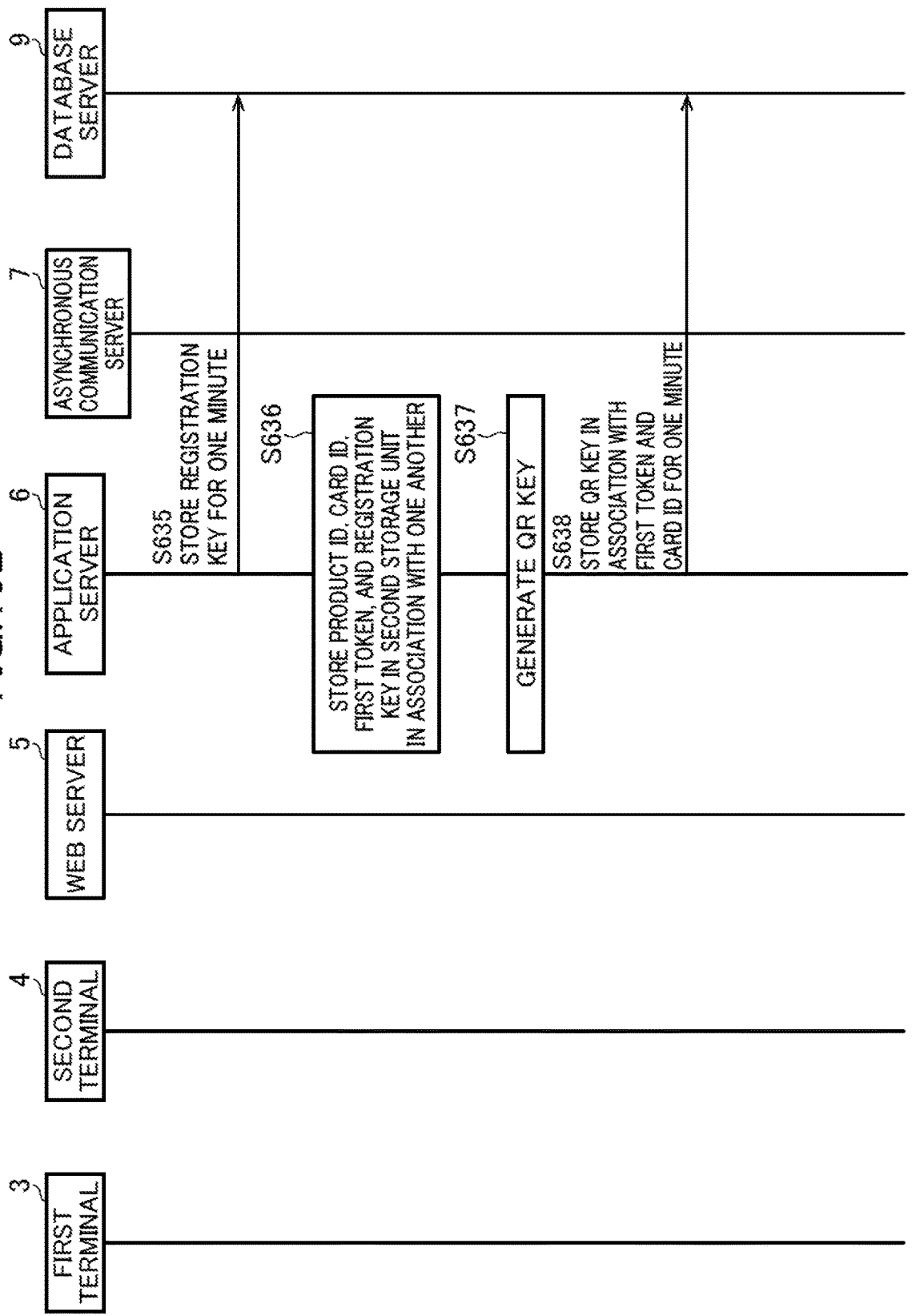

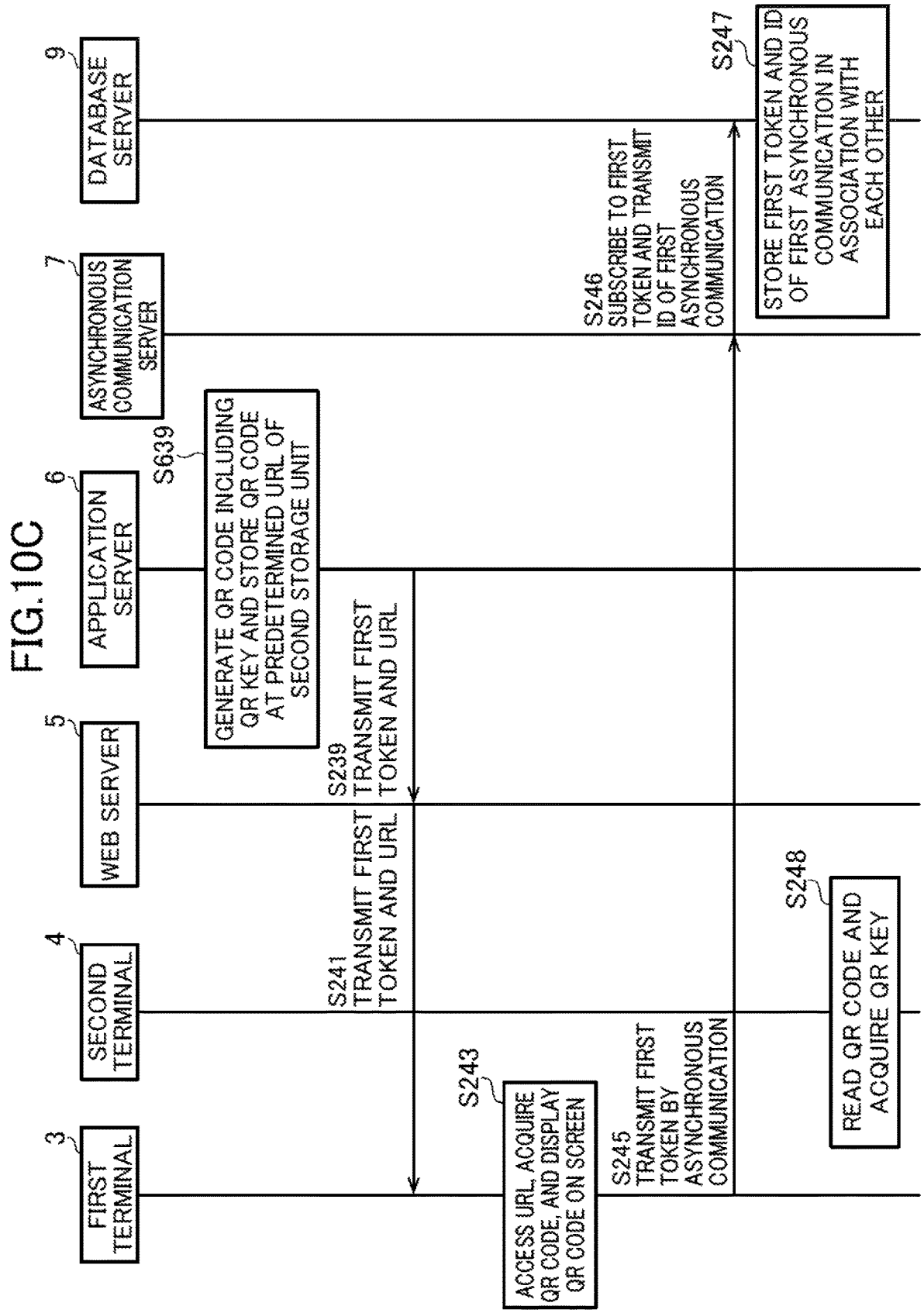

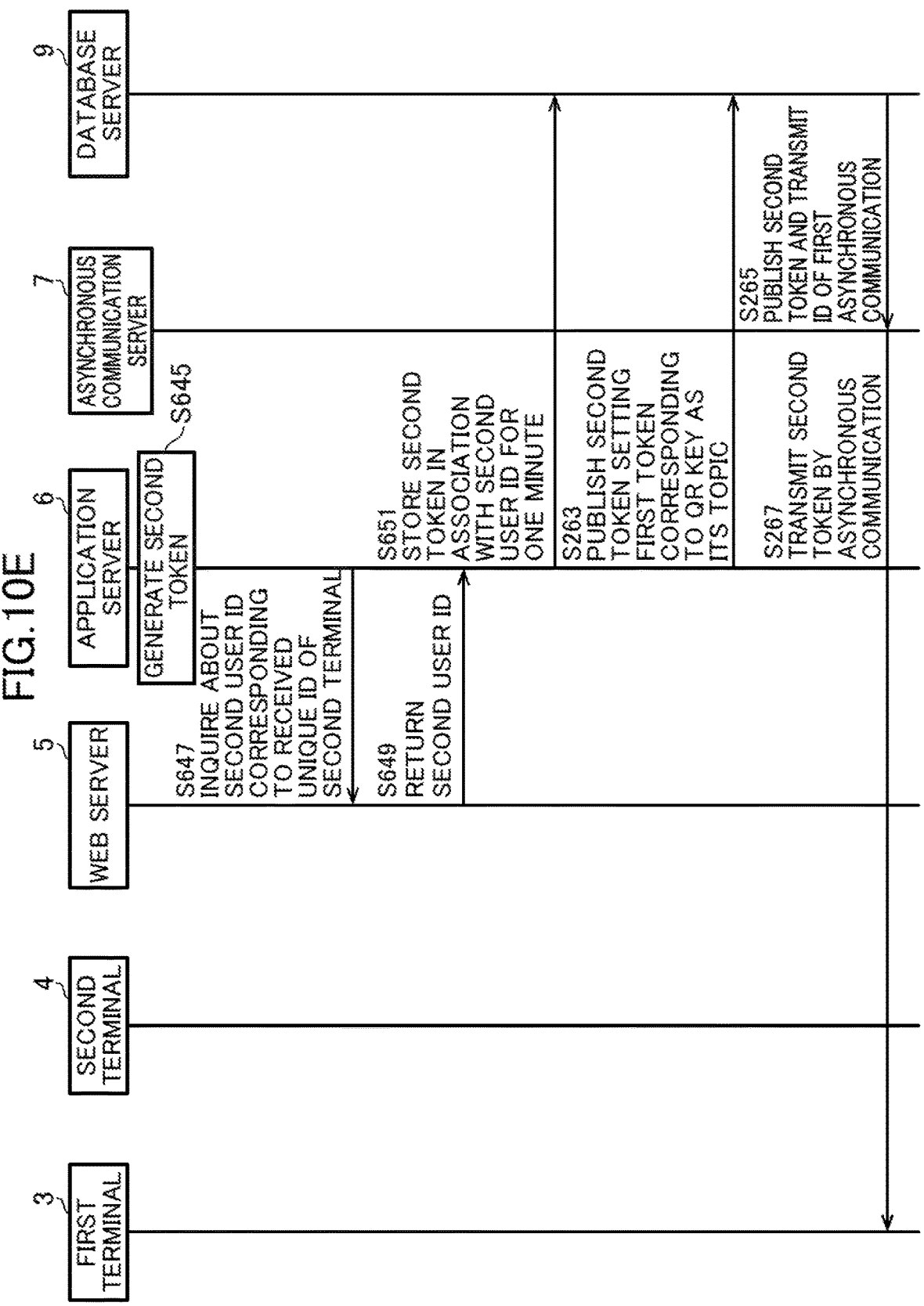

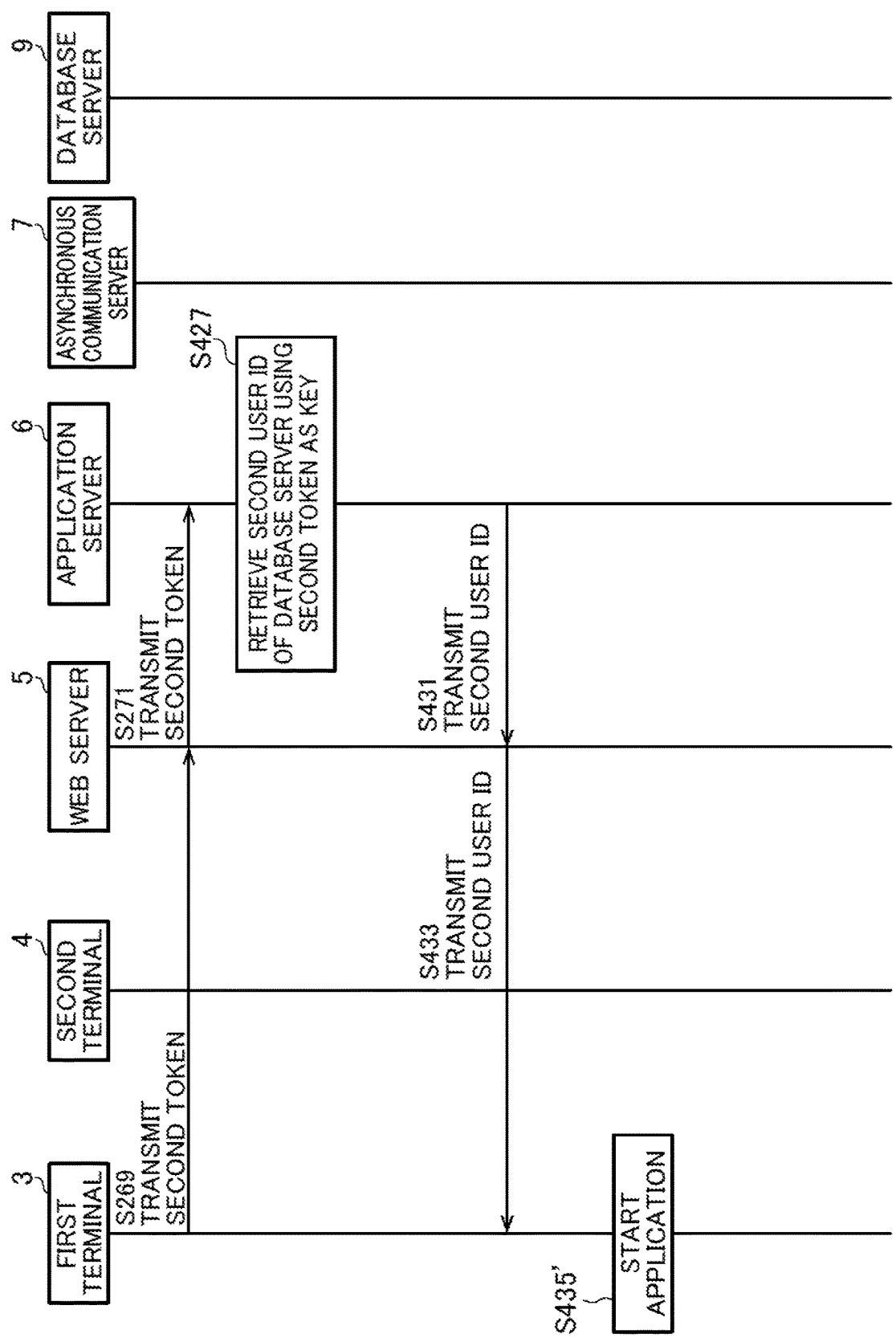

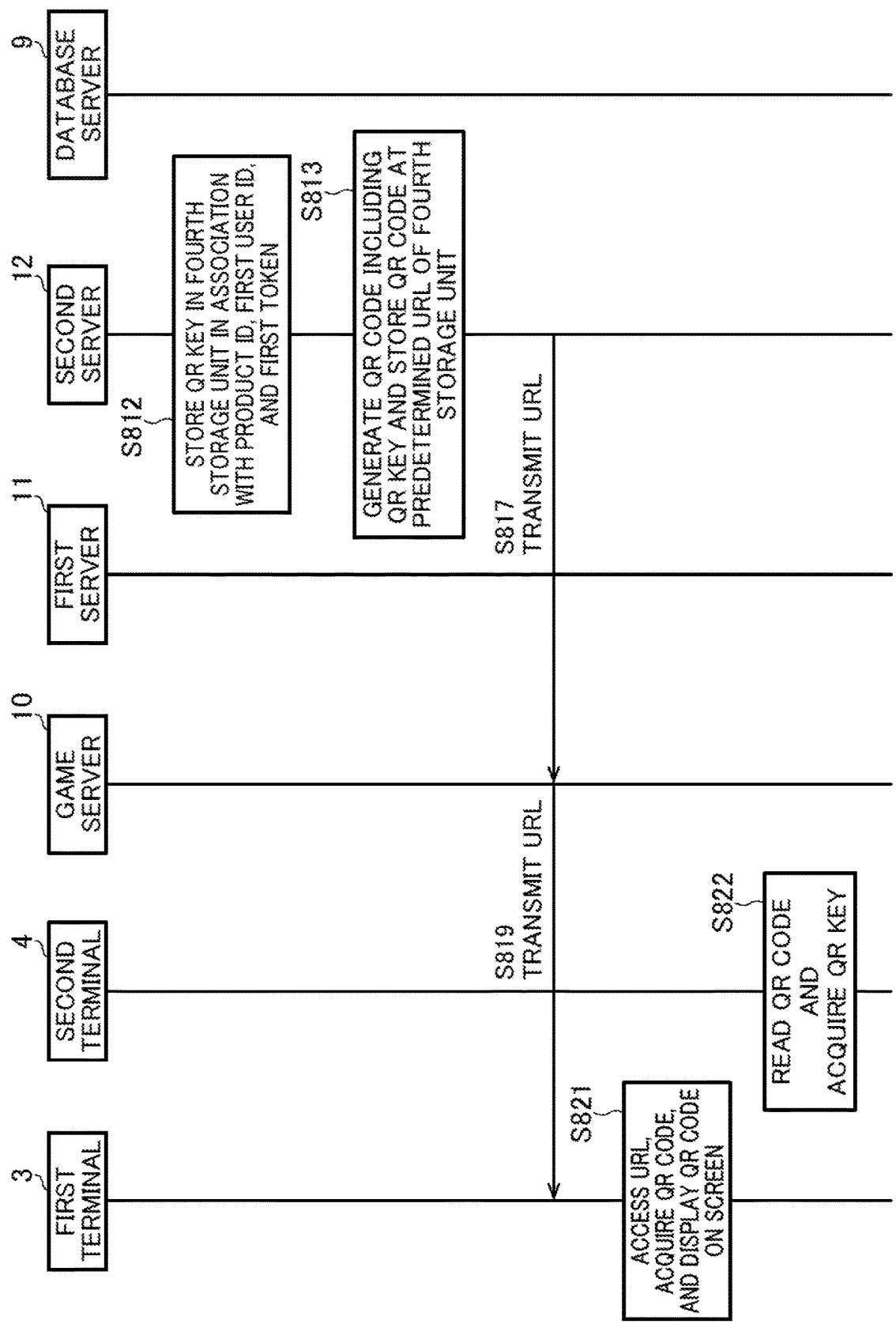

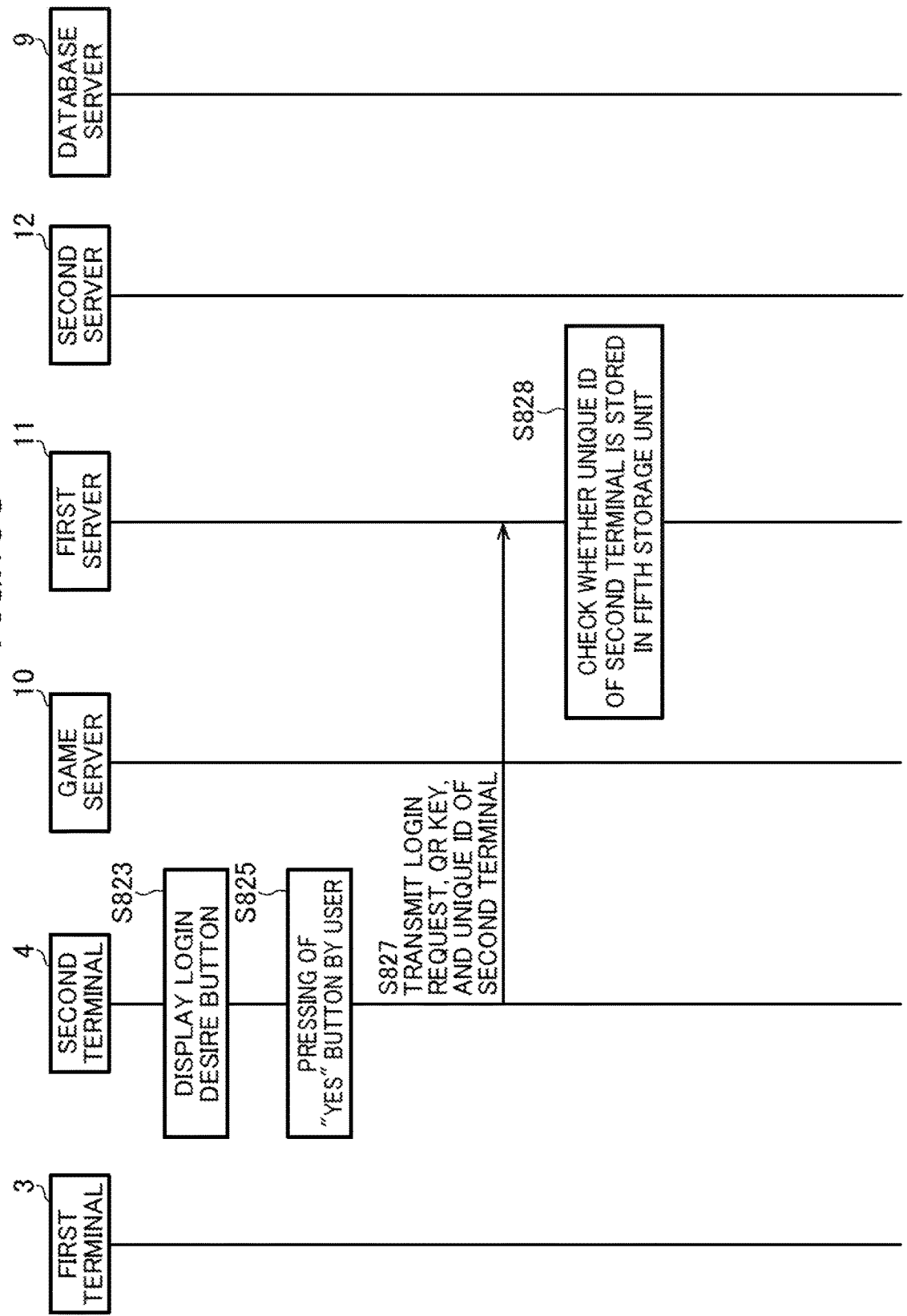

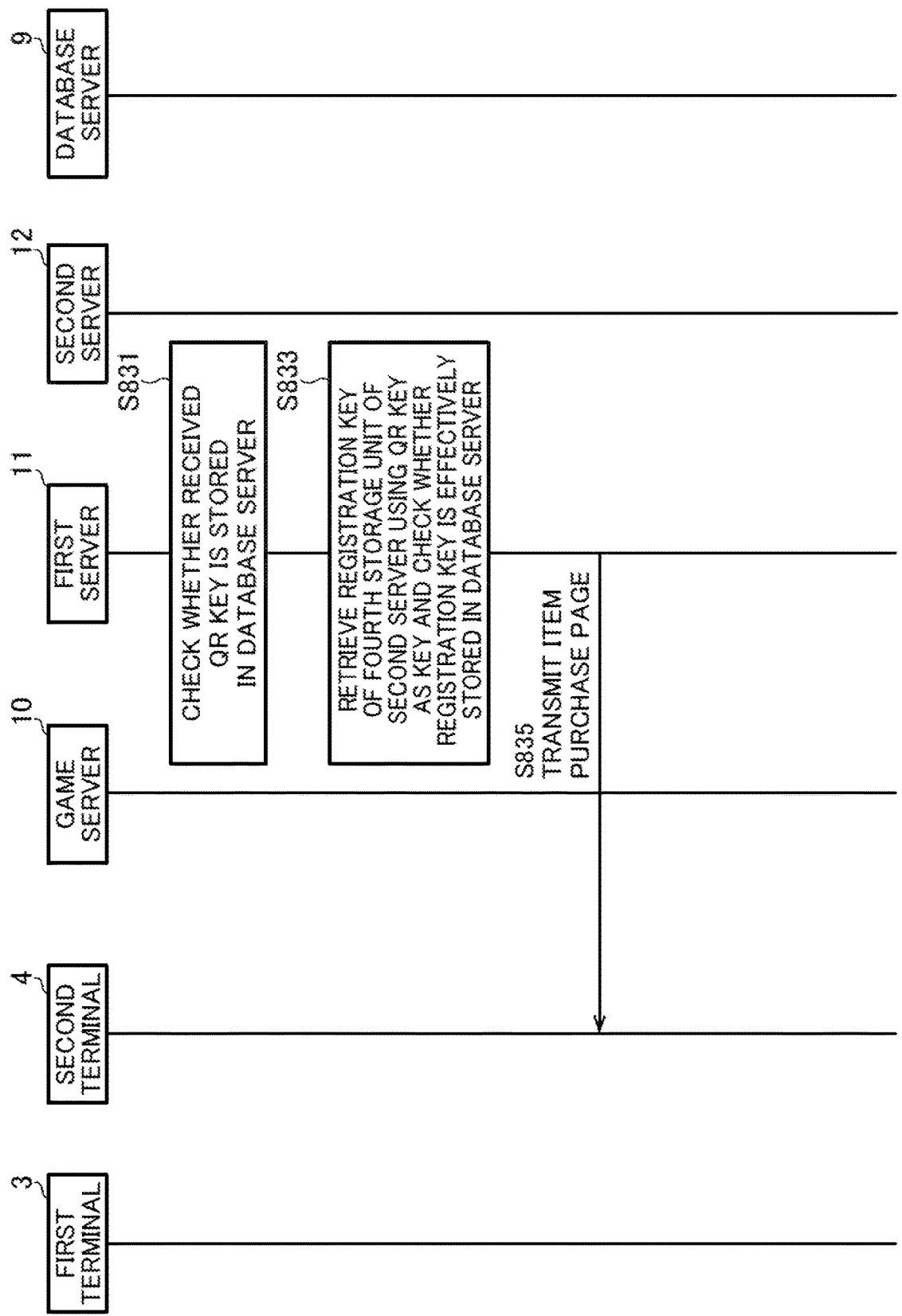

SYSTEM, METHOD, PROGRAM, AND RECORDING MEDIUM STORING PROGRAM FOR AUTHENTICATION

INCORPORATION BY REFERENCE

This is a continuation of International Application PCT/JP2018/040465, with an international filing date of Oct. 31, 2018, which claims the benefit of the priority from Japanese Patent Application No. 2018-133539 filed in the Japanese Patent Office on Jul. 13, 2018, which in turn claims the benefit of the priority from Japanese Patent Application No. 2017-253951 filed in the Japanese Patent Office on Dec. 28, 2017. The entire contents of these applications are incorporated herein by reference.

FIELD OF THE INVENTION

The present invention relates to a system, a method, and a program for authentication, and a recording medium storing the program.

BACKGROUND OF THE INVENTION

In commonly used authentication methods, it is required to input a password, biometric authentication information, or the like. Among the authentication methods, there are methods of performing authentication in two steps by using two terminals (a first terminal and a second terminal), and in both the steps, it is required to input a password, biometric authentication information, or the like. For example, in an authentication method described in Patent document 1 cited below, it is required to first input an ID and a password on a PC ([0019]), and next input biometric authentication information, such as voice, a face, or a finger print, of a user from an information mobile terminal. The input of the password, the biometric authentication information, and the like is a burden for the user and is time-consuming. Therefore, the inventors proposed an authentication system that does not require input of knowledge authentication information except for authentication information such as a user ID and a card ID, belongings authentication information, and biometric authentication information during authentication (see Patent Literature 2 described below).

CITATION LIST

Patent Literature

Patent Document 1
Japanese Patent Application Laid-Open No. 2015-99470
Patent Document 2
Japanese Patent No. 6104439

SUMMARY OF INVENTION

Problem to be Solved by the Invention

However, even the input of the user ID is a burden for the user and is time-consuming. Accordingly, an object of the present invention is to provide an authentication system, an authentication method, an authentication program, and a recording medium storing the authentication program that do not require input of a user ID by a user during authentication.

Means for Solving Problem

One aspect of the present invention provides an authentication system including: a first terminal; a second terminal; and an authentication subsystem, the authentication subsystem including: a storage unit; a first-token generation unit that generates a first token on the basis of at least reception of a code image authentication start request; a code-image-key generation unit that generates a code image key and stores in the storage unit the code image key in association with the first token; a code-image generation unit that generates a code image including the code image key and stores the code image at a predetermined URL of the storage unit; a URL transmitting unit that transmits the first token and the URL at which the code image is stored to the first terminal; an asynchronous communication unit that registers the first token received from the first terminal as a key in an information transmitting and receiving unit; a second-terminal-unique-ID matching unit that checks whether a received unique ID of the second terminal is a unique ID of the second terminal registered in advance; a code-image-key matching unit that, when the received unique ID of the second terminal is the unique ID of the second terminal registered in advance, checks whether the received code image key is stored in the storage unit; a first-response-code transmitting unit that transmits a first response code to the information transmitting and receiving unit using, as a key, the first token retrieved from the storage unit using the received code image key as a key; and the information transmitting and receiving unit that transmits the first response code to the asynchronous communication unit that registers the first token as the key, wherein the first terminal transmits the code image authentication start request and authentication start trigger information to a code-image-authentication-start-request accepting unit in response to a trigger of an authentication start to the first terminal, the first terminal accesses the URL received from the URL transmitting unit and acquires the code image, displays the code image on a screen of the first terminal, and transmits the first token received from the URL transmitting unit to the asynchronous communication unit by asynchronous communication, the second terminal reads the code image displayed on the screen of the first terminal, acquires the code image key, and transmits a login request, the unique ID of the second terminal, and the code image key to a login-request accepting unit, and when the received code image key is stored in the storage unit, the code-image-key matching unit or the first-response-code transmitting unit retrieves the first token stored in the storage unit using the received code image key as a key, and the asynchronous communication unit transmits the first response code received from the information transmitting and receiving unit to the first terminal by the asynchronous communication.

The authentication system may further include a registration-key generation unit that generates a registration key and stores in the storage unit the registration key in association with the first token.

The authentication system may further include a second-token generation unit that, when the first response code is a second token and the received code image key is stored in the storage unit, generates the second token and stores the second token in the storage unit, the first terminal may transmit the second token received from the asynchronous communication unit to a second-token accepting unit, and the authentication system may further include a second-token confirming unit that checks whether the received second token is stored in the storage unit.

Logout trigger preparation information and logout trigger information may be stored in the storage unit in association with each other, the authentication system may further include: a post-authentication processing unit that transmits a logout preparation request and the logout trigger information to the first terminal when the asynchronous communication unit transmits the received first response code to the first terminal by the asynchronous communication or a result of the check by the second-token confirming unit is affirmative; a logout-token generation unit that generates a logout token on the basis of at least reception of the logout preparation request and stores in the storage unit the logout token in association with the logout trigger information; a logout-token transmitting unit that transmits the logout token to the first terminal; a logout-trigger-preparation-information accepting unit that acquires the logout trigger information stored in association with the received logout trigger preparation information from the storage unit; a logout-token acquisition unit that retrieves the logout token stored in the storage unit using the received logout trigger information as a key and acquires the logout token; and a second-response-code transmitting unit that transmits a second response code to the information transmitting and receiving unit using the acquired logout token as a key, when receiving the logout preparation request, the first terminal may transmit the logout trigger information received together with the logout preparation request to a logout-trigger-information accepting unit, the first terminal may transmit the received logout token to the asynchronous communication unit by the asynchronous communication, the asynchronous communication unit may register the received logout token in the information transmitting and receiving unit as a key, the second terminal may transmit the logout request and the logout trigger preparation information to the logout-trigger-preparation-information accepting unit, the information transmitting and receiving unit may transmit, in response to reception of the second response code received using the logout token as a key, the second response code to the asynchronous communication unit that registers the logout token as the key, and the asynchronous communication unit may transmit the received second response code to the first terminal by the asynchronous communication.

The code-image-key generation unit may generate the code image key and effectively store in the storage unit the code image key in association with the first token for a predetermined short time, and/or the second-token generation unit may generate the second token when the received code image key is stored in the storage unit and effectively store the second token in the storage unit for the predetermined short time, and/or the logout-token generation unit may generate a logout token and effectively store in the storage unit the logout token in association with the logout trigger information for the predetermined short time.

At least one of the first token, the registration key, the code image key, the second token, and the logout token may be a one-time token and/or key.

The second-token generation unit may acquire user identification information stored in the storage unit in association with the unique ID of the second terminal or user identification information stored in the storage unit in association with the first token, generate the second token, and store in the storage unite the second token and the user identification information in association with each other, the second-token confirming unit may retrieve the user identification information stored in the storage unit using the received second token as a key, and the authentication system may further include a post-authentication processing unit that, when the user identification information is acquired as a result of the retrieval, transmits the retrieved user identification information to the first terminal.

The first terminal may be a game terminal, the trigger of the authentication start to the first terminal may be pressing of a game start button by a user in the first terminal, and the first terminal may start a game when receiving the user identification information.

The trigger of the authentication start to the first terminal may be a communication start of an IC chip of an IC-chip mounted device of a user and the first terminal.

One aspect of the present invention provides an authentication subsystem including: a code-image-authentication-start-request accepting unit that receives a code image authentication start request and authentication start trigger information from a first terminal; a first-token generation unit that generates a first token on the basis of at least reception of the code image authentication start request; a code-image-key generation unit that generates a code image key and stores in a storage unit the code image key in association with the first token; a code-image generation unit that generates a code image including the code image key and stores the code image at a predetermined URL of the storage unit; a URL transmitting unit that transmits the first token and the URL at which the code image is stored to the first terminal; an asynchronous communication unit that registers the first token received from the first terminal, which receives the first token from the URL transmitting unit, as a key in an information transmitting and receiving unit; a login-request accepting unit that accesses the URL received by the first terminal and acquires the code image to thereby read the code image displayed on a screen of the first terminal and receives a login request, a unique ID of a second terminal, and the code image key from the second terminal that acquires the code image key; a second-terminal-unique-ID matching unit that checks whether the received unique ID of the second terminal is a unique ID of the second terminal registered in advance; a code-image-key matching unit that, when the received unique ID of the second terminal is the unique ID of the second terminal registered in advance, checks whether the received code image key is stored in the storage unit; a first-response-code transmitting unit that transmits a first response code to the information transmitting and receiving unit using, as a key, the first token retrieved from the storage unit using the received code image key as a key; and the information transmitting and receiving unit that transmits the first response code to the asynchronous communication unit that registers the first token as the key, wherein, when the received code image key is stored in the storage unit, the code-image-key matching unit or the first-response-code transmitting unit retrieves the first token stored in the storage unit using the received code image key as a key, and the asynchronous communication unit transmits the first response code received from the information transmitting and receiving unit to the first terminal by asynchronous communication.

The authentication subsystem may further include a registration-key generation unit that generates a registration key and stores in the storage unit the registration key in association with the first token.

The authentication subsystem may further include: a second-token generation unit that, when the first response code is a second token and the received code image key is stored in the storage unit, generates the second token and stores the second token in the storage unit; a second-token accepting unit that receives, from the first terminal, the second token received from the asynchronous communication unit; and a second-token confirming unit that checks whether the received second token is stored in the storage unit.

One aspect of the present invention provides an authentication method including: a step of, by a first terminal, transmitting, in response to a trigger of an authentication start to the first terminal, a code image authentication start request and authentication start trigger information to a code-image-authentication-start-request accepting unit; a step of, by a first-token generation unit, generating a first token on the basis of at least reception of the code image authentication start request; a step of, by a code-image-key generation unit, generating a code image key and storing in a storage unit the code image key in association with the first token; a step of, by a code-image generation unit, generating a code image including the code image key and stores the code image at a predetermined URL of the storage unit; a step of, by a URL transmitting unit, transmitting the first token and the URL at which the code image is stored to the first terminal; a step of, by the first terminal, accessing the received URL, acquiring a code image, displaying the code image on a screen of the first terminal, and transmitting the received first token to an asynchronous communication unit by asynchronous communication; a step of, by the asynchronous communication unit, registering the received first token as a key in an information transmitting and receiving unit; a step of, by a second terminal, reading the code image displayed on the screen of the first terminal and acquiring the code image key; a step of, by the second terminal, transmitting a login request, a unique ID of the second terminal, and the code image key to a login-request accepting unit; a step of, by a second-terminal-unique-ID matching unit, checking whether the received unique ID of the second terminal is a unique ID of the second terminal registered in advance; a step of, when the received unique ID of the second terminal is the unique ID of the second terminal registered in advance, checking, by a code-image-key matching unit, whether the received code image key is stored in the storage unit; a step of, when the received code image key is stored in the storage unit, retrieving, by the code-image-key matching unit or a first-response-code transmitting unit, the first token stored in the storage unit using the received code image key as a key and transmitting, by the first-response-code transmitting unit, a first response code to the information transmitting and receiving unit using the retrieved first token as a key; a step of, by the information transmitting and receiving unit, transmitting the first response code to the asynchronous communication unit that registers the first token as the key; and a step of, by the asynchronous communication unit, transmitting the received first response code to the first terminal by the asynchronous communication.

The authentication method may further include a step of, by a registration-key generation unit, generating a registration key and storing in the storage unit the registration key in association with the first token.

The authentication method may further include: a step of, when the first response code is a second token and the received code image key is stored in the storage unit, generating, by a second-token generation unit, the second token and storing the second token in the storage unit; a step of, by the first terminal, transmitting the second token received from the asynchronous communication unit to a second-token accepting unit; and a step of, by a second-token confirming unit, checking whether the received second token is stored in the storage unit.

The authentication method may further include: a step of, by an authentication-result transmitting unit, transmitting a logout preparation request and the logout trigger information to the first terminal when the asynchronous communication unit transmits the received first response code to the first terminal by the asynchronous communication or a result of the check by the second-token confirming unit is affirmative; a step of, when receiving the logout preparation request, transmitting, by the first terminal, the logout trigger information received together with the logout preparation request to the logout-trigger-information accepting unit; a step of, by a logout-token generation unit, generating a logout token on the basis of at least reception of the logout preparation request and storing in the storage unit the logout token in association with the logout trigger information; a step of, by a logout-token transmitting unit, transmitting the logout token to the first terminal; a step of, by the first terminal, transmitting the received logout token to the asynchronous communication unit by the asynchronous communication; a step of, by the asynchronous communication unit, registering the received logout token as a key in the information transmitting and receiving unit; a step of, by the second terminal, transmitting a logout request and logout trigger preparation information to a logout-trigger-preparation-information accepting unit; a step of, by the logout-trigger-preparation-information accepting unit, acquiring the logout trigger information stored in association with the received logout trigger preparation information from the storage unit in which the logout trigger preparation information and the logout trigger information are stored in association with each other and, by a logout-token acquisition unit, retrieving the logout token stored in the storage unit using the acquired logout trigger information as a key and acquires the logout token; a step of, by a second-response-code transmitting unit, transmitting a second response code to the information transmitting and receiving unit using the acquired logout token as a key; a step of, by the information transmitting and receiving unit, transmitting, in response to reception of the second response code received using the logout token as a key, the second response code to the asynchronous communication unit that registers the logout token as the key; and a step of, by the asynchronous communication unit, transmitting the received second response code to the first terminal by the asynchronous communication.

The storing in the storage unit the code image key and the first token, the second token, or the logout token and the logout trigger information in at least one of the step of, by the code-image-key generation unit, generating the code image key and storing in the storage unit the code image key in association with the first token, the step of, by the second-token generation unit, generating the second token and storing the second token in the storage unit, and the step of, by the logout-token generation unit, generating the logout token and storing in the storage unit the logout token in association with the logout trigger information may be effectively storing in the storage unit the code image key and the first token, the second token, or the logout token and the logout trigger information for a predetermined short time.

At least one of the first token, the registration key, the code image key, the second token, and the logout token may be a one-time token and/or key.

The step of, by the second-token generation unit, generating the second token and storing the second token in the storage unit may be a step of, by the second-token generation unit, acquiring user identification information stored in the storage unit in association with the unique ID of the second terminal or user identification information stored in the storage unit in association with the first token, generating the second token, and storing in the storage unit the second token and the user identification information in association with each other, the step of, by the second-token confirming unit, checking whether the received second token is stored in the storage unit may include the second-token confirming unit retrieving the user identification information stored in the storage unit using the received second token as a key, and the authentication method may further include a step of, when the user identification information is acquired as a result of the retrieval, transmitting, by a post-authentication processing unit, the retrieved user identification information to the first terminal.

The first terminal may be a game terminal, the trigger of the authentication start to the first terminal may be pressing of a game start button by a user in the first terminal, and the first terminal may start a game when receiving the user identification information.

The trigger of the authentication start to the first terminal may be a communication start of an IC chip of an IC-chip mounted device of a user and the first terminal.

One aspect of the present invention provides an authentication method including: a step of, by a code-image-authentication-start-request accepting unit, receiving a code image authentication start request and authentication start trigger information from a first terminal; a step of, by a first-token generation unit, generating a first token on the basis of at least reception of the code image authentication start request; a step of, by a code-image-key generation unit, generating a code image key and storing in a storage unit the code image key in association with the first token; a step of, by a code-image generation unit, generating a code image including the code image key and stores the code image at a predetermined URL of the storage unit; a step of, by a URL transmitting unit, transmitting the first token and the URL at which the code image is stored to the first terminal; a step of, by an asynchronous communication unit, registering the first token received from the first terminal, which receives the first token from the URL transmitting unit, as a key in an information transmitting and receiving unit; a step of, by a login-request accepting unit, accessing the URL received by the first terminal and acquiring the code image to thereby read the code image displayed on a screen of the first terminal and receives a login request, a unique ID of a second terminal, and the code image key from the second terminal that acquires the code image key; a step of, by a second-terminal-unique-ID matching unit, checking whether the received unique ID of the second terminal is a unique ID of the second terminal registered in advance; a step of, when the received unique ID of the second terminal is the unique ID of the second terminal registered in advance, checking, by a code-image-key matching unit, whether the received code image key is stored in the storage unit; a step of, when the received code image key is stored in the storage unit, retrieving, by the code-image-key matching unit or a first-response-code transmitting unit, the first token stored in the storage unit using the received code image key as a key and transmitting, by the first-response-code transmitting unit, a first response code to the information transmitting and receiving unit using the retrieved first token as a key; a step of, by the information transmitting and receiving unit, transmitting the first response code to the asynchronous communication unit that registers the first token as the key; and a step of, by the asynchronous communication unit, transmitting the received first response code to the first terminal by asynchronous communication.

The authentication method may further include a step of, by a registration-key generation unit, generating a registration key and storing in the storage unit the registration key in association with the first token.

The authentication method may further include: a step of, when the first response code is a second token and the received code image key is stored in the storage unit, generating, by a second-token generation unit, the second token and storing the second token in the storage unit; a step of, by a second-token accepting unit, receiving, from the first terminal, the second token received from the asynchronous communication unit; and a step of, by a second-token confirming unit, checking whether the received second token is stored in the storage unit.

One aspect of the present invention provides an authentication system including: a first terminal; a second terminal; and an authentication subsystem, the authentication subsystem including: a storage unit; a code-image-key generation unit that generates a code image key and stores the code image key in the storage unit; a code-image generation unit that generates a code image including the code image key and stores the code image at a predetermined URL of the storage unit; a URL transmitting unit that transmits the URL at which the code image is stored to the first terminal; a second-terminal-unique-ID matching unit that checks whether a received unique ID of the second terminal is a unique ID of the second terminal registered in advance; and a code-image-key matching unit that, when the received unique ID of the second terminal is the unique ID of the second terminal registered in advance, checks whether the received code image key is stored in the storage unit, wherein the first terminal in a login state to an application transmits, in response to a trigger of an authentication start of execution of another application in the second terminal, a code image authentication start request and authentication start trigger information to a code-image-authentication-start accepting unit, the first terminal accesses the URL received from the URL transmitting unit, acquires the code image, and displays the code image on the screen of the first terminal, and the second terminal reads the code image displayed on the screen of the first terminal, acquires the code image key, and transmits a login request, the unique ID of the second terminal, and the code image key to a login-request accepting unit.

The authentication system may further include a registration-key generation unit that generates the registration key and stores the registration key in the storage unit, and the code-image generation unit may store in the storage unite the registration key and the code image key in association with each other.

The registration-key generation unit may generate the registration key and effectively store the registration key in the storage unit for a predetermined short time and/or the code-image-key generation unit may generate the code image key and effectively store the code image key in the storage unit for the predetermined short time.

At least one of the registration key and the code image key may be a one-time key.

One aspect of the present invention provides an authentication subsystem including: a code-image-authentication-start-request accepting unit that receives a code image authentication start request and authentication start trigger information from a first terminal that is in a login state to an application; a code-image-key generation unit that generates a code image key and stores the code image key in a storage unit; a code image generation unit that generates a code image including the code image key and stores the code image at a predetermined URL of the storage unit; a URL transmitting unit that transmits the URL at which the code image is stored to the first terminal; a login-request accepting unit that accesses the URL received by the first terminal and acquires the code image to thereby read the code image displayed on a screen of the first terminal and receives a login request, a unique ID of a second terminal, and the code image key from the second terminal that acquires the code image key; a second-terminal-unique-ID matching unit that checks whether the received unique ID of the second terminal is a unique ID of the second terminal registered in advance; and a code-image-key matching unit that, when the received unique ID of the second terminal is the unique ID of the second terminal registered in advance, checks whether the received code image key is stored in the storage unit.

The authentication subsystem may further include a registration-key generation unit that generates a registration key and stores the registration key in the storage unit, and the code-image generation unit may store in the storage unite the registration key and the code image key in association with each other.

One aspect of the present invention provides an authentication method including: a step of, by a first terminal in a login state to an application, transmitting, in response to a trigger of an authentication start of execution of another application in a second terminal, a code image authentication start request and authentication start trigger information to a code-image-authentication-start-request accepting unit; a step of, by a code-image-key generation unit, generating a code image key and storing the code image key in a storage unit; a step of, by a code-image generation unit, generating a code image including the code image key and stores the code image at a predetermined URL of the storage unit; a step of, by a URL transmitting unit, transmitting the URL at which the code image is stored to the first terminal; a step of, by the first terminal, accessing the received URL, acquiring a code image, and displaying the code image on a screen of the first terminal; a step of, by the second terminal, reading the code image displayed on the screen of the first terminal and acquiring the code image key; a step of, by the second terminal, transmitting a login request, a unique ID of the second terminal, and the code image key to a login-request accepting unit; a step of, by a second-terminal-unique-ID matching unit, checking whether the received unique ID of the second terminal is a unique ID of the second terminal registered in advance; and a step of, when the received unique ID of the second terminal is the unique ID of the second terminal registered in advance, checking, by a code-image-key matching unit, whether the received code image key is stored in the storage unit.

The authentication method may further include: a step of, by the registration-key generation unit, generating a registration key and storing the registration key in the storage unit; and a step of, by the code-image generation unit, storing in the storage unit the registration key and the code image key in association with each other.

The storing the registration key or the code image key in the storage unit in at least one of the step of, by the registration-key generation unit, generating the registration key and storing the registration key in the storage unit and the step of, by the code-image-key generation unit, generating the code image key and storing the code image key in the storage unit may be effectively storing the registration key or the code image key in the storage unit for a predetermined short time.

At least one of the registration key and the code image key may be a one-time key.

One aspect of the present invention provides an authentication method including: a step of, by a code-image-authentication-start-request accepting unit, receiving a code image authentication start request and authentication start trigger information from a first terminal that is in a login state to an application; a step of, by a code-image-key generation unit, generating a code image key and storing the code image key in a storage unit; a step of, by a code image generation unit, generating a code image including the code image key and storing the code image at a predetermined URL of the storage unit; a step of, by a URL transmitting unit, transmitting the URL at which the code image is stored to the first terminal; a step of, by a login-request accepting unit, accessing the URL received by the first terminal and acquiring the code image to thereby read the code image displayed on a screen of the first terminal and receives a login request, a unique ID of a second terminal, and the code image key from the second terminal that acquires the code image key; a step of, by a second-terminal-unique-ID matching unit, checking whether the received unique ID of the second terminal is a unique ID of the second terminal registered in advance; and a step of, when the received unique ID of the second terminal is the unique ID of the second terminal registered in advance, checking, by a code-image-key matching unit, whether the received code image key is stored in the storage unit.

The authentication method may further include: a step of, by a registration-key generation unit, generating a registration key and storing the registration key in the storage unit; and a step of, by the code-image generation unit, storing in the storage unit the registration key and the code image key in association with each other.

The storing the registration key or the code image key in the storage unit in at least one of the step of, by the registration-key generation unit, generating the registration key and storing the registration key in the storage unit and the step of, by the code-image-key generation unit, generating the code image key and storing the code image key in the storage unit may be effectively storing the registration key or the code image key in the storage unit for a predetermined short time.

At least one of the registration key and the code image key may be a one-time key.

In this specification and the claims, a "server" means one or more servers and includes what includes a plurality of servers.

Effect of the Invention

According to the present invention having the configurations explained above, it is possible to provide an authentication system, an authentication method, an authentication program, and a recording medium storing the authentication program that do not require input of a user ID by a user during authentication.

BRIEF DESCRIPTION OF THE DRAWINGS

FIG. 6A is a sequence chart of an example of QR code (registered trademark) authentication processing.

FIG. 6B is a sequence chart of the example of the QR code (registered trademark) authentication processing.

FIG. 6C is a sequence chart of the example of the QR code (registered trademark) authentication processing.

FIG. 6G is a sequence chart of the example of the QR code (registered trademark) authentication processing.

FIG. 6H is a sequence chart of the example of the QR code (registered trademark) authentication processing.

FIG. 8A is a sequence chart of an example of QR code (registered trademark) authentication processing.

FIG. 8B is a sequence chart of the example of the QR code (registered trademark) authentication processing.

FIG. 8C is a sequence chart of the example of the QR code (registered trademark) authentication processing.

FIG. 8E is a sequence chart of the example of the QR code (registered trademark) authentication processing.

FIG. 8F is a sequence chart of the example of the QR code (registered trademark) authentication processing.

FIG. 9B is a diagram showing the example of the QR code (registered trademark) authentication enabling confirmation screen.

FIG. 10A is a part of a sequence chart of an example of QR code (registered trademark) authentication processing.

FIG. 10B is a part of the sequence chart of the example of the QR code (registered trademark) authentication processing.

FIG. 10C is a part of the sequence chart of the example of the QR code (registered trademark) authentication processing.

FIG. 10E is a part of the sequence chart of the example of the QR code (registered trademark) authentication processing.

FIG. 10F is a part of the sequence chart of the example of the QR code (registered trademark) authentication processing.

FIG. 13B is a part of the sequence chart of the example of the QR code (registered trademark) authentication processing.

FIG. 13C is a part of sequence chart of the example of the QR code (registered trademark) authentication processing.

FIG. 13D is a part of sequence chart of the example of the QR code (registered trademark) authentication processing.

DESCRIPTION OF EMBODIMENTS

Embodiments of the present invention are explained below with reference to the drawings.

First Embodiment

Figure 1:
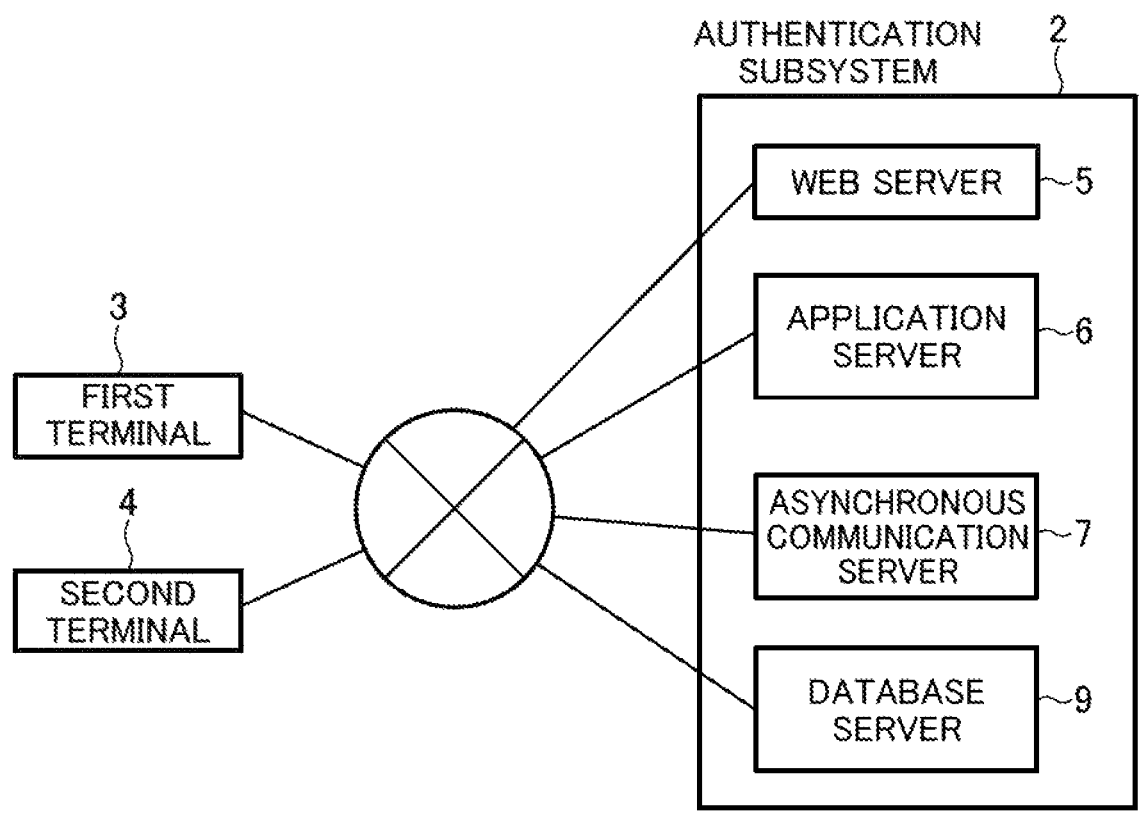
FIG. 1 is a configuration diagram of an authentication system according to a first embodiment of the present invention.
Figure 2:
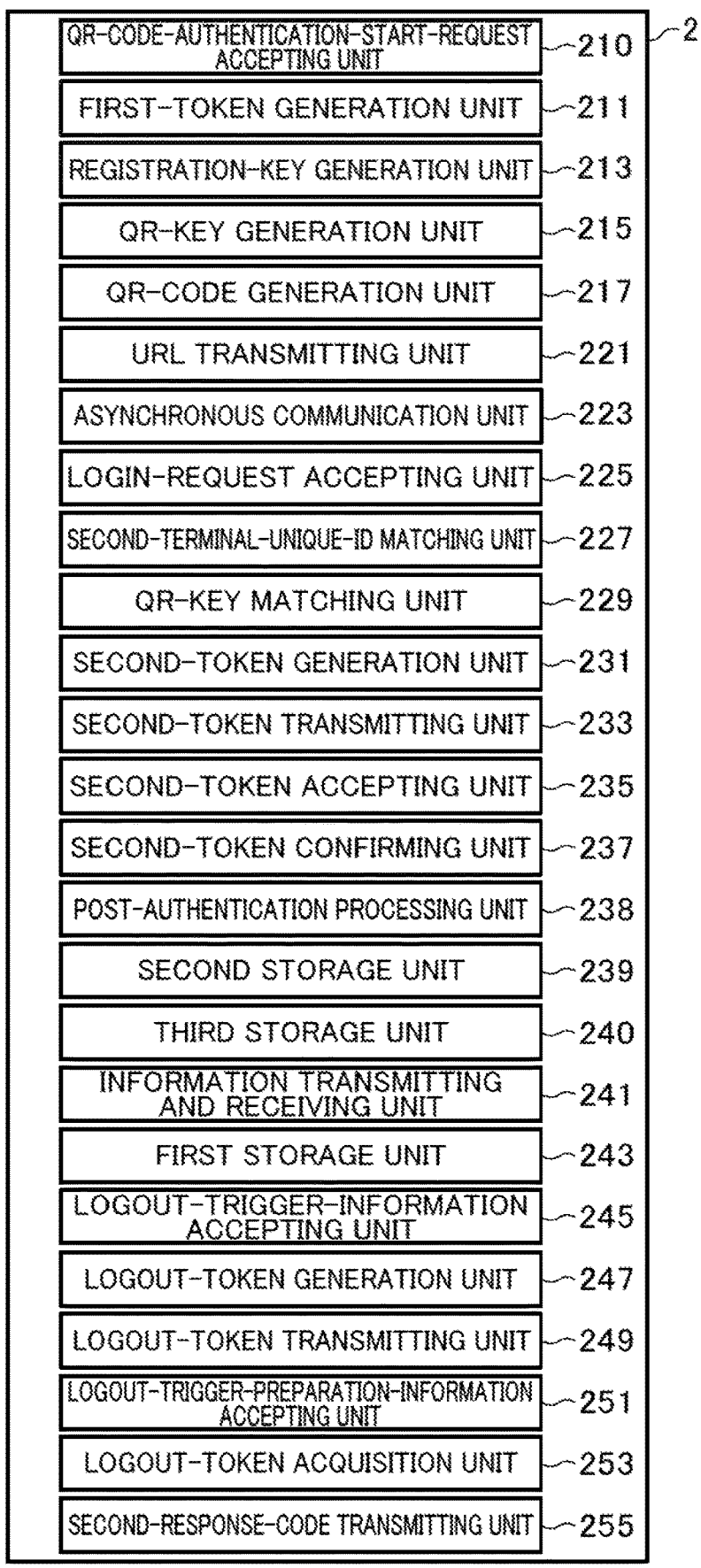
FIG. 2 is a diagram showing a functional configuration of an authentication subsystem according to the first embodiment of the present invention.
Figure 3:
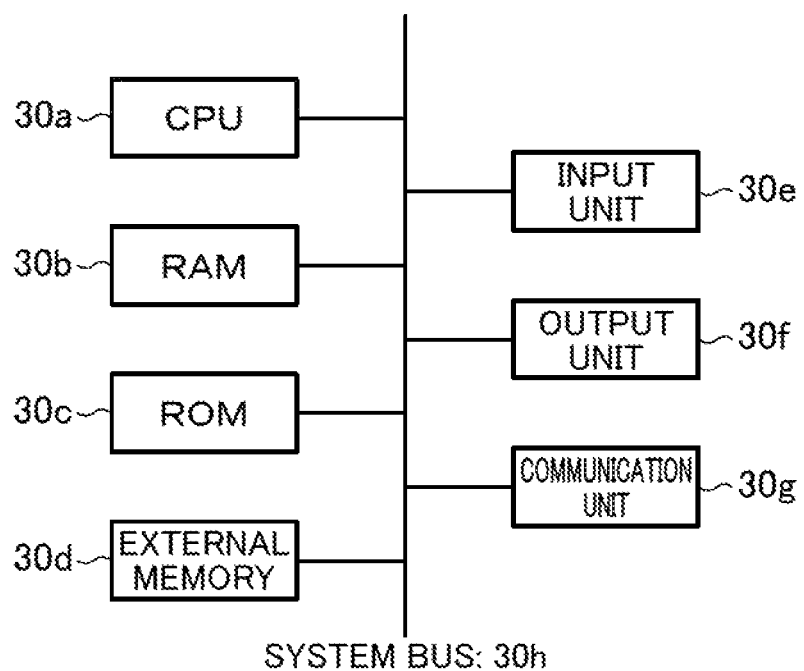
FIG. 3 is a diagram showing a hardware configuration of a first terminal according to the first embodiment of the present invention.

FIG. 1 is a diagram showing an overall configuration of an authentication system according to a first embodiment of the present invention. FIG. 2 is a diagram showing a functional configuration of an authentication subsystem according to the first embodiment of the present invention. FIG. 3 is a diagram showing a hardware configuration of an authentication subsystem according to the first embodiment of the present invention. An authentication system 1 includes a first terminal 3, a second terminal 4, a web server 5, an application server 6, an asynchronous communication server 7 capable of performing asynchronous communication, and a database server 9, which are respectively connected via a network 20. The web server 5, the application server 6, the asynchronous communication server 7, and the database server 9 configure an authentication subsystem 2. Each of the authentication subsystem 2, the first terminal 3, the second terminal 4, the web server 5, the application server 6, the asynchronous communication server 7, and the database server 9 does not need to be configured as one physical device and may be configured with a plurality of physical devices.

As the first terminal 3, any appropriate terminal such as a PC, a smartphone, a tablet terminal, a terminal including an IC card reader writer, a terminal communicable with a mobile terminal, a game machine, a kiosk terminal, or a standalone terminal such as an ATM may be used.

The second terminal 4 is typically a mobile terminal such as a smartphone, a tablet terminal, or a cellular phone. However, any appropriate terminal such as a PC may also be used.

The authentication subsystem 2 includes a QR-code (registered trademark)-authentication-start-request accepting unit 210, a first-token generation unit 211, a registration-key generation unit 213, a QR-key generation unit 215, which is a code-image-key generation unit, a QR (Quick Response)-code (registered trademark) generation unit 217, which is a code-image generation unit, a URL transmitting unit 221, an asynchronous communication unit 223, a login-request accepting unit 225, a second-terminal-unique-ID matching unit 227, a QR-key matching unit 229, a second-token generation unit 231, a second-token transmitting unit 233, a second-token accepting unit 235, a second-token confirming unit 237, a post-authentication processing unit 238, a second storage unit 239, a third storage unit 240, an information transmitting and receiving unit 241, a first storage unit 243, a logout-trigger-information accepting unit 245, a logout-token generation unit 247, a logout-token transmitting unit 249, a logout-trigger-preparation-information accepting unit 251, a logout-token acquisition unit 253, and a second-response-code transmitting unit 255.

The QR-code (registered trademark)-authentication-start-request accepting unit 210 receives a QR code (registered trademark) authentication request, which is a code image authentication request, and authentication start trigger information transmitted from the first terminal 3.

The first-token generation unit 211 generates a one-time first token on the basis of at least reception of a QR code (registered trademark) authentication start request.

The registration-key generation unit 213 generates a registration key, effectively stores the registration key in the first storage unit 243 for a predetermined short time, and effectively stores in the second storage unit 239 the registration key in association with the first token for the predetermined short time. A configuration for "effectively storing the registration key" may be a configuration in which the stored registration key is erased after the predetermined short time or may be a configuration in which an effective period of the registration key is the predetermined short time.

The QR-key generation unit 215 generates a QR key, which is a one-time code image key, and effectively stores in the first storage unit 243 the QR key in association with the first token for the predetermined short time. As explained above, a configuration for "effectively storing the QR key" may be a configuration in which the stored QR key is erased after the predetermined short time or may be a configuration in which an effective period of the QR key is the predetermined short time.

The QR-code (registered trademark) generation unit 217 generates a QR code (registered trademark), which is a code image including a QR key, and stores the QR code (registered trademark) at a predetermined URL (Uniform Resource Locator) of the second storage unit 239.

The URL transmitting unit 221 transmits the first token and the URL at which the QR code (registered trademark) is stored to the first terminal 3.

The asynchronous communication unit 223 registers the first token received from the first terminal 3 as a key in the information transmitting and receiving unit 241. The asynchronous communication unit 223 transmits a second token received from the information transmitting and receiving unit 241 explained later to the first terminal 3 by asynchronous communication.

The login-request accepting unit 225 receives a login request, a unique ID of the second terminal, and the code image key from the second terminal.

The second-terminal-unique-ID matching unit 227 checks whether the received unique ID of the second terminal is a unique ID of the second terminal registered in advance.

The QR-key matching unit 229, which is a code-image-key matching unit, checks whether a received QR key is stored in the first storage unit 243. The QR-key matching unit 229 retrieves the first token stored in the first storage unit 243 using the received QR key as a key, retrieves a registration key stored in the second storage unit 239 using the retrieved first token as a key, and checks whether the registration key acquired as a result of the retrieval is effectively stored in the first storage unit 243.

When the QR key is stored in the first storage unit 243, the second-token generation unit 231 generates a one-time second token and effectively stores the one-time second token in the first storage unit 243 for the predetermined short time.

The second-token transmitting unit 233 retrieves the first token stored in the first storage unit 243 using the received QR key as a key and transmits the second token to the information transmitting and receiving unit 241 using the first token retrieved by the QR-key matching unit 229 or the second-token transmitting unit 233 as a key.

The second-token accepting unit 235 receives, from the first terminal 3, the second token received by the first terminal 3.

The second-token confirming unit 237 checks whether the received second token is effectively stored in the first storage unit 243.

The post-authentication processing unit 238 performs processing corresponding to a check result or a matching result of the second-token confirming unit 237.

The second storage unit 239 stores various kinds of information such as a QR key, a product ID, a first token, a registration key, and a QR code (registered trademark) and stores the kinds of information in association with one another according to necessity. The QR key, the product ID, the first token, and the registration key may be stored in the second storage unit 239 directly in association with one another. Alternatively, the QR key, the product ID, the first token, and the registration key may be stored in the second storage unit 239 indirectly in association with one another according to, for example, a table in which the QR key and the other kinds of information are associated with each other and a table in which the other kinds of information and the product ID, the first token, and the registration key are associated with each other. The second storage unit 239 may be configured as one physical device or may be distributedly disposed in a plurality of physical devices.

The third storage unit 240 stores various kinds of information such as a unique ID of the second terminal, a first user ID, and a product ID and stores the kinds of information in association with one another according to necessity. The unique ID of the second terminal, the first user ID, and the product ID may be stored in the third storage unit 240 directly in association with one another. Alternatively, the unique ID of the second terminal, the first user ID, and the product ID may be stored in the third storage unit 240 indirectly in association with one another according to, for example, a table in which the unique ID of the second terminal and the other kinds of information are associated with each other and a table in which the other kinds of information and the first user ID and the product ID are associated with each other. The third storage unit 240 may be configured as one physical device or may be distributedly disposed in a plurality of physical devices.

The information transmitting and receiving unit 241 transmits, according to reception of the second token transmitted using the first token as a key, the second token to the asynchronous communication unit 223 that registers the first token as the key.

The first storage unit 243 stores various kinds of information such as a registration key, a QR key, a first token, a product ID, a second token, a logout token, a first user ID, an ID of first asynchronous communication, and an ID of second asynchronous communication and stores the kinds of information in association with one another according to necessity. The QR key, the first token, and the product ID may be stored in the first storage unit 243 directly in association with one another. Alternatively, the QR key, the first token, and the product ID may be stored in the first storage unit 243 indirectly in association with one another according to, for example, a table in which the QR key and the other kinds of information are associated with each other and a table in which the other kinds of information and the first token and the product ID are associated with each other. The first storage unit 243 may be configured as one physical device or may be distributedly disposed in a plurality of physical devices.

The logout-trigger-information accepting unit 245 receives a logout preparation request and logout trigger information from the first terminal 3.

The logout-token generation unit 247 generates a logout token on the basis of at least reception of the logout preparation request and stores in the first storage unit 243 the logout token in association with the logout trigger information.

The logout-token transmitting unit 249 transmits the logout token to the first terminal 3.

The logout-trigger-preparation-information accepting unit 251 receives a logout request and logout trigger preparation information from the second terminal 4 and acquires, from the third storage unit 240, logout trigger information stored in association with the received logout trigger preparation information.

The logout-token acquisition unit 253 retrieves a logout token stored in the first storage unit 243 using the acquired logout trigger information as a key and acquires the logout token.

The second-response-code transmitting unit 255 transmits a second response code to the information transmitting and receiving unit 241 using the acquired logout token as a key.

The first terminal 3 transmits, according to a trigger of an authentication start to the first terminal 3, a QR code (registered trademark) authentication start request and authentication start trigger information to the QR-code (registered trademark)-authentication-start-request accepting unit 210. The first terminal 3 accesses a URL received from the URL transmitting unit 221, acquires a QR code (registered trademark), displays the QR code (registered trademark) on a screen of the first terminal 3, and transmits a first token received from the URL transmitting unit 221 to the asynchronous communication unit 223 by the asynchronous communication. The first terminal 3 transmits a second token received from the asynchronous communication unit 223 to the second-token accepting unit 235.

The second terminal 4 reads the QR code (registered trademark) displayed on the screen of the first terminal 3, acquires a QR key, and transmits a login request and the QR key to the login-request accepting unit 225.

The web server 5 includes the QR-code (registered trademark)-authentication-start-request accepting unit 210, the URL transmitting unit 221, the login-request accepting unit 225, the second-terminal-unique-ID matching unit 227, the second-token accepting unit 235, the post-authentication processing unit 238, the third storage unit 240, the logout-trigger-information accepting unit 245, the logout-token transmitting unit 249, the logout-trigger-preparation-information accepting unit 251 of the authentication subsystem 2.

The application server 6 includes the QR-code (registered trademark)-authentication-start-request accepting unit 210, the first-token generation unit 211, the registration-key generation unit 213, the QR-key generation unit 215, the QR-code (registered trademark) generation unit 217, the URL transmitting unit 221, the login-request accepting unit 225, the QR-key matching unit 229, the second-token generation unit 231, the second-token transmitting unit 233, the second-token accepting unit 235, the second-token confirming unit 237, the post-authentication processing unit 238, the second storage unit 239, the logout-trigger-information accepting unit 245, the logout-token generation unit 247, the logout-token transmitting unit 249, the logout-trigger-preparation-information accepting unit 251, the logout-token acquisition unit 253, and the second-response-code transmitting unit 255 of the authentication subsystem 2.

The asynchronous communication server 7 includes the asynchronous communication unit 223 of the authentication subsystem 2.

The database server 9 includes the information transmitting and receiving unit 241 and the first storage unit 243 of the authentication subsystem 2.

FIG. 3 is a diagram showing an example of a hardware configuration of the first terminal 3 according to this embodiment. The first terminal 3 includes a CPU 30*a*, a RAM 30*b*, a ROM 30*c*, an external memory 30*d*, an input unit 30*e*, an output unit 30*f*, and a communication unit 30*g*. The RAM 30*b*, the ROM 30*c*, the external memory 30*d*, the input unit 30*e*, the output unit 30*f*, and the communication unit 30*g* are connected to the CPU 30*a* via a system bus 30*h*.

The CPU 30*a* collectively controls the devices connected to the system bus 30*h*.

In the ROM 30*c* and the external memory 30*d*, a BIOS or an OS, which is a control program of the CPU 30*a*, and various programs, data, and the like necessary for realizing functions executed by a computer are stored.

The RAM 30*b* functions as a main memory, a work area, and the like of the CPU. The CPU 30*a* loads programs and the like necessary in executing processing from the ROM 30*c* and the external memory 30*d* to the RAM 30*b* and executes the loaded programs to realize various operations.

The external memory 30*d* includes, for example, a flash memory, a hard disk, a DVD-RAM, or a USB memory.

The input unit 30*e* accepts an operation instruction or the like from the user or the like. The input unit 30*e* includes an input device such as an input button, a keyboard, a pointing device, a wireless remote controller, a microphone, or a camera.

The output unit 30*f* outputs data processed by the CPU 30*a* and data stored in the RAM 30*b*, the ROM 30*c*, and the external memory 30*d*. The output unit 30*f* includes an output device such as a CRT display, an LCD, an organic EL panel, a printer, or a speaker.

The communication unit 30*g* is an interface for performing connection and communication to an external device via a network or directly. The communication unit 30*g* includes an interface such as a serial interface or a LAN interface.

The same applies to hardware configurations of the second terminal 4, the web server 5, the application server 6, the asynchronous communication server 7, and the database server 9.

The units of the authentication subsystem 2 shown in FIG. 2 are realized by various programs stored in the ROM and the external memory using the CPU, the RAM, the ROM, the external memory, the input unit, the output unit, the communication unit, and the like as resources.

An example of authentication processing of the authentication system according to the first embodiment of the present invention is explained below based on the system configuration explained above with reference to FIG. 4 to FIG. 7 and the like.

<Enabling Processing for QR Code (Registered Trademark) Authentication>

Figure 4:
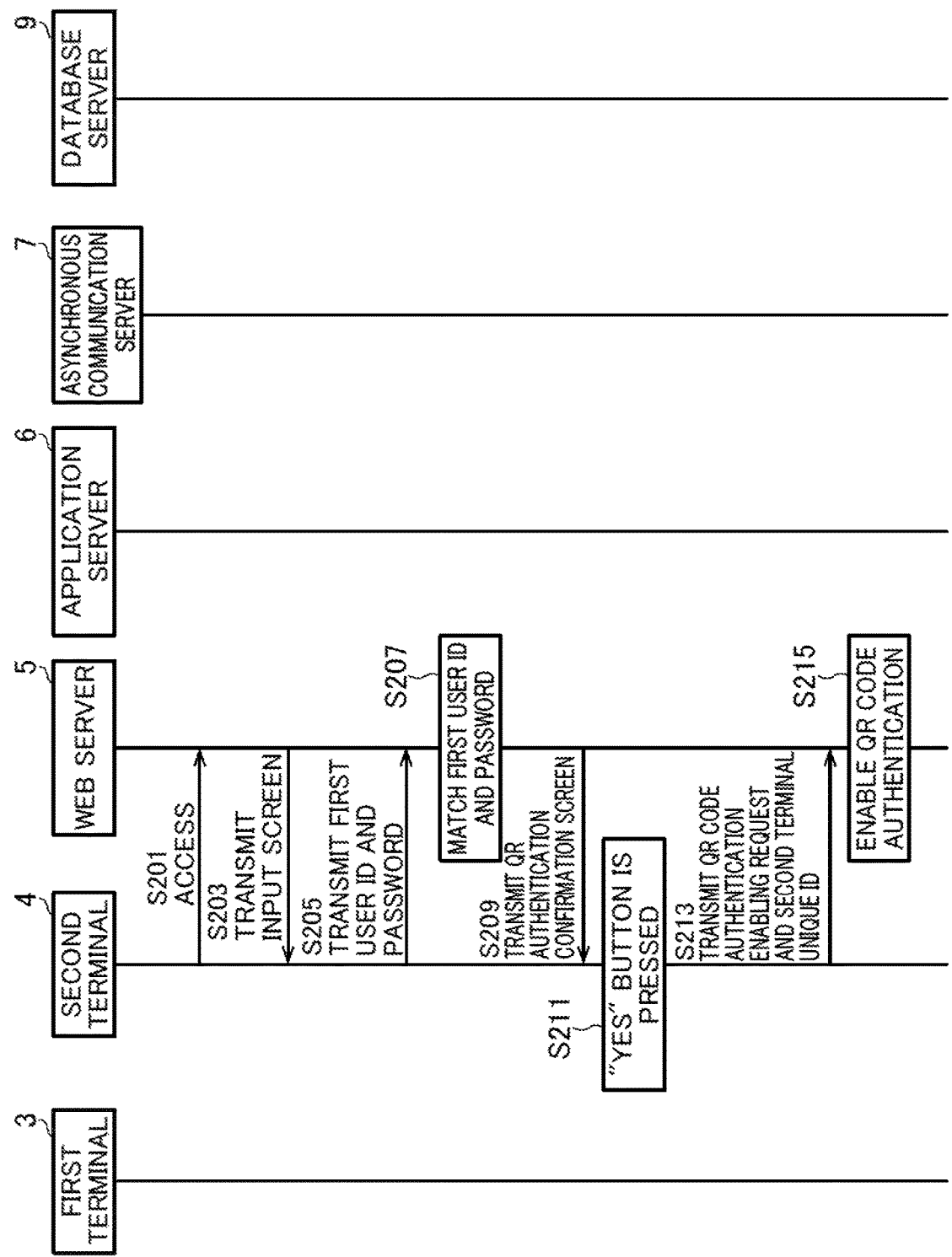
FIG. 4 is a sequence chart of an example of processing for enabling QR code (registered trademark) authentication.
Figure 5:
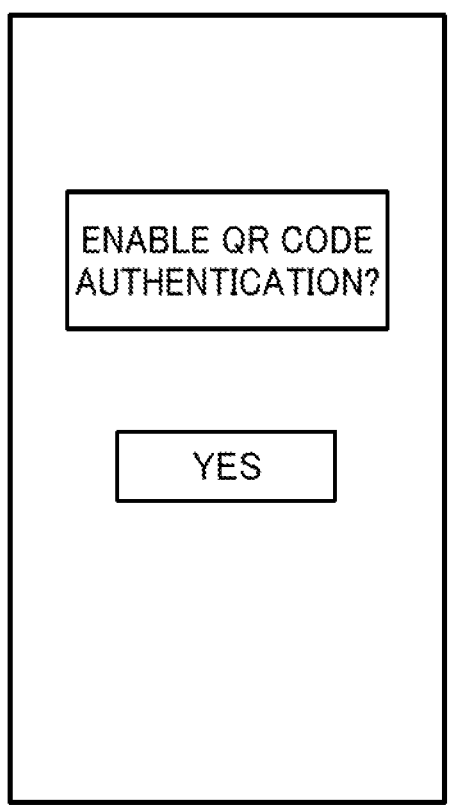
FIG. 5 is a diagram showing an example of a QR code (registered trademark) authentication enabling confirmation screen.
Figure 6D:
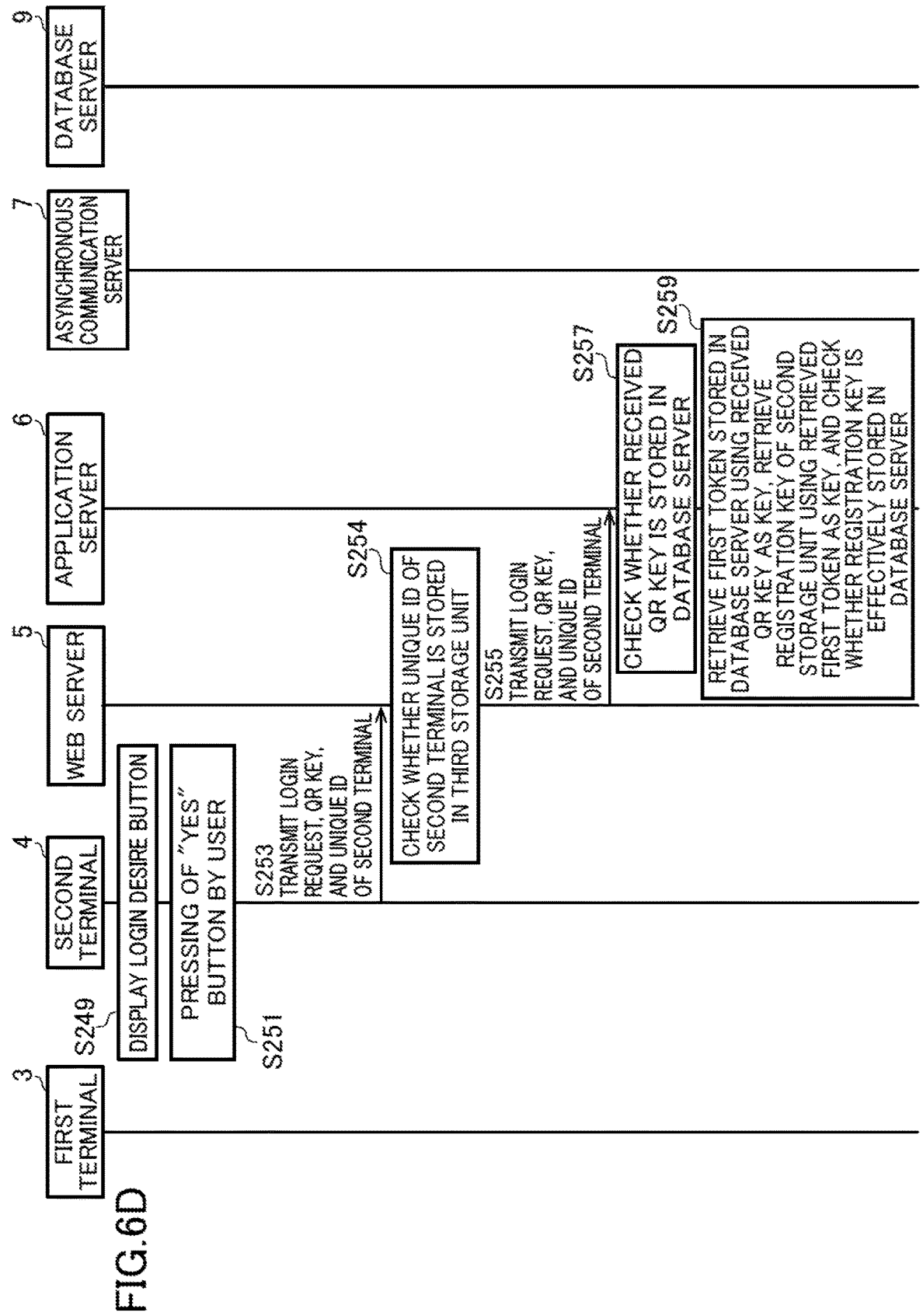
FIG. 6D is a sequence chart of the example of the QR code (registered trademark) authentication processing.
Figure 6E:
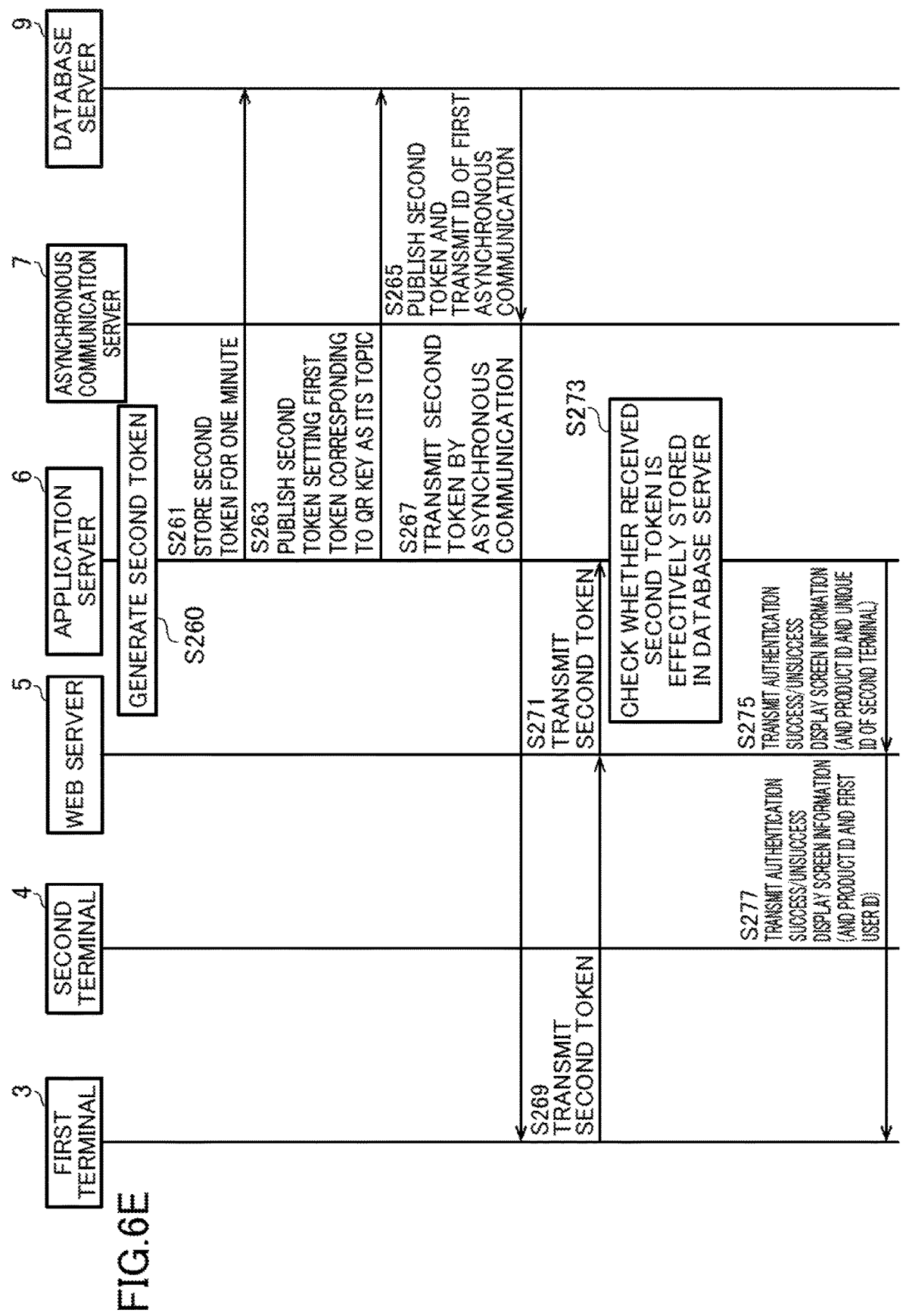
FIG. 6E is a sequence chart of the example of the QR code (registered trademark) authentication processing.
Figure 6F:
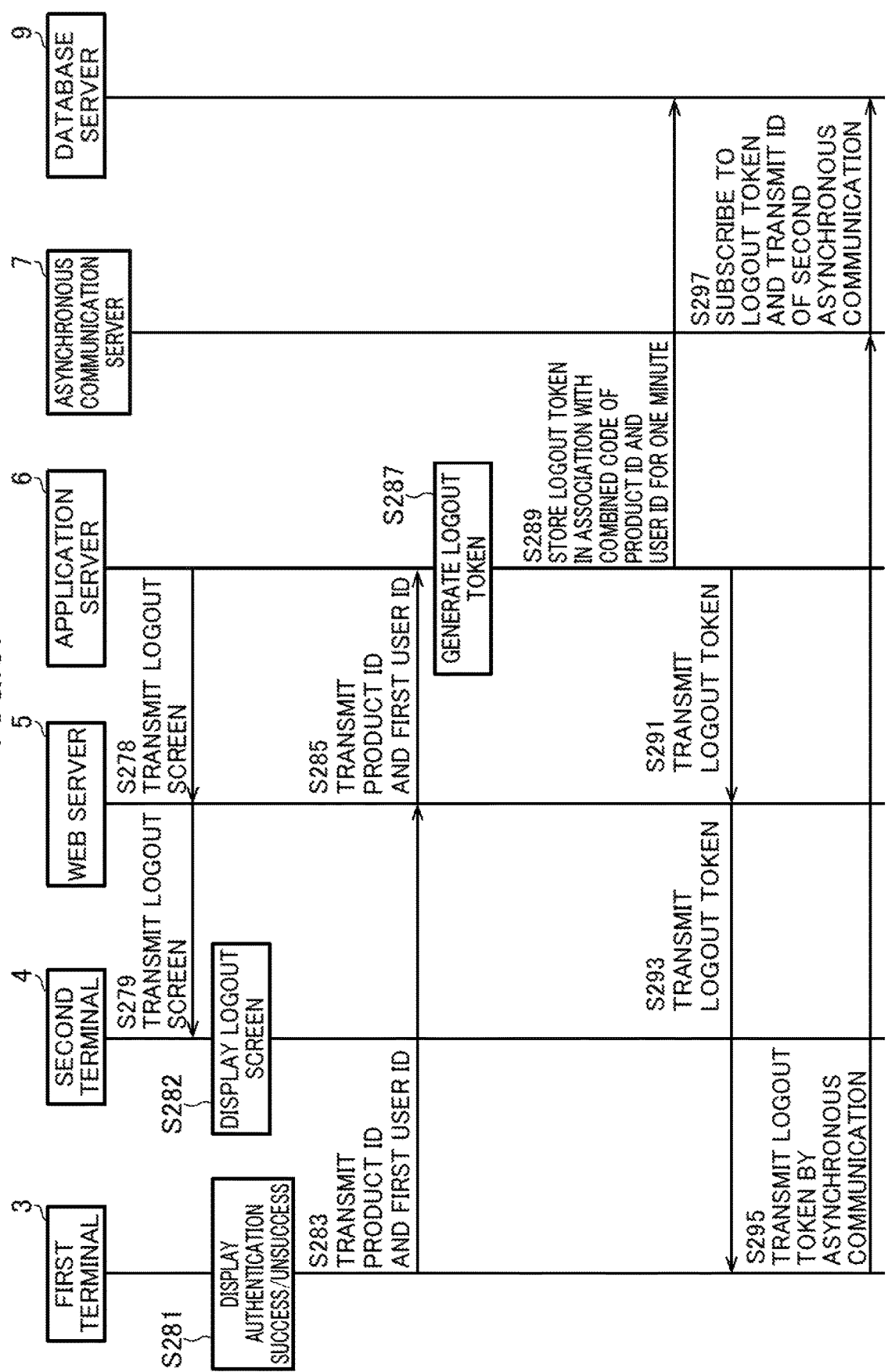
FIG. 6F is a sequence chart of the example of the QR code (registered trademark) authentication processing.

FIG. 4 is a sequence chart of an example of processing for enabling QR code (registered trademark) authentication, which is preparation processing for QR code (registered trademark) authentication, which is an authentication method of the present invention. FIG. 5 is a diagram showing an example of a QR code (registered trademark) authentication enabling confirmation screen.

A first user ID, a password, and a second user ID are stored in the third storage unit 240 of the web server 5 in association with one another. The user accesses the web server 5 from the second terminal 4 (S201). Then, an input screen for a first user ID, which is identification information, and a password are transmitted from the web server 5 to the second terminal 4 (S203). When the user inputs the first user ID and the password, the first user ID and the password are transmitted to the web server 5 (S205). When matching of the first user ID and the password (S207) is successful, a confirmation screen for confirming whether to enable QR code (registered trademark) authentication is transmitted from the web server 5 to the second terminal 4 (S209). When a "Yes" button is pressed by the user (S211), the second terminal 4 reads out or generates a unique ID of the second terminal 4 and transmits a QR code (registered trademark) authentication enabling request and the unique ID of the second terminal 4 to the web server 5 (S213). When receiving the QR code (registered trademark) authentication enabling request, the web server 5 stores in the third storage unit 240 of the web server 5 a QR code (registered trademark) authentication enabling flag and the received unique ID of the second terminal 4 in association with the first user ID, the password, and the second user ID stored in the third storage unit 240 of the web server 5 and enable QR code (registered trademark) authentication (S215). The web server 5 may perform the generation of the unique ID of the second terminal 4.

<QR Code (Registered Trademark) Authentication>

Figure 7:
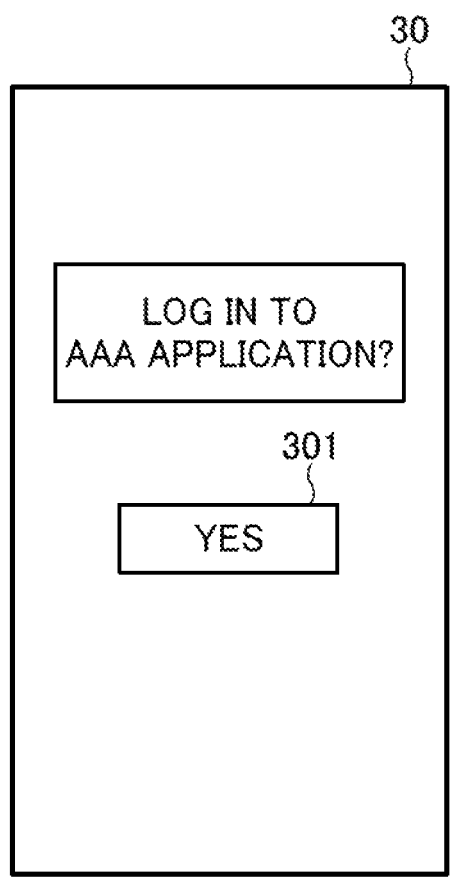
FIG. 7 is a diagram showing an example of a login screen.
Figure 8D:
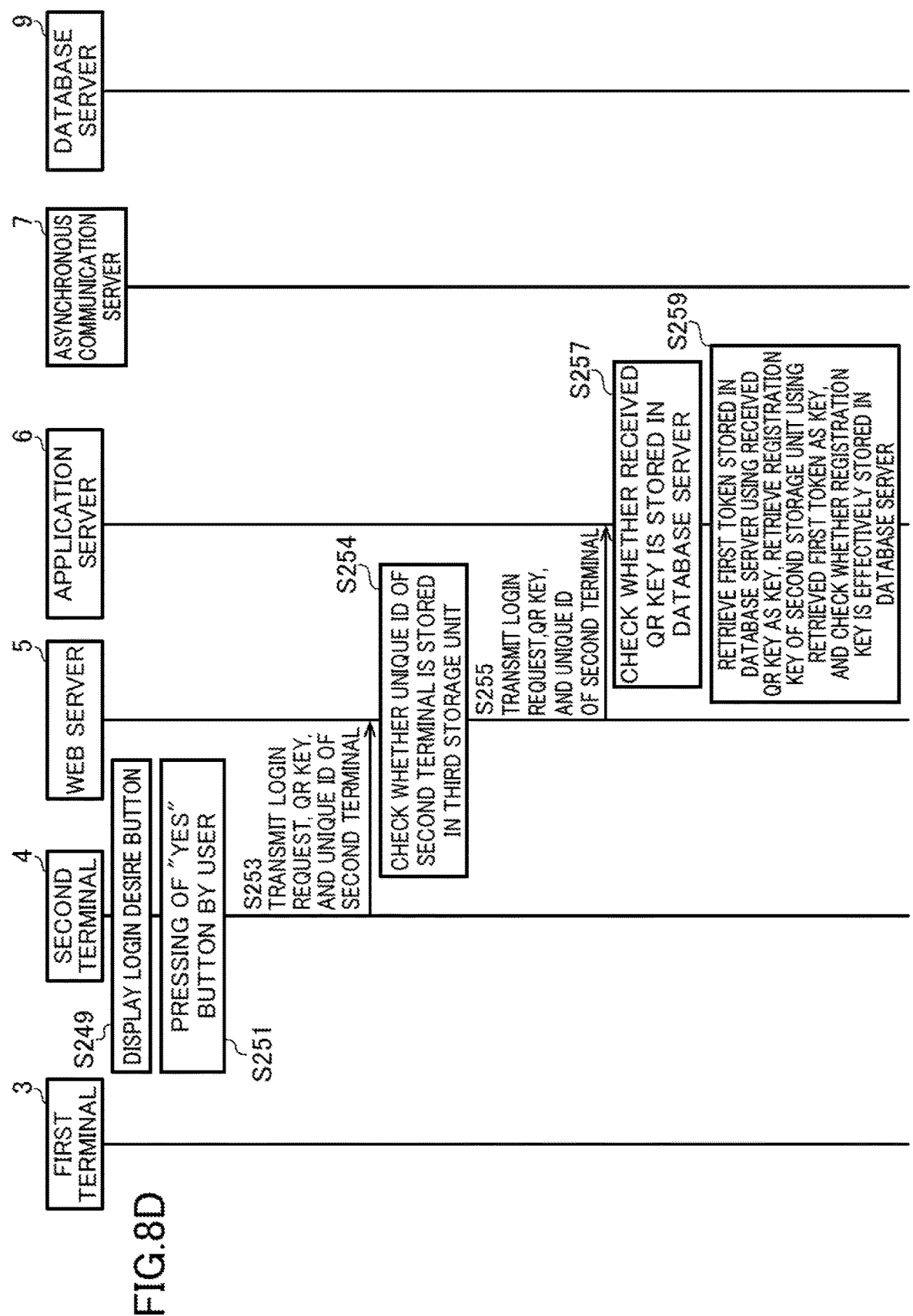
FIG. 8D is a sequence chart of the example of the QR code (registered trademark) authentication processing.
Figure 9A:
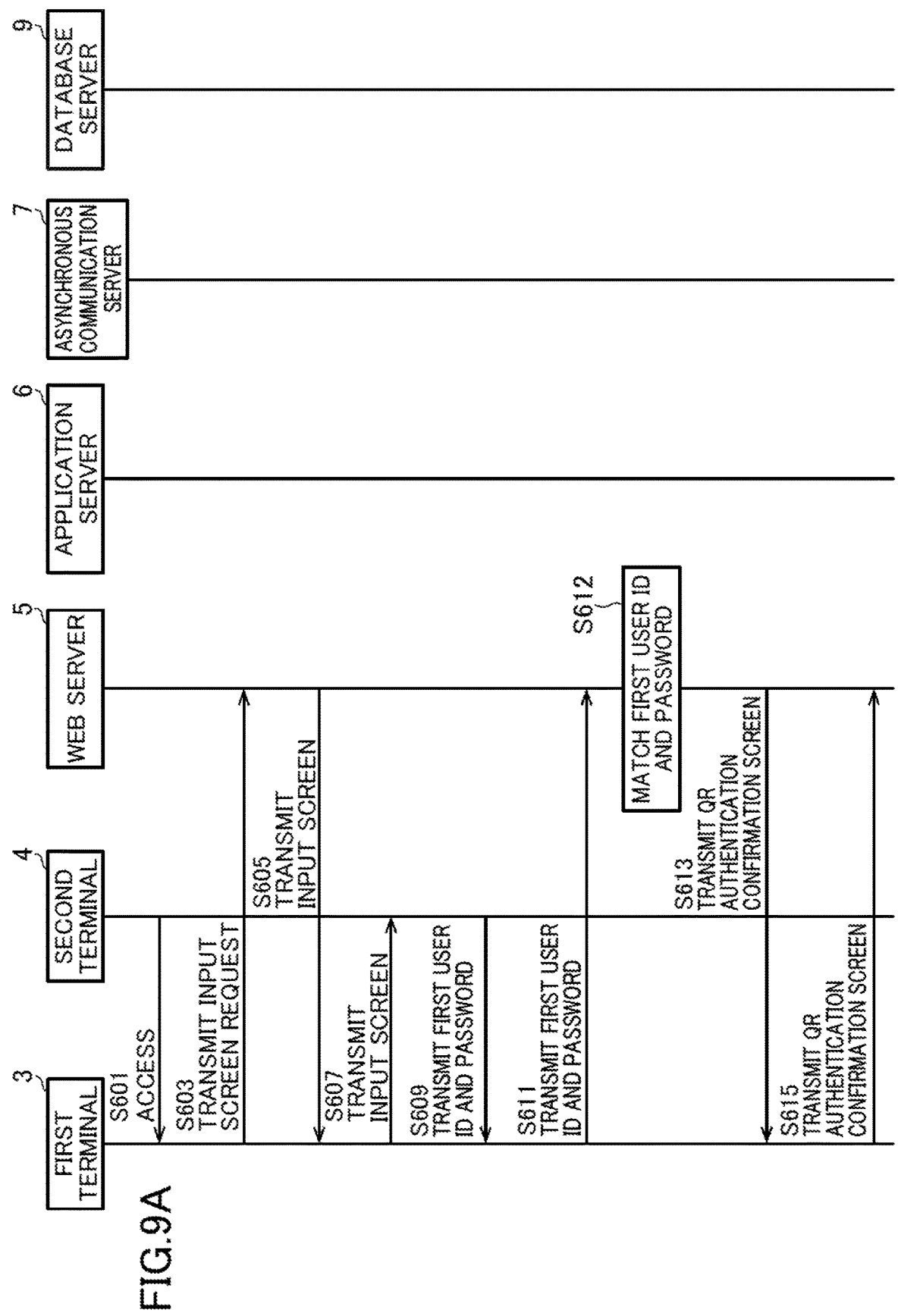
FIG. 9A is a diagram showing an example of QR code (registered trademark) authentication enabling confirmation screen.
Figure 10D:
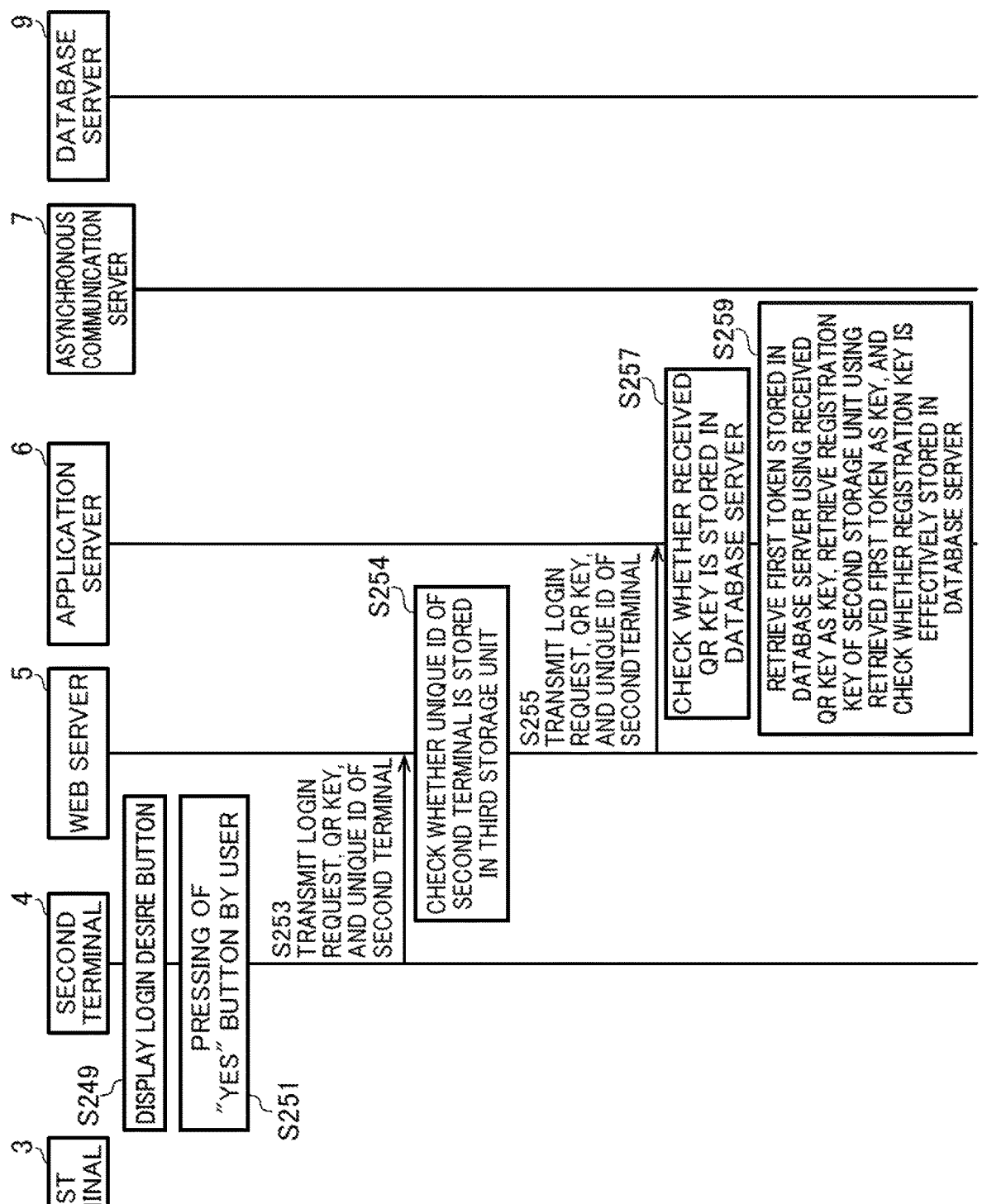
FIG. 10D is a part of the sequence chart of the example of the QR code (registered trademark) authentication processing.

FIGS. 6A to 6D are sequence charts of an example of QR code (registered trademark) authentication processing. FIG. 7 is a diagram showing an example of a login screen.

The QR code (registered trademark) authentication processing is performed at a predetermined time after the enabling processing for the QR code (registered trademark) authentication ends once. However, the QR code (registered trademark) authentication processing may be performed continuously from the enabling processing for the QR code (registered trademark) authentication.

The user accesses the web server 5, which provides an application that the user desires to execute, from the first terminal 3 (S217). Then, a login screen 30 embedded with a product ID for specifying the application that the user desires to execute is transmitted from the web server 5 to the first terminal 3 (S219). The first terminal 3 displays a login screen.

A login button is displayed on the login screen (S221).

When the login button is pressed by the user as a trigger for an authentication start to the first terminal 3, the first terminal 3 transmits a QR code (registered trademark) authentication start request and the product ID embedded in the login screen, which is authentication start trigger information, to the web server 5 (S223). The authentication start trigger information is not limited to the product ID and may be any other appropriate information.

The web server 5 transmits the received QR code (registered trademark) authentication start request and the received product ID to the application server 6 (S225).

A product ID, for which login is permitted, is registered in advance in the second storage unit 239 of the application server 6. When receiving the QR (registered trademark) authentication start request from the web server 5, the application server 6 (the QR-code (registered trademark)-authentication-start-request accepting unit 210) checks whether the product ID received together with the QR code (registered trademark) authentication start request is stored in the second storage unit 239 of the application server 6 and checks whether the product ID is a product ID registered in advance (S226). When a check result is affirmative, the application server 6 (the first-token generation unit 211) generates a one-time first token (S227). The application server 6 (the registration-key generation unit 213) generates, as a one-time registration key, a hash value of data including the generated first token and the receive product ID, effectively stores the registration key in the database server 9 (the first storage unit 243) for the predetermined short time, e.g., one minute (S229), and stores in the second storage unit 239 of the application server 6 the registration key in association with the first token. A generation method for the registration key is not limited to this and may be any other appropriate method for generating a code. The application server 6 (the QR-key generation unit 215) generates a one-time QR key (S231) and effectively stores in the database server 9 (the first storage unit 243) the QR key in association with the first token and the product ID for the predetermined short time, for example, one minute (S233). Subsequently, the application server 6 (the QR-code (registered trademark) generation unit 217) generates a QR code (registered trademark) including the generated QR key and stores the QR code (registered trademark) at a predetermined URL of the second storage unit 239 of the application server 6 (S235). The check concerning whether the product ID received in step S226 is a product ID registered in advance may be omitted. The first token may be generated by another appropriate server.

Subsequently, the application server 6 transmits a URL (a QR code (registered trademark) URL) in which the first token and the QR code (registered trademark) are stored to the web server 5 (S239). The web server 5 transmits the received first token and the received QR code (registered trademark) URL to the first terminal 3 (S241). The application server 6 and the web server 5 are equivalent to the URL transmitting unit 221.

The first terminal 3 accesses the received QR code (registered trademark) URL, acquires the QR code (registered trademark), and displays the QR code (registered trademark) on the screen of the first terminal 3 (S243), and transmits the received first token to the asynchronous communication server 7 (the asynchronous communication unit 223) by the asynchronous communication (S245). As a method of the asynchronous communication, any appropriate method such as Websocket may be used. By using the asynchronous communication, for example, polling by the web server 5 is unnecessary. Therefore, it is possible to reduce a waiting load of the web server 5 and greatly reduce a time required for authentication.

The asynchronous communication server 7 (the asynchronous communication unit 223) subscribes to the first token received from the first terminal 3 as a topic from the database server 9 (the information transmitting and receiving unit 241) and transmits, to the database server 9 (the information transmitting and receiving unit 241), an ID (when asynchronous communication is Websocket, a socket ID) of the first asynchronous communication between the asynchronous communication server 7 (the asynchronous communication unit 223) and the first terminal 3. That is, the asynchronous communication server 7 (the asynchronous communication unit 223) registers the first token received from the first terminal 3 in the database server 9 (the information transmitting and receiving unit 241) as a key and transmits, to the database server 9 (the information transmitting and receiving unit 241), the ID of the first asynchronous communication between the asynchronous communication server 7 (the asynchronous communication unit 223) and the first terminal 3 (S246). The database server 9 (the information transmitting and receiving unit 241) stores in the first storage unit 243 the first token and the ID of the first asynchronous communication received from the asynchronous communication server 7 (the asynchronous communication unit 223) in association with each other (S247).

The user causes the second terminal 4 to read the QR code (registered trademark) displayed on the first terminal 3. The second terminal 4 reads the QR code (registered trademark) and acquires the QR key included in the QR code (registered trademark) (S248). Subsequently, the second terminal 4 displays, on the screen 30 of the second terminal 4, indication of "log in?" (step S249).

When the "Yes" button 301 is pressed by the user (S251), the second terminal 4 transmits the login request, the acquired QR key, and the unique ID of the second terminal 4 read out or generated in step S213 to the web server 5 (the login-request accepting unit 225) (S253).

When receiving the login request transmitted from the second terminal 4, the web server 5 (the second-terminal-unique-ID matching unit 227) checks whether the unique ID of the second terminal 4 received together with the login request is stored in the third storage unit 240 of the web server 5 (S254).

When a check result in step S254 is "affirmative" and the received unique ID of the second terminal 4 is stored in the third storage unit 240 of the web server 5, the web server 5 transmits the received login request and the received QR key to the application server 6 (S255).

When receiving the login request transmitted from the web server 5, the application server 6 (the QR-key matching unit 229) checks whether the QR key received together with the login request is stored in the database server 9 (the first storage unit 243) (S257). When a check result is affirmative, the application server 6 (the QR-key matching unit 229) retrieves the first token stored in the database server 9 (the first storage unit 243) using the QR key received together with the login request as a key, retrieves the registration key stored in the second storage unit 239 of the application server 6 using the retrieved first token as a key, and checks whether the registration key acquired as a result of the retrieval is effectively stored in the database server 9 (the first storage unit 243) (S259). The generation of the registration key and the check concerning whether the registration key is effectively stored in the database server 9 (the first storage unit 243) may be omitted.

When the check result in step S257 is affirmative and the registration key is effectively stored in the database server 9 (the first storage unit 243), the application server 6 (the second-token generation unit 231) generates a one-time second token and effectively stores the second token in the database server 9 (the first storage unit 243) for the predetermined short time, for example, one minute (S261). The second token may be generated by another appropriate server.

The application server 6 (the second-token transmitting unit 233) publishes the generated second token to the database server 9 (the information transmitting and receiving unit 241) setting the first token retrieved by the application server 6 (the QR-key matching unit 229) as its topic. That is, the application server 6 (the second-token transmitting unit 233) transmits the generated second token to the database server 9 (the information transmitting and receiving unit 241) using the first token retrieved by the application server 6 (the QR-key matching unit 229) as a key (S263). For example, when the retrieval or the like of the registration key performed using the first token as a key in step S259 is omitted, the retrieval of the first token performed using the QR key as a key may be performed by the application server 6 (the second-token transmitting unit 233). The database server 9 (the information transmitting and receiving unit 241) publishes, according to the reception of the second token as whose topic the first token is set, the second token to the asynchronous communication server 7 (the asynchronous communication unit 223) that subscribes to the first token as the topic. At the same time, the database server 9 (the information transmitting and receiving unit 241) transmits the ID of the first asynchronous communication associated with the first token stored in the first storage unit 243 to the asynchronous communication server 7 (the asynchronous communication unit 223). That is, the database server 9 (the information transmitting and receiving unit 241) transmits the second token and the ID of the first asynchronous communication associated with the first token to the asynchronous communication server 7 (the asynchronous communication unit 223) that registers the first token as a key (S265). Note that a configuration in which the asynchronous communication server 7 (the asynchronous communication unit 223) registers the first token received from the first terminal 3 as a key in the database server 9 (the information transmitting and receiving unit 241), the application server 6 (the second-token transmitting unit 233) transmits the second token to the database server 9 (the information transmitting and receiving unit 241) using the first token retrieved by the application server 6 (the QR-key matching unit 229 or the second-token transmitting unit 233) as a key, and the database server 9 (the information transmitting and receiving unit 241) transmits the second token to the asynchronous communication server 7 (the asynchronous communication unit 223) that registers the first token as a key is not limited to the configuration in the embodiment and may be any other appropriate configuration.

The asynchronous communication server 7 (the asynchronous communication unit 223) transmits, as a first response code for ending the asynchronous communication, the received second token to the first terminal 3 by the asynchronous communication on the basis of the received ID of the asynchronous communication (S267).

The first terminal 3 transmits the second token received from the asynchronous communication server 7 to the web server 5 (S269).

The web server 5 receives the second token from the first terminal 3 and transmits the received second token to the application server 6 (S271). The web server 5 and the application server 6 are equivalent to the second-token accepting unit 235.

The application server 6 (the second-token confirming unit 237) checks whether the second token received from the web server 5 is effectively stored in the database server 9 (the first storage unit 243) (S273). As explained above, the second token stored in the database server 9 (the first storage unit 243) is effectively stored for the predetermined short time. Therefore, the check result is "negative" after one minute elapses from the storage in the database server 9 (the first storage unit 243).

The application server 6 performs processing corresponding to the check result. That is, when the check result is "affirmative", the application server 6 transmits information for displaying a screen indicating that the authentication is successful to the web server 5. When the check result is "negative", the application server 6 transmits information for displaying a screen indicating that the authentication is unsuccessful to the web server 5 (S275). At this time, when the information for displaying the screen indicating that the authentication is successful is transmitted, the product ID and the unique ID of the second terminal 4 are also transmitted.

The web server 5 transmits the received information for displaying the screen indicating that the authentication is successful or unsuccessful to the first terminal 3 (S277). At this time, when the information for displaying the screen indicating that the authentication is successful is transmitted, the product ID and the first user ID stored in the third storage unit 240 of the web server 5 in association with the unique ID of the second terminal 4, which are the logout trigger information, are also transmitted. The information for displaying the screen indicating that the authentication is successful also has a function of a logout preparation request. The web server 5 and the application server 6 are equivalent to the post-authentication processing unit 238.

On the other hand, when the information for displaying the screen indicating that the authentication is successful is transmitted, the application server 6 transmits a logout desire input screen to the web server 5 (S278). The web server 5 transmits the received logout desire input screen to the second terminal 4 (S279). The second terminal 4 displays indication of "log out?" on the screen 30 of the second terminal 4 for the predetermined short time, for example, one minute (S282).

When receiving the information for displaying the screen indicating that the authentication is successful or unsuccessful, the first terminal 3 displays on the screen to the effect that the authentication is successful or unsuccessful (S281). At the same time, when receiving the information for displaying the screen indicating that the authentication is successful, the first terminal 3 transmits the received product ID and the received first user ID to the web server 5 (S283).

The web server 5 transmits the received product ID and the received first user ID to the application server 6 (the logout-trigger-information accepting unit 245) (S285).

When receiving the product ID and the first user ID from the web server 5, the application server 6 (the logout-token generation unit 247) generates a one-time logout token (S287). The application server 6 (the logout-token generation unit 247) effectively stores in the database server 9 (the first storage unit 243) a code obtained by combining the product ID and the first user ID and the logout token in association with each other for the predetermined short time, for example, one minute (S289). The logout token may be generated by any other appropriate server.

Subsequently, the application server 6 transmits the logout token to the web server 5 (S291). The web server 5 transmits the received logout token to the first terminal 3 (S293). The application server 6 and the web server 5 are equivalent to the logout-token transmitting unit 249.

The first terminal 3 transmits the received logout token to the asynchronous communication server 7 (the asynchronous communication unit 223) by the asynchronous communication (S295).

The asynchronous communication server 7 (the asynchronous communication unit 223) subscribes to the logout token received from the first terminal 3 as a topic from the database server 9 (the information transmitting and receiving unit 241) and transmits an ID of the second asynchronous communication between the asynchronous communication server 7 (the asynchronous communication unit 223) and the first terminal 3 to the database server 9 (the information transmitting and receiving unit 241). That is, the asynchronous communication server 7 (the asynchronous communication unit 223) registers the logout token received from the first terminal 3 in the database server 9 (the information transmitting and receiving unit 241) as a key and transmits the ID of the second asynchronous communication between the asynchronous communication server 7 (the asynchronous communication unit 223) and the first terminal 3 to the database server 9 (the information transmitting and receiving unit 241) (S297). The database server 9 (the information transmitting and receiving unit 241) stores in the first storage unit 243 the logout token received from the asynchronous communication server 7 (the asynchronous communication unit 223) and the ID of the second asynchronous communication in association with each other (S299).

The second terminal 4 displays indication of "log out?" on the screen 30 of the second terminal 4 (S299).

When the "Yes" button is pressed by the user (S301), the second terminal 4 transmits a logout request and the unique ID of the second terminal 4, which is the logout trigger preparation information, to the web server 5 (the logout-trigger-preparation-information accepting unit 251) (S305).

When receiving the logout request, the web server 5 (the logout-trigger-preparation-information accepting unit 251) acquires, from the third storage unit 240, the first user ID and the product ID stored in association with the unique ID of the second terminal 4 received together with the logout request (S307) and transmits the first user ID and the product ID to the application server 6 (S309).

When receiving the first user ID and the product ID transmitted from the web server 5, the application server 6 (the logout-token acquisition unit 253) retrieves the logout token stored in the database server 9 (the first storage unit 243) using a code obtained by combining the product ID and the first user ID as a key and acquires the logout token (S311).

The application server 6 (the second-response-code transmitting unit 255) publishes a value "true", which is a second response code for ending the asynchronous communication, to the database server 9 (the information transmitting and receiving unit 241) setting the acquired logout token as its topic. That is, the application server 6 (the second-response-code transmitting unit 255) transmits the value "true", which is the second response code, to the database server 9 (the information transmitting and receiving unit 241) using the acquired logout token as a key (S313). The database server 9 (the information transmitting and receiving unit 241) publishes, according to reception of the value "true" as whose topic the logout token is set, the value "true" to the asynchronous communication server 7 (the asynchronous communication unit 223) that subscribes to the logout token as the topic. At the same time, the database server 9 (the information transmitting and receiving unit 241) transmits the ID of the second asynchronous communication associated with the logout token stored in the first storage unit 243 to the asynchronous communication server 7 (the asynchronous communication unit 223). That is, the database server 9 (the information transmitting and receiving unit 241) transmits the ID of the second asynchronous communication associated the value "true" and the logout token to the asynchronous communication server 7 (the asynchronous communication unit 223) that registers the logout token as the key (S315). Note that a configuration in which the asynchronous communication server 7 (the asynchronous communication unit 223) registers the logout token received from the first terminal 3 in the database server 9 (the information transmitting and receiving unit 241) as a key, the application server 6 (the logout-token transmitting unit 249) transmits the value "true" to the database server 9 (the information transmitting and receiving unit 241) using the logout token retrieved and acquired by the application server 6 (the logout-token acquisition unit 253) as a key, and the database server 9 (the information transmitting and receiving unit 241) transmits the value "true" to the asynchronous communication server 7 (the asynchronous communication unit 223) that registers the logout token as the key is not limited to the configuration in the embodiment explained above and may be any other appropriate configuration.

The asynchronous communication server 7 (the asynchronous communication unit 223) transmits the received value "true" to the first terminal 3 by the asynchronous communication on the basis of the received ID of the second asynchronous communication (S317).

When receiving the value "true", the first terminal 3 displays on the screen to the effect that the user logs out (S319).

In the embodiment, the second terminal reads the QR code (registered trademark) displayed on the first terminal, whereby the authentication is performed. However, what is read by the second terminal is not limited to the QR code (registered trademark). Any other appropriate code image such as a barcode, a color code (registered trademark), a character string, or a graphic sign may be used.

In the embodiment, the first token, the registration key, the QR key, and the second token are effectively stored in the first storage unit 243 for the predetermined short time. However, a time in which the first token, the registration key, the QR key, and the second token are effectively stored in the first storage unit 243 is not limited to this and may be any other appropriate time.

In the embodiment, when the various kinds of information are stored in any one of the first storage unit 243, the second storage unit 239, and the third storage unit 240, the various kinds of information may be stored in any other appropriate storage unit. For example, in step S233, the application server 6 (the QR-key generation unit 215) effectively stores in the database server 9 (the first storage unit 243) the QR key in association with the first token and the product ID for the predetermined short time, for example, one minute. However, the application server 6 (the QR-key generation unit 215) may effectively store in any other appropriate storage unit such as the second storage unit 239 of the application server 6 or the third storage unit 240 of the web server 5, the QR key in association with the first token and the product ID for the predetermined short time.

In the embodiment, the first token, the registration key, the QR key, and the second token are the one-time ID and the one-time key. However, the first token, the registration key, the QR key, and the second token may be a non-one-time ID and a non-one-time key.

In the embodiment, the configuration is adopted in which the second token generated by the application server 6 (the second-token generation unit 231) is used as the response code for ending the asynchronous communication transmitted from the asynchronous communication server 7 to the first terminal 3 by the asynchronous communication, the first terminal 3 receives the second token, and the application server 6 checks authenticity of the second token received by the first terminal 3. However, any other appropriate code may be used as the response code for ending the asynchronous communication. A configuration may be adopted in which the authentication is regarded as successful as the first terminal 3 receives the response code for ending the asynchronous communication from the asynchronous communication server 7.

In the embodiment, the authentication during the login is explained as an example. However, the present invention is not limited to the authentication during the login. It goes without saying that the present invention is widely applicable to authentication in general such as entrance and exit control for room.

According to this embodiment, it is possible to realize a simple authentication method that does not require input of a user ID by the user during authentication.

According to this embodiment, the QR code (registered trademark) is read instead of the input of the first user ID by the user in the second terminal during authentication. Further, the configuration for enabling the asynchronous communication not requiring polling of the web server in the authentication processing of the first terminal is adopted. Therefore, it is possible to greatly reduce a time required for the authentication.

According to this embodiment, the QR code (registered trademark) input to the second terminal during authentication is generated on the basis of the one-time QR code. Therefore, it is possible to realize an authentication method with strong security.

According to this embodiment, the authentication processing is performed using the one-time first token and the one-time registration key in addition to the one-time QR key. Therefore, it is possible to realize an authentication method with stronger security.

According to this embodiment, the one-time second token is generated and matching is performed concerning the second token in addition to the matching processing by the one-time QR key, the one-time first token, and the one-time registration key. Therefore, it is possible to realize an authentication method with stronger security.

According to this embodiment, further, the effective time is provided for the first token, the registration key, the QR key, and the second token. Therefore, it is possible to realize an authentication method with stronger security.

According to this embodiment, the logout is possible for the predetermined short time after the display of the authentication success. Therefore, it is possible to cancel login and log out, for example, when a suspicious situation occurs during the display of the authentication success. Therefore, it is possible to realize an authentication method with stronger security.

Second Embodiment

In a second embodiment, the first terminal in the first embodiment is a standalone game device. A second user ID different from a first user ID input from a second terminal in enabling processing for QR code (registered trademark) authentication is associated with a second token. The second user ID is returned to the first terminal when authentication is successful.

FIGS. 8A to 8E are parts of a sequence chart of an example of push authentication processing according to the second embodiment of the present invention. An example of an authentication system and authentication processing of the authentication system according to the second embodiment of the present invention is explained with reference to FIGS. 8A to 8E and the like. In FIGS. 8A to 8E, portions corresponding to the portions shown in FIGS. 2 and 6A to 6D are denoted by the same reference numerals and signs. Redundant explanation of the explanation of the first embodiment is omitted. An overall configuration, a functional configuration, and a hardware configuration of the authentication system according to the second embodiment are the same as those of the authentication system according to the first embodiment. Therefore, explanation thereof is omitted.

The second-token generation unit 231 acquires a second user ID stored in the third storage unit 240 in association with a unique ID of the second terminal 4 or a second user ID stored in the second storage unit 239 in association with a first token, stores the second user ID in the second storage unit 239, generates a one-time second token, and effectively stores in the first storage unit 243 the second token and the second user ID in association with each other for a predetermined short time. A configuration for "effectively storing the second token" may be, as explained above, a configuration in which the stored second token is erased after the predetermined short time or a configuration in which an effective time of the second token is the predetermined short time.

The second-token confirming unit 237 retrieves the second user ID stored in the first storage unit 243 using the received second token as a key.

When the second user ID is acquired as a result of the retrieval by the second-token confirming unit 237, the post-authentication processing unit 238 transmits the retrieved second user ID to the first terminal 3.

The other functional components are the same as the functional components in the first embodiment. Therefore, explanation of the functional components is omitted.

An example of authentication processing of the authentication system according to the second embodiment of the present invention is explained below based on the system configuration explained above.

Enabling processing for QR code (registered trademark) authentication (steps S201 to S215) is the same as the enabling processing in the first embodiment. Therefore, explanation of the enabling processing is omitted.

When a play button is pressed by a user, the first terminal 3 transmits a QR code (registered trademark) authentication start request, a product ID, a housing ID, and a player number to the web server 5 (S401).

The web server 5 transmits the received QR code (registered trademark) authentication start request, the received product ID, the received housing ID, and the received player number to the application server 6 (S403).

When receiving the QR code (registered trademark) authentication start request from the web server 5, the application server 6 (the QR-code (registered trademark)-authentication-start-request accepting unit 210) checks whether the product ID received together with the QR code (registered trademark) authentication start request is stored in the second storage unit 239 of the application server 6 and checks whether the product ID is a product ID registered in advance (S404). When a check result is affirmative, the application server 6 (the first-token generation unit 211) generates a one-time first token (S405). The application server 6 (the registration-key generation unit 213) generates, as a registration key, a hash value of data including the generated first token, the product ID, the housing ID, and the player number (S406), effectively stores the registration key in the database server 9 (the first storage unit 243) for the predetermined short time, for example, one minute (S407), and stores in the second storage unit 239 of the application server 6 the product ID, the housing ID, the player number, the first token, and the registration key in association with one another (S408). The application server 6 (the QR-key generation unit 215) generates a one-time QR key (S409) and effectively stores in the database server 9 (the first storage unit 243) the QR key in association with the first token, the housing ID, and the player number for the predetermined short time, for example, one minute (S410). Subsequently, the application server 6 (the QR-code (registered trademark) generation unit 217) generates a QR code (registered trademark) including the generated QR key and stores the QR code (registered trademark) at a predetermined URL of the second storage unit 239 of the application server 6 (S411).

Subsequently, the same processing as the processing in steps S239 to S259 in the first embodiment is performed. That is, the application server 6 transmits the first token and the URL at which the QR code (registered trademark) is stored (a QR code (registered trademark) URL) to the web server 5 (S239). The web server 5 transmits the received first token and the received QR code (registered trademark) URL to the first terminal 3 (S241). The application server 6 and the web server 5 are equivalent to the URL transmitting unit 221.

The first terminal 3 accesses the received QR code (registered trademark) URL, acquires the QR code (registered trademark), displays the QR code (registered trademark) on the screen of the first terminal 3 (S243), and transmits the received first token to the asynchronous communication server 7 (the asynchronous communication unit 223) by the asynchronous communication (S245).

The asynchronous communication server 7 (the asynchronous communication unit 223) subscribes to the first token received from the first terminal 3 as a topic from the database server 9 (the information transmitting and receiving unit 241) and transmits the ID of the first asynchronous communication between the asynchronous communication server 7 (the asynchronous communication unit 223) and the first terminal 3 to the database server 9 (the information transmitting and receiving unit 241). That is, the asynchronous communication server 7 (the asynchronous communication unit 223) registers the first token received from the first terminal 3 in the database server 9 as a key and transmits the ID of the first asynchronous communication between the asynchronous communication server 7 (the asynchronous communication unit 223) and the first terminal 3 to the database server 9 (the information transmitting and receiving unit 241) (S246). The database server 9 (the information transmitting and receiving unit 241) stores in the first storage unit 243 the first token and the ID of the first asynchronous communication received from the asynchronous communication server 7 (the asynchronous communication unit 223) (S247).

The user causes the second terminal 4 to read the QR code (registered trademark) displayed on the first terminal 3. The second terminal 4 reads the QR code (registered trademark) and acquires the QR key included in the QR code (registered trademark) (S248). Subsequently, the second terminal 4 displays indication of "log on?" on the screen of the second terminal 4 (S249).

When the "Yes" button is tapped by the user (S251), the second terminal 4 transmits the login request, the acquired QR key, and the unique ID of the second terminal 4 read out or generated in step S213 to the web server 5 (the login-request accepting unit 225) (S253).

When receiving the login request transmitted from the second terminal 4, the web server 5 (the second-terminal-unique-ID matching unit 227) checks whether the unique ID of the second terminal 4 received together with the login request is stored in the third storage unit 240 of the web server 5 (S254).

When a check result in step S254 is "affirmative" and the received unique ID of the second terminal 4 is stored in the third storage unit 240 of the web server 5, the web server 5 transmits the received login request, the received QR key, and the unique ID of the second terminal 4 to the application server 6 (S255).

When receiving the login request transmitted from the web server 5, the application server 6 (the QR-key matching unit 229) checks whether the QR key received together with the login request is stored in the database server 9 (the first storage unit 243) (S257). When a check result is affirmative, the application server 6 (the QR-key matching unit 229) retrieves the first token stored in the database server 9 (the first storage unit 243) using the QR key received together with the login request as a key, retrieves the registration key stored in the second storage unit 239 of the application server 6 using the retrieved first token as a key, and checks whether the registration key acquired as a result of the retrieval is effectively stored in the database server 9 (the first storage unit 243) (S259).

When the check result in step S257 is affirmative and the registration key is effectively stored in the database server 9 (the first storage unit 243), the application server 6 (the second-token generation unit 231) generates a one-time second token (S419). The application server 6 inquires the web server 5 about a second user ID stored in the third storage unit 240 corresponding to the unique ID of the second terminal 4 received in S255 (S421). The web server 5 returns the corresponding second user ID to the application server 6 (S423). The application server 6 (the second-token generation unit 231) effectively stores in the database server 9 (the first storage unit 243) the second token in association with the received second user ID for the predetermined short time, for example, one minute (S425). The second token may be generated by another appropriate server.

Subsequently, the same processing as the processing in steps S263 to S269 in the first embodiment is performed. That is, the application server 6 (the second-token transmitting unit 233) publishes the generated second token to the database server 9 (the information transmitting and receiving unit 241) setting the first token retrieved by the application server 6 (the QR-key matching unit 229) as its topic. That is, the application server 6 (the second-token transmitting unit 233) transmits the generated second token to the database server 9 (the information transmitting and receiving unit 241) using the first token retrieved by the application server 6 (the QR-key matching unit 229) as a key (S263). For example, when the retrieval or the like of the registration key performed using the first token as a key in step S259 is omitted, the retrieval of the first token performed using the QR key as a key may be performed by the application server 6 (the second-token transmitting unit 233). The database server 9 (the information transmitting and receiving unit 241) publishes, according to the reception of the second token as whose topic the first token is set, the second token to the asynchronous communication server 7 (the asynchronous communication unit 223) that subscribes to the first token as the topic. At the same time, the database server 9 (the information transmitting and receiving unit 241) transmits the ID of the first asynchronous communication associated with the first token stored in the first storage unit 243 to the asynchronous communication server 7 (the asynchronous communication unit 223). That is, the database server 9 (the information transmitting and receiving unit 241) transmits the second token and the ID of the first asynchronous communication associated with the first token to the asynchronous communication server 7 (the asynchronous communication unit 223) that registers the first token as a key (S265). Note that a configuration in which the asynchronous communication server 7 (the asynchronous communication unit 223) registers the first token received from the first terminal 3 as a key in the database server 9 (the information transmitting and receiving unit 241), the application server 6 (the second-token transmitting unit 233) transmits the second token to the database server 9 (the information transmitting and receiving unit 241) using the first token retrieved by the application server 6 (the QR-key matching unit 229 or the second-token transmitting unit 233) as a key, and the database server 9 (the information transmitting and receiving unit 241) transmits the second token to the asynchronous communication server 7 (the asynchronous communication unit 223) that registers the first token as a key is not limited to the configuration in the embodiment and may be any other appropriate configuration.

The asynchronous communication server 7 (the asynchronous communication unit 223) transmits, as a first response code for ending the asynchronous communication, the received second token to the first terminal 3 by the asynchronous communication on the basis of the received ID of the asynchronous communication (S267).

The first terminal 3 transmits the second token received from the asynchronous communication server 7 to the web server 5 (S269).

The web server 5 receives the second token from the first terminal 3 and transmits the received second token to the application server 6 (S271). The web server 5 and the application server 6 are equivalent to the second-token accepting unit 235.

When receiving the second token from the web server 5, the application server 6 (the second-token confirming unit 237) retrieves the second user ID stored in the database server 9 (the first storage unit 243) using the second token as a key (S427). It is possible to check, according to whether the second user ID is acquired as a result of the retrieval, whether the second token received from the web server 5 is effectively stored in the database server 9 (the first storage unit 243). That is, when the second user ID is acquired as a result of the retrieval, this means that the second token received from the web server 5 is effectively stored in the database server 9 (the first storage unit 243). When the second user ID is not acquired as a result of the retrieval, this means that the second token received from the web server 5 is not effectively stored in the database server 9 (the first storage unit 243). As explained above, the second token stored in the database server 9 (the first storage unit 243) is the second token effectively stored for the predetermined short time. Therefore, the second user ID is not acquired as a result of the retrieval after one minute elapses from the storage in the database server 9 (the first storage unit 243).

The application server 6 performs processing corresponding to a retrieval result. That is, when the second user ID is acquired as a result of the retrieval, the application server 6 transmits the second user ID to the web server 5 (S431). The web server 5 transmits the received second user ID to the first terminal 3 (S433). When receiving the second user ID, the first terminal 3 starts a game (S435).

On the other hand, when the second user ID is not acquired as a result of the retrieval, the application server 6 transmits information for displaying a screen indicating that the authentication is unsuccessful to the web server 5. The web server 5, which receives the information, transmits the information to the first terminal 3. The application server 6 and the web server 5 are equivalent to the post-authentication processing unit 238.

According to this embodiment, it is possible to perform login using the second user ID different from the first user ID input from the second terminal in the enabling processing for the QR code (registered trademark) authentication.

Third Embodiment

In a third embodiment, whereas the trigger of the authentication start to the first terminal in the second embodiment is the operation on the first terminal by the user, the trigger is a communication start between an IC-chip mounted device such as an IC card of the user and the first terminal.

FIGS. 9A to 10E are parts of a sequence chart of an example of push authentication processing according to a third embodiment of the present invention. An example of an authentication system and authentication processing of the authentication system according to the third embodiment of the present invention is explained with reference to FIGS. 9A to 10E and the like. In FIGS. 9A to 10E, portions corresponding to the portions shown in FIG. 4, FIGS. 6A to 6D, and FIGS. 8A to 8F are denoted by the same reference numerals and signs. Redundant explanation of the explanation of the first and second embodiments is omitted. An overall configuration, a functional configuration, and a hardware configuration of the authentication system according to the third embodiment are the same as those of the authentication system according to the second embodiment. Therefore, explanation thereof is omitted.

An example of authentication processing of the authentication system according to the third embodiment of the present invention is explained below based on the system configuration explained above.

<Enabling Processing for QR Code (Registered Trademark) Authentication>

In the third storage unit 240 of the web server 5, a first user ID, a password, and a second user ID are stored in association with one another. A user accesses the first terminal 3 from the second terminal 4 through Bluetooth (registered trademark) or the like (S601). The first terminal 3 transmits an input screen request to the web server 5 (S603). Then, an input screen of the first user ID and the password is transmitted from the web server 5 to the first terminal 3 (S605) and further transmitted from the first terminal 3 to the second terminal 4 (S607). When the user inputs the first user ID and the password to the second terminal 4, the user ID and the password are transmitted to the first terminal 3 (S609) and further transmitted from the first terminal 3 to the web server 5 (S611). When matching of the first user ID and the password (S612) is successful, a confirmation screen for confirming whether to enable QR code (registered trademark) authentication is transmitted from the web server 5 to the first terminal 3 (S613) and further transmitted from the first terminal 3 to the second terminal 4 (S615). When a "Yes" button is pressed by the user (S617), the second terminal 4 reads out or generates a unique ID of the second terminal 4 (S618). A QR code (registered trademark) authentication enabling request and the unique ID of the second terminal 4 are transmitted to the first terminal 3 (S619) and further transmitted from the first terminal 3 to the web server 5 (S621). When receiving the QR code (registered trademark) authentication enabling request, the web server 5 stores in the third storage unit 240 of the web server 5 a QR code (registered trademark) authentication enabling flag and the unique ID of the second terminal 4 in association with the first user ID, the password, and the second user ID stored in the third storage unit 240 of the web server 5 and enables QR code (registered trademark) authentication (S623). The web server 5 may perform the generation of the unique ID of the second terminal 4.

<QR Code (Registered Trademark) Authentication>

When the user holds a noncontact IC card over the first terminal 3 (S625), the first terminal 3 reads a card ID stored in the IC card (S627). Then, a QR code (registered trademark) authentication start request, the read card ID, and a product ID are transmitted from the first terminal 3 to the web server 5 (S629) and further transmitted from the web server 5 to the application server 6 (S631). In this embodiment, the noncontact IC card is used. However, any other appropriate IC-chip mounted device such as a contact IC card read by an IC card reader, a mobile terminal mounted with a noncontact IC chip, and the like may be used.

When receiving the QR code (registered trademark) authentication start request from the web server 5, the application server 6 (the QR-code (registered trademark)-authentication-start-request accepting unit 210) checks whether the product ID received together with the QR code (registered trademark) authentication start request is stored in the second storage unit 239 of the application server 6 and checks whether the product ID is a product ID registered in advance (S632). When a check result is affirmative, the application server 6 (the first-token generation unit 211) generates a one-time first token (S633). The application server 6 (the registration-key generation unit 213) generates, as a registration key, a hash value of data including the generated first token, the received card ID, and the received product ID (S634), effectively stores the registration key in the database server 9 (the first storage unit 243) for a predetermined short time, for example, one minute (S635), and stores in the second storage unit 239 of the application server 6 the registration key in association with the first token (S636). The application server 6 (the QR-key generation unit 215) generates a one-time QR key (S637) and effectively stores in the database server 9 (the first storage unit 243) the QR key in association with the first token and the card ID for the predetermined short time, for example, one minute (S638). Subsequently, the application server 6 (the QR-code (registered trademark) generation unit 217) generates a QR code (registered trademark) including the generated QR key and stores the QR code (registered trademark) at a predetermined URL of the second storage unit 239 of the application server 6 (S639).

Subsequently, the same processing as the processing in steps S239 to S259 in the first embodiment is performed. That is, the application server 6 transmits the first token and a URL in which the QR code (registered trademark) is stored (a QR code (registered trademark) URL) to the web server 5 (S239). The web server 5 transmits the received first token and the received QR code (registered trademark) URL to the first terminal 3 (S241). The application server 6 and the web server 5 are equivalent to the URL transmitting unit 221. The first token may be generated by another server at another appropriate timing.

The first terminal 3 accesses the received QR code (registered trademark) URL, acquires the QR code (registered trademark), displays the QR code (registered trademark) on the screen of the first terminal 3 (S243), and transmits the received first token to the asynchronous communication server 7 (the asynchronous communication unit 223) by the asynchronous communication (S245).

The asynchronous communication server 7 (the asynchronous communication unit 223) subscribes to the first token received from the first terminal 3 as a topic from the database server 9 (the information transmitting and receiving unit 241) and transmits the ID of the first asynchronous communication between the asynchronous communication server 7 (the asynchronous communication unit 223) and the first terminal 3 to the database server 9 (the information transmitting and receiving unit 241). That is, the asynchronous communication server 7 (the asynchronous communication unit 223) registers the first token received from the first terminal 3 in the database server 9 as a key and transmits the ID of the first asynchronous communication between the asynchronous communication server 7 (the asynchronous communication unit 223) and the first terminal 3 to the database server 9 (the information transmitting and receiving unit 241) (S246). The database server 9 (the information transmitting and receiving unit 241) stores in the first storage unit 243 the first token and the ID of the first asynchronous communication received from the asynchronous communication server 7 (the asynchronous communication unit 223) in association with each other (S247).

The user causes the second terminal 4 to read the QR code (registered trademark) displayed on the first terminal 3. The second terminal 4 reads the QR code (registered trademark) and acquires the QR key included in the QR code (registered trademark) (S248). Subsequently, the second terminal 4 displays indication of "log on?" on the screen of the second terminal 4 (S249).

When the "Yes" button is pressed by the user (S251), the second terminal 4 transmits the login request, the acquired QR key, and the unique ID of the second terminal 4 read out or generated in step S618 to the web server 5 (the login-request accepting unit 225) (S253).

When receiving the login request transmitted from the second terminal 4, the web server 5 (the second-terminal-unique-ID matching unit 227) checks whether the unique ID of the second terminal 4 received together with the login request is stored in the third storage unit 240 of the web server 5 (S254).

When a check result in step S254 is "affirmative" and the received unique ID of the second terminal 4 is stored in the third storage unit 240 of the web server 5, the web server 5 transmits the received QR key and the unique ID of the second terminal 4 to the application server 6 (S255).

When receiving the login request transmitted from the web server 5, the application server 6 (the QR-key matching unit 229) checks whether the QR key received together with the login request is stored in the database server 9 (the first storage unit 243) (S257). When a check result is affirmative, the application server 6 (the QR-key matching unit 229) retrieves the first token stored in the database server 9 (the first storage unit 243) using the QR key received together with the login request as a key, retrieves the registration key stored in the application server 6 using the retrieved first token as a key, and checks whether the registration key acquired as a result of the retrieval is effectively stored in the database server 9 (the first storage unit 243) (S259).

When the check result in step S257 is affirmative and the registration key is effectively stored in the database server 9 (the first storage unit 243), the application server 6 (the second-token generation unit 231) generates a one-time second token (S645). The second token may be generated by another appropriate server. The application server 6 (the second-token generation unit 231) inquires the web server 5 about a second user ID stored in the third storage unit 240 corresponding to the unique ID of the second terminal 4 received in S255 (S647). The web server 5 returns the corresponding second user ID to the application server 6 (S649). The application server 6 (the second-token generation unit 231) effectively stores in the database server 9 (the first storage unit 243) the second token in association with the received second user ID for the predetermined short time, for example, one minute (S651).

Subsequently, the same processing as the processing in steps S263 to S269 in the first embodiment is performed. That is, the application server 6 (the second-token transmitting unit 233) publishes the generated second token to the database server 9 (the information transmitting and receiving unit 241) setting the first token retrieved by the application server 6 (the QR-key matching unit 229) as its topic. That is, the application server 6 (the second-token transmitting unit 233) transmits the generated second token to the database server 9 (the information transmitting and receiving unit 241) using the first token retrieved by the application server 6 (the QR-key matching unit 229) as a key (S263). For example, when the retrieval or the like of the registration key performed using the first token as a key in step S259 is omitted, the retrieval of the first token performed using the QR key as a key may be performed by the application server 6 (the second-token transmitting unit 233). The database server 9 (the information transmitting and receiving unit 241) publishes, according to the reception of the second token as whose topic the first token is set, the second token to the asynchronous communication server 7 (the asynchronous communication unit 223) that subscribes to the first token as the topic. At the same time, the database server 9 (the information transmitting and receiving unit 241) transmits the ID of the first asynchronous communication associated with the first token stored in the first storage unit 243 to the asynchronous communication server 7 (the asynchronous communication unit 223). That is, the database server 9 (the information transmitting and receiving unit 241) transmits the second token and the ID of the first asynchronous communication associated with the first token to the asynchronous communication server 7 (the asynchronous communication unit 223) that registers the first token as a key (S265). Note that a configuration in which the asynchronous communication server 7 (the asynchronous communication unit 223) registers the first token received from the first terminal 3 as a key in the database server 9 (the information transmitting and receiving unit 241), the application server 6 (the second-token transmitting unit 233) transmits the second token to the database server 9 (the information transmitting and receiving unit 241) using the first token retrieved by the application server 6 (the QR-key matching unit 229 or the second-token transmitting unit 233) as a key, and the database server 9 (the information transmitting and receiving unit 241) transmits the second token to the asynchronous communication server 7 (the asynchronous communication unit 223) that registers the first token as a key is not limited to the configuration in the embodiment and may be any other appropriate configuration.

The asynchronous communication server 7 (the asynchronous communication unit 223) transmits, as a first response code for ending the asynchronous communication, the received second token to the first terminal 3 by the asynchronous communication on the basis of the received ID of the asynchronous communication (S267).

The first terminal 3 transmits the second token received from the asynchronous communication server 7 to the web server 5 (S269).

The web server 5 receives the second token from the first terminal 3 and transmits the received second token to the application server 6 (S271). The web server 5 and the application server 6 are equivalent to the second-token accepting unit 235.

Subsequently, the same processing as the processing in steps S427 to S435 in the second embodiment is performed. That is, when receiving the second token from the web server 5, the application server 6 (the second-token confirming unit 237) retrieves the second user ID stored in the database server 9 (the first storage unit 243) using the second token as a key (S427). It is possible to check, according to whether the second user ID is acquired as a result of the retrieval, whether the second token received from the web server 5 is effectively stored in the database server 9 (the first storage unit 243). That is, when the second user ID is acquired as a result of the retrieval, this means that the second token received from the web server 5 is effectively stored in the database server 9 (the first storage unit 243). When the second user ID is not acquired as a result of the retrieval, this means that the second token received from the web server 5 is not effectively stored in the database server 9 (the first storage unit 243). As explained above, the second token stored in the database server 9 (the first storage unit 243) is the second token effectively stored for the predetermined short time. Therefore, the second user ID is not acquired as a result of the retrieval after one minute elapses from the storage in the database server 9 (the first storage unit 243).

The application server 6 performs processing corresponding to a retrieval result. That is, when the second user ID is acquired as a result of the retrieval, the application server 6 transmits the second user ID to the web server 5 (S431). The web server 5 transmits the received second user ID to the first terminal 3 (S433). When receiving the second user ID, the first terminal 3 starts an application (S435').

On the other hand, when the second user ID is not acquired as a result of the retrieval, the application server 6 transmits information for displaying a screen indicating that the authentication is unsuccessful to the web server 5. The web server 5, which receives the information, transmits the information to the first terminal 3. The application server 6 and the web server 5 are equivalent to the post-authentication processing unit 238.

In the embodiment, a card ID may be used as the second user ID. In that case, a configuration for acquiring a card ID stored in the second storage unit 239 of the application server 6 in association with the first token may be adopted instead of steps S647 to S649 for inquiring the second user ID corresponding to the received unique ID of the second terminal.

According to this embodiment, it is possible to perform login using an IC-chip mounted device such as an IC card.

Fourth Embodiment

In a fourth embodiment, while a login state to an application executed in a first terminal is maintained, authentication processing in executing processing of another application in a terminal other than the first terminal is performed.

Figure 11:
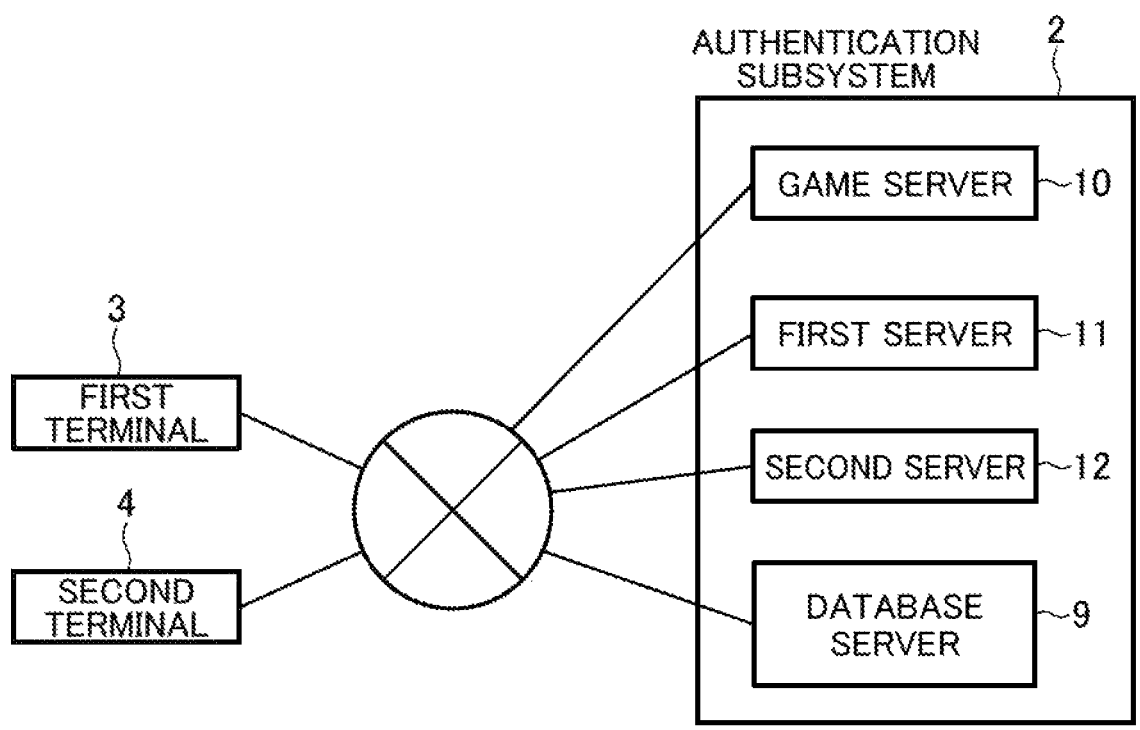
FIG. 11 is a configuration diagram of an authentication system according to a fourth embodiment of the present invention.
Figure 12:
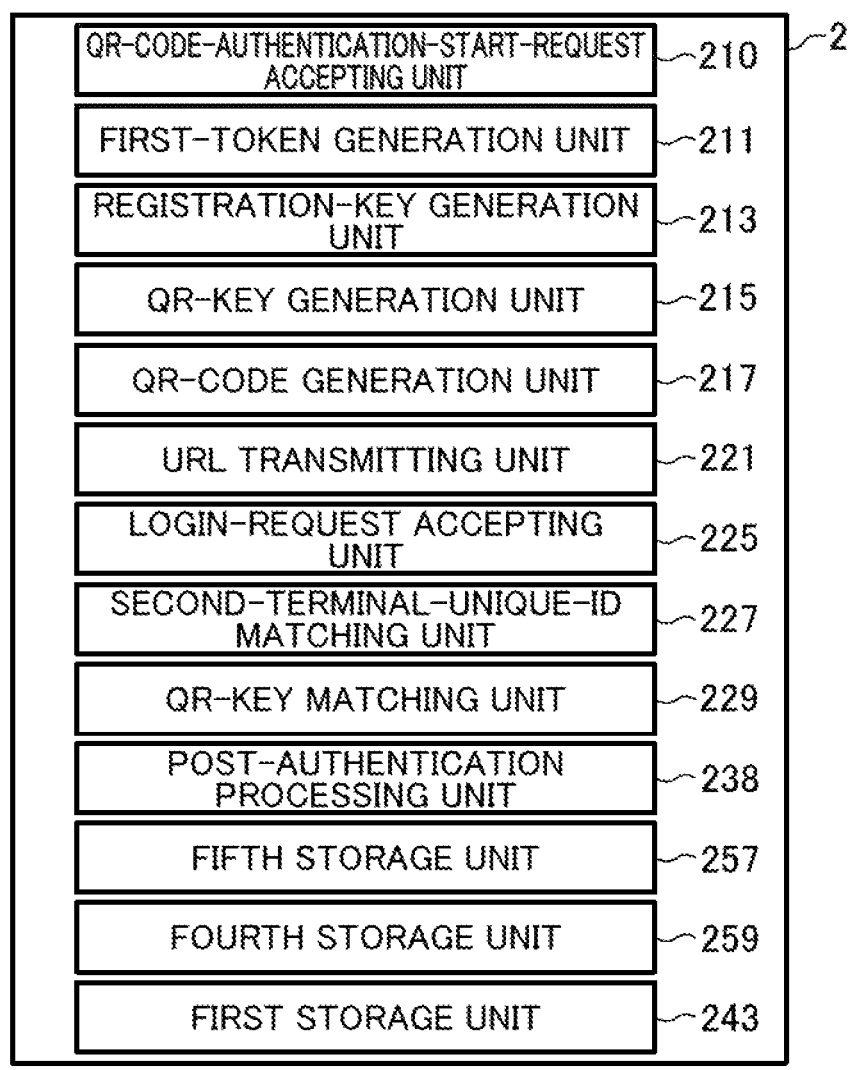
FIG. 12 is a diagram showing a functional configuration of an authentication subsystem according to the fourth embodiment of the present invention.
Figure 13A:
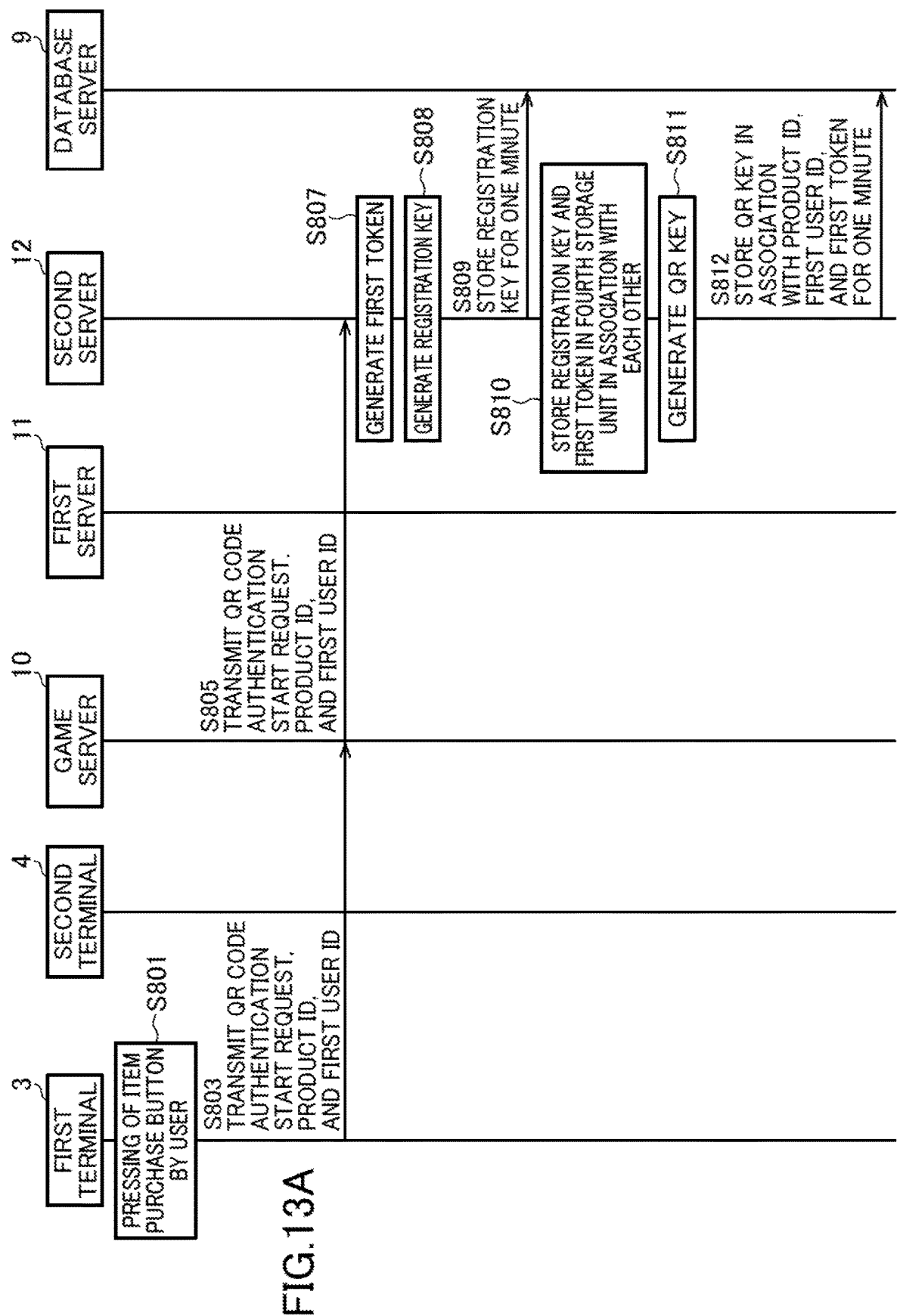
FIG. 13A is a part of a sequence chart of an example of QR code (registered trademark) authentication processing.

FIG. 11 is a diagram showing an overall configuration of an authentication system according to the fourth embodiment of the present invention. FIG. 12 is a diagram showing a functional configuration of an authentication subsystem according to the fourth embodiment of the present invention. FIGS. 13A to 13D are parts of a sequence chart of an example of QR code (registered trademark) authentication processing according to the fourth embodiment of the present invention. An example of the authentication system and authentication processing of the authentication system according to the fourth embodiment of the present invention is explained with reference to FIGS. 11 to 13D and the like. In FIGS. 11 to 13D, portions corresponding to the portions shown in FIGS. 1 to 10E are denoted by the same reference numerals and signs. Redundant explanation of the explanation of the first to third embodiments is omitted. A hardware configuration of the authentication system according to the fourth embodiment is the same as the hardware configuration in the first to third embodiments. Therefore, explanation of the hardware configuration is omitted.

The authentication system 1 includes the first terminal 3, the second terminal 4, a game server 10, a first server 11, a second server 12, and the database server 9, which are respectively connected via the network 20. The game server 10, the first server 11, the second server 12, and the database server 9 configure the authentication subsystem 2. Each of the authentication subsystem 2, the game server 10, the first server 11, the second server 12, and the database server 9 does not need to be configured as one physical device and may be configured with a plurality of physical devices.

The authentication subsystem 2 includes the QR-code (registered trademark)-authentication-start-request accepting unit 210, the first-token generation unit 211, the registration-key generation unit 213, the QR-key generation unit 215, the QR-code (registered trademark) generation unit 217, the URL transmitting unit 221, the login-request accepting unit 225, the second-terminal-unique-ID matching unit 227, the QR-key matching unit 229, the post-authentication processing unit 238, a fourth storage unit 259, a fifth storage unit 257, and the first storage unit 243.

The fourth storage unit 259 stores various kinds of information such as a QR key, a registration key, a product ID, a first user ID, and a first token and stores the various kinds of information in association with one another according to necessity. The fourth storage unit 259 may be configured as one physical device or may be distributedly disposed in a plurality of physical devices.

The fifth storage unit 257 stores various kinds of information such as a first user ID and a unique ID of the second terminal and stores the various kinds of information in association with one another according to necessity. The fifth storage unit 257 may be configured as one physical device or may be distributedly disposed in a plurality of physical devices.

The other functional components are the same as the functional components in the first to fourth embodiments. Therefore, explanation of the functional components is omitted.

An example of authentication processing of the authentication system according to the fourth embodiment of the present invention is explained below based on the system configuration explained above.

Enabling processing for QR code (registered trademark) authentication (steps S201 to S215) is the same as the enabling processing in the first embodiment. Therefore, explanation of the enabling processing is omitted.

The user presses a button for purchasing an item in a game being played in the first terminal 3 (S801). Then, the first terminal 3 transmits a QR code (registered trademark) authentication start request and a product ID and a first user ID input to the first terminal 3 during a game start to the game server 10 (S803).

The game server 10 transmits the received QR code (registered trademark) authentication start request and the received product ID and the received first user ID to the second server 12 (S805).

When receiving the QR code (registered trademark) authentication start request from the game server 10, the second server 12 (the first-token generation unit 211) generates a one-time first token (S807). The second server 12 (the registration-key generation unit 213) generates, as a registration key, a hash value of data including the generated first token, the product ID, and the first user ID (S808), effectively stores the registration key in the database server 9 (the first storage unit 243) for a predetermined short time, for example, one minute (S809), and stores in the fourth storage unit 259 of the second server 12 the registration key in association with the first token (S810). The second server 12 (the QR-key generation unit 215) generates a one-time QR key (S811) and stores in the database server 9 (the first storage unit 243) and the fourth storage unit 259 of the second server 12, the QR key in association with the product ID, the first user ID, and the first token for the predetermined short time, for example, one minute (S812). Subsequently, the second server 12 (the QR-code (registered trademark) generation unit 217) generates a QR code (registered trademark) including the generated QR key and stores the QR code (registered trademark) at a predetermined URL of the fourth storage unit 259 of the second server 12 (S813).

Subsequently, the second server 12 transmits the URL at which the QR code (registered trademark) is stored (a QR code (registered trademark) URL) to the game server 10 (S817). The game server 10 transmits the received QR code (registered trademark) URL to the first terminal 3 (S819). The second server 12 and the game server 10 are equivalent to the URL transmitting unit 221.

The first terminal 3 accesses the received QR code (registered trademark) URL, acquires the QR code (registered trademark), and displays the QR code (registered trademark) on the screen of the first terminal 3 (S821).

The user causes the second terminal 4 to read the QR code (registered trademark) displayed on the first terminal 3. The second terminal 4 reads the QR code (registered trademark) and acquires the QR key included in the QR code (registered trademark) (3822). Subsequently, the second terminal 4 displays, on the screen of the second terminal 4, indication of "log in?" (step S823).

When a "Yes" button is pressed by the user (S825), the second terminal 4 transmits the login request, the QR key included in the acquired QR code (registered trademark), and the unique ID of the second terminal 4 read out or generated in step 3213 to the first server 11 (the login-request accepting unit 225) at the URL included in the QR code (registered trademark) (S827).

When receiving the login request transmitted from the second terminal 4, the first server 11 (the second-terminal-unique-ID matching unit 227) checks whether the unique ID of the second terminal 4 received together with the login request is stored in the fifth storage unit 257 of the first server 11 (3828).

When a check result in step S828 is "affirmative" and the received unique ID of the second terminal 4 is stored in the fifth storage unit 257 of the first server 11, the first server 11 (the QR-key matching unit 229) checks whether the received QR key is stored in the database server 9 (the first storage unit 243) (S831). When a check result is affirmative, the first server 11 (the QR-key matching unit 229) retrieves the registration key stored in the fourth storage unit 259 of the second server 12 using the received QR key as a key and checks whether the registration key acquired as a result of the retrieval is effectively stored in the database server 9 (the first storage unit 243) (S833).

When the check result in S831 is affirmative and the registration key is effectively stored in the database server 9 (the first storage unit 243), the first server 11 (the post-authentication processing unit 238) transmits an item purchase page to the second terminal 4 (S835).

According to this embodiment, while maintaining a login state to an application executed in the first terminal, it is possible to perform authentication processing in executing processing of another application in a terminal other than the first terminal.

<Modification of Enabling Processing for QR Code (Registered Trademark) Authentication>

Figure 14A:
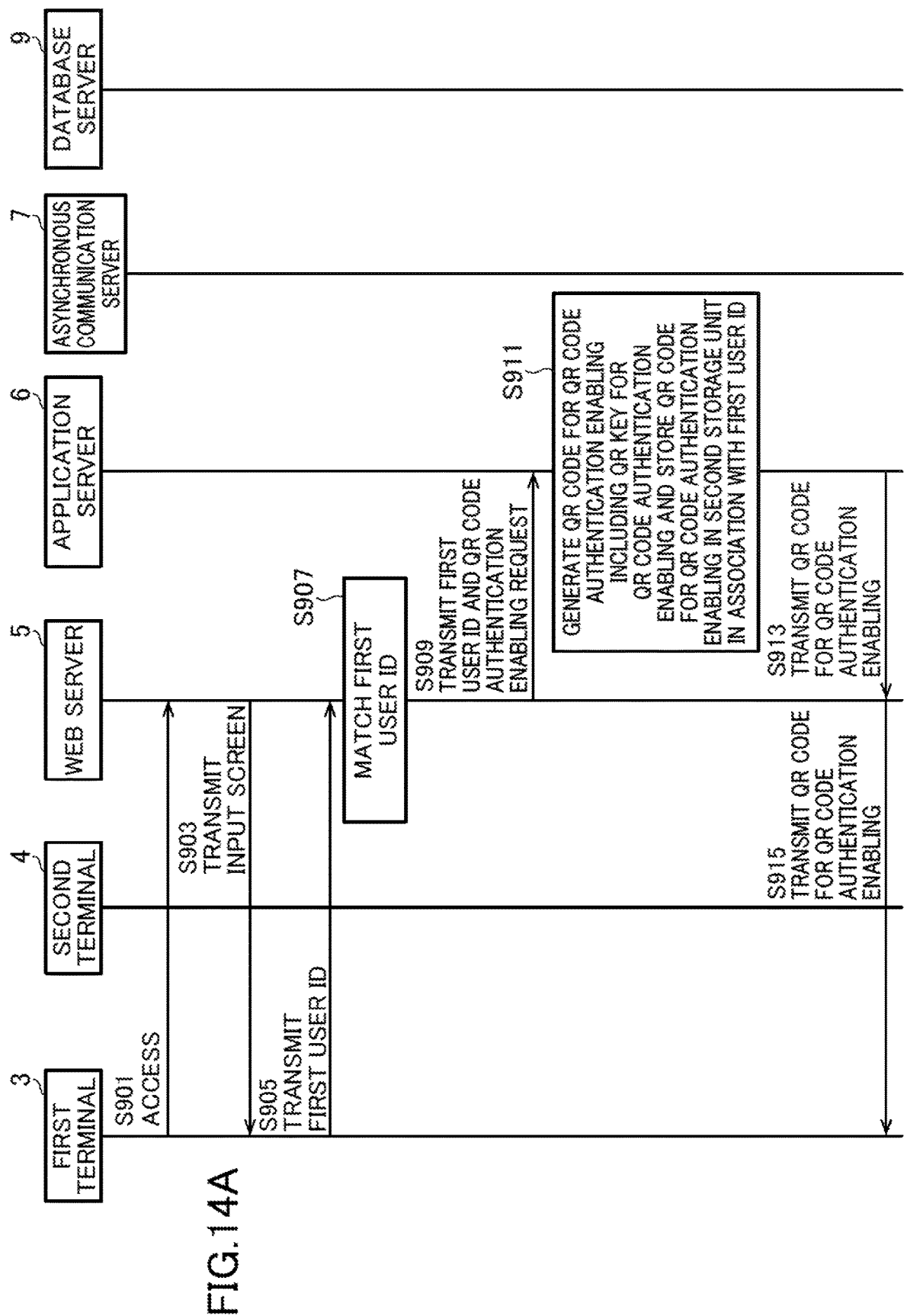
FIG. 14A is a sequence chart of a modification of QR code (registered trademark) authentication enabling processing of the present invention.
Figure 14B:
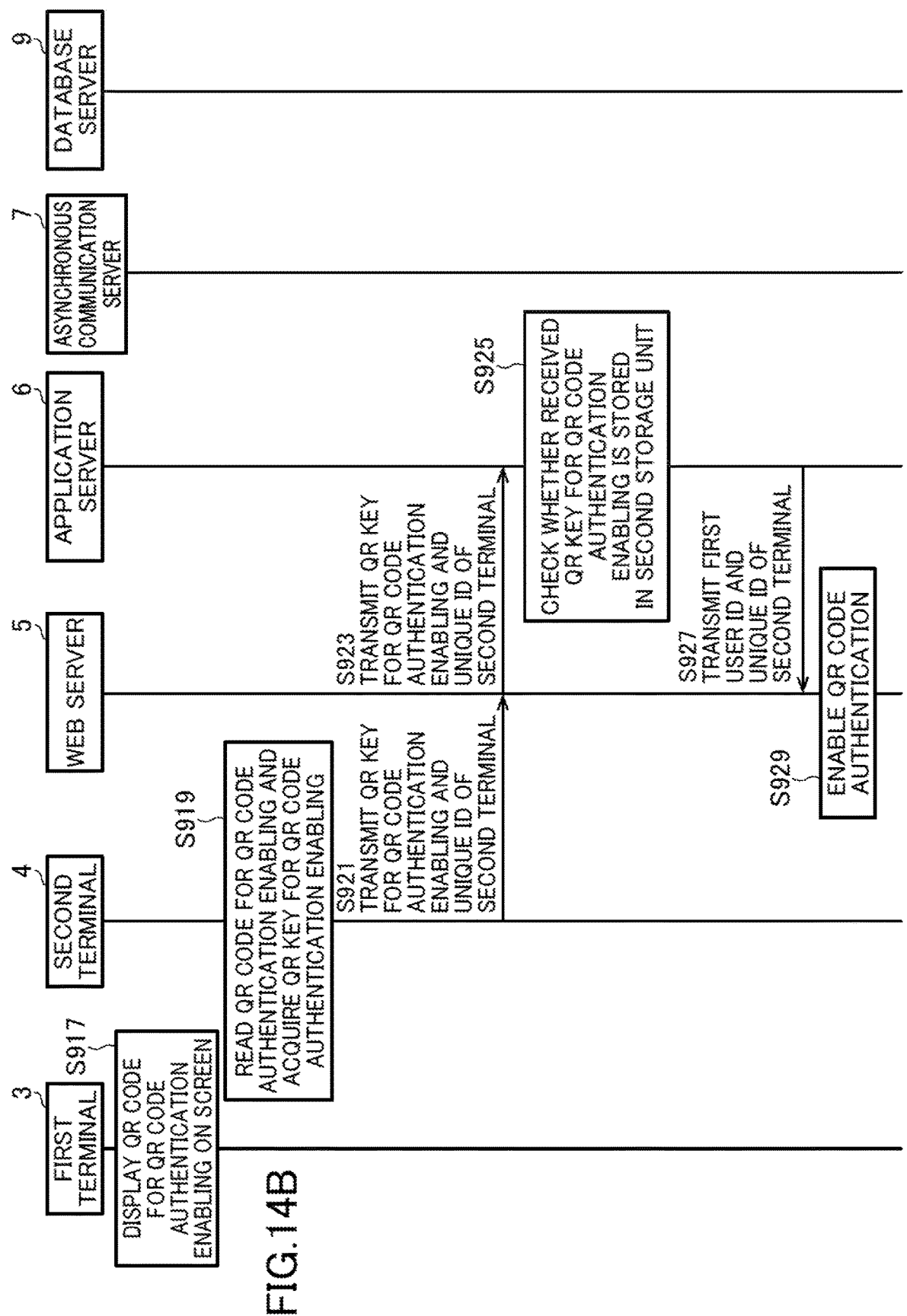
FIG. 14B is a sequence chart of the modification of the QR code (registered trademark) authentication enabling processing of the present invention.

In the QR code (registered trademark) authentication enabling processing, the input of the first user ID and the password is necessary. However, this modification makes it unnecessary to input a password. In the following explanation, a modification of the QR code (registered trademark) authentication enabling processing in the first embodiment is explained as an example. FIGS. 14A and 14B are sequence charts of the modification of the QR code (registered trademark) authentication enabling processing of the present invention.

In the third storage unit 240 of the web server 5, the first user ID, the password, and the second user ID are stored in association with one another.

The user accesses the web server 5 from the first terminal 3 (S901). Then, an input screen for the first user ID, which is identification information, is transmitted from the web server 5 to the first terminal 3 (S903). When the user inputs the first user ID, the first user ID is transmitted to the web server 5 (S905). When matching of the first user ID (S907) is successful, the web server 5 transmits a QR code (registered trademark) authentication enabling request and the first user ID to the application server 6 (S907).

When receiving the QR code (registered trademark) authentication enabling request and the first user ID, the application server 6 generates a QR code (registered trademark) for QR code (registered trademark) authentication enabling including a one-time QR key for QR code (registered trademark) authentication enabling and stores the QR code (registered trademark) for QR code (registered trademark) authentication enabling in the second storage unit 239 of the application server 6 in association with the received first user ID (S911). The application server 6 transmits the generated QR code (registered trademark) for QR code (registered trademark) authentication enabling to the web server 5 (S913). The web server 5 transmits the received QR code (registered trademark) for QR code (registered trademark) authentication enabling to the first terminal 3 (S915). The first terminal 3 displays the received QR code (registered trademark) for QR code (registered trademark) authentication enabling on the screen of the first terminal 3 (S917).

The user causes the second terminal 4 to read the received QR code (registered trademark) for QR code (registered trademark) authentication enabling displayed on the first terminal 3. The second terminal 4 reads the QR code (registered trademark) for QR code (registered trademark) authentication enabling and acquires the QR key for QR code (registered trademark) authentication enabling included in the received QR code (registered trademark) for QR code (registered trademark) authentication enabling (S919). The second terminal 4 reads out or generates the unique ID of the second terminal 4 and transmits the acquired QR key for QR code (registered trademark) authentication enabling and the unique ID of the second terminal 4 to the web server 5 (S921). The web server 5 transmits the received QR key for QR code (registered trademark) authentication enabling and the received unique ID of the second terminal 4 to the application server 6. The web server 5 may perform generation of the unique ID of the second terminal 4.

When receiving the QR key for QR code (registered trademark) authentication enabling transmitted from the web server 5, the application server 6 checks whether the received QR key for QR code (registered trademark) authentication enabling is stored in the second storage unit 239 of the application server 6 (S925). When a check result is affirmative, the application server 6 retrieves the first user ID stored in the second storage unit 239 of the application server 6 using, as a key, the unique ID of the second terminal 4 received together with the QR key for QR code (registered trademark) authentication enabling and transmits the first user ID acquired as a result of the retrieval and the unique ID of the second terminal 4 to the web server 5 (S927).

When receiving the first user ID and the unique ID of the second terminal 4 from the application server 6, the web server 5 stores in the third storage unit 240 of the web server 5 a QR code (registered trademark) authentication enabling flag and the received unique ID of the second terminal 4 in association with the first user ID, the password, and the second user ID stored in the third storage unit 240 of the web server 5 and enables QR code (registered trademark) authentication (S929).

According to this modification, the input of the password is unnecessary in the QR code (registered trademark) authentication enabling processing. Therefore, it is possible to further reduce a burden of input of the user.

The present invention is explained above concerning the several embodiments for illustration. However, the present invention is not limited to the embodiments. It would be apparent for those skilled in the art that various modifications and corrections can be made concerning the forms and the details of the present invention without departing from the scope and the spirit of the present invention.

EXPLANATIONS OF LETTERS OR NUMERALS 1 authentication system
3 first terminal
4 second terminal
5 web server
6 application server
7 asynchronous communication server
9 database server
210 QR-code (registered trademark)-authentication-start-request accepting unit
211 first-token generation unit
213 registration-key generation unit
215 QR-key generation unit
217 QR-code (registered trademark) generation unit
221 URL transmitting unit
223 asynchronous communication unit
225 login-request accepting unit
227 second-terminal-unique-ID matching unit
229 QR-key matching unit
231 second-token generation unit
233 second-token transmitting unit
235 second-token accepting unit
237 second-token confirming unit
238 post-authentication processing unit
239 second storage unit
240 third storage unit
241 information transmitting and receiving unit
243 first storage unit
245 logout-trigger-information accepting unit
247 logout-token generation unit
249 logout-token transmitting unit
251 logout-trigger-preparation-information accepting unit
253 logout-token acquisition unit
255 second-response-code transmitting unit
257 fifth storage unit
259 fourth storage unit

The invention claimed is:

1. An authentication system comprising:
an authentication subsystem, the authentication subsystem comprising at least one first processor, at least one second processor and at least one storage;
a first terminal, the first terminal transmitting a code image authentication start request and authentication start trigger information to the at least one first processor in response to a trigger of an authentication start to the first terminal; and
a second terminal, wherein
the at least one first processor:
generates a first token based on reception of the code image authentication start request;
generates a code image key and stores in the at least one storage the code image key in association with the first token;
generates a code image including the code image key and stores the code image at a predetermined URL of the at least one storage; and
transmits the first token and the URL at which the code image is stored to the first terminal;
the first terminal accesses the URL received from the at least one first processor and acquires the code image, displays the code image on a screen of the first terminal, and transmits the received first token to the at least one first processor by asynchronous communication,
the at least one first processor registers the first token received from the first terminal as a key in the at least one second processor,
the second terminal reads the code image displayed on the screen of the first terminal, acquires the code image key, and transmits a login request, a unique ID of the second terminal, and the code image key to the at least one first processor,
the at least one first processor i) checks whether the received unique ID of the second terminal is a unique ID of the second terminal registered in advance, and ii) when the received unique ID of the second terminal is the unique ID of the second terminal registered in advance, checks whether the received code image key is stored in the at least one storage, and
when the received code image key is stored in the at least one storage,
the at least one first processor retrieves the first token stored in the at least one storage using the received code image key as a key, and transmits a first response code to the at least one second processor using the first token as a key,
the at least one second processor transmits the first response code to the at least one first processor that registers the first token as the key in the at least one second processor, and
the at least one first processor transmits the received first response code to the first terminal by the asynchronous communication.

2. The authentication system according to claim 1, wherein the at least one first processor generates a registration key and stores in the at least one storage the registration key in association with the first token.

3. The authentication system according to claim 1, wherein the first response code is a second token,
when the received code image key is stored in the at least one storage, the at least one first processor generates the second token and stores the second token in the at least one storage,
the first terminal transmits the second token received from the at least one first processor to the at least one first processor, and
the at least one first processor checks whether the received second token is stored in the at least one storage.

4. The authentication system according to claim 1, wherein logout trigger preparation information and logout trigger information are stored in the at least one storage in association with each other, and
wherein
the at least one first processor transmits a logout preparation request and the logout trigger information to the first terminal when the at least one first processor transmits the received first response code to the first terminal by the asynchronous communication;
when receiving the logout preparation request, the first terminal transmits the received logout trigger information together with the logout preparation request to the at least one first processor;
the at least one first processor generates a logout token based on reception of the logout preparation request and stores in the at least one storage the logout token in association with the logout trigger information;
the at least one first processor transmits the logout token to the first terminal;
the first terminal transmits the received logout token to the at least one first processor by the asynchronous communication;
the at least one first processor registers the received logout token in the at least one second processor as a key;
the second terminal transmits a logout request and the logout trigger preparation information to the at least one first processor;
the at least one first processor (i) acquires the logout trigger information stored in association with the received logout trigger preparation information from the at least one storage; (ii) retrieves the logout token stored in the at least one storage using the received logout trigger information as a key and acquires the logout token; and (iii) transmits a second response code to the at least one second processor using the acquired logout token as a key,
the at least one second processor transmits, in response to reception of the second response code received using the logout token as the key, the second response code to the at least one first processor that registers the logout token as the key, and
the at least one first processor transmits the received second response code to the first terminal by the asynchronous communication.

5. The authentication system according to claim 1, wherein
the at least one first processor generates the code image key and stores in the at least one storage the code image key in association with the first token only for a predetermined time.

6. The authentication system according to claim 1, wherein at least one of i) the first token, ii) the code image key, or iii) a combination thereof is a one-time token and/or key.

7. The authentication system according to claim 3, wherein
the at least one first processor acquires user identification information stored in the at least one storage in association with the unique ID of the second terminal or the user identification information stored in the at least one storage in association with the first token, generates the second token, and stores the second token in the at least one storage and the user identification information in association with each other,
the at least one first processor retrieves the user identification information stored in the at least one storage using the received second token as a key, and
when the user identification information is acquired as a result of the retrieval, the at least one first processor transmits the retrieved user identification information to the first terminal.

8. The authentication system according to claim 7, wherein
the first terminal is a game terminal,
the trigger of the authentication start to the first terminal is pressing of a game start button by a user at the first terminal, and
the first terminal starts a game when receiving the user identification information.

9. The authentication system according to claim 7, wherein the trigger of the authentication start to the first terminal is a communication start of an IC chip of an IC-chip mounted device of a user and the first terminal.

10. An authentication subsystem comprising:
at least one first processor;
at least one second processor; and
at least one storage; wherein
the at least one first processor is configured to:
receive a code image authentication start request and authentication start trigger information from a first terminal;
generate a first token based on reception of the code image authentication start request;
generate a code image key and stores in the at least one storage the code image key in association with the first token;
generate a code image including the code image key and stores the code image at a predetermined URL of the at least one storage;
transmit the first token and the URL at which the code image is stored to the first terminal;
register the first token received from the first terminal, which receives the first token from the at least one first processor, as a key in the at least one second processor;
receive a login request, a unique ID of a second terminal, and the code image key from the second terminal, which reads the code image displayed on a screen of the first terminal and acquires the code image key, the first terminal accessing the received URL and acquiring the code image;
check whether the received unique ID of the second terminal is a unique ID of the second terminal registered in advance;
when the received unique ID of the second terminal is the unique ID of the second terminal registered in advance, check whether the received code image key is stored in the at least one storage; and when the received code image key is stored in the at least one storage, retrieve the first token stored in the at least one storage using the received code image key as a key, and transmit a first response code to the at least one second processor using, as a key, the first token retrieved from the at least one storage using the received code image key as a key;

the at least one second processor is configured to transmit the first response code to the at least one first processor that registers the first token as the key in the at least one second processor, and the at least one first processor is configured to transmit the first response code received from the at least one second processor to the first terminal by asynchronous communication.

11. The authentication subsystem according to claim 10, wherein the at least one first processor is configured to generate a registration key and stores in the at least one storage the registration key in association with the first token.

12. The authentication subsystem according to claim 10, wherein the first response code is a second token, and when the received code image key is stored in the at least one storage, the at least one first processor is configured to:

generate the second token and store the second token in the at least one storage;

receive the second token from the first terminal, which received the second token from the at least one first processor; and check whether the received second token is stored in the at least one storage.

13. An authentication method comprising:

a step of, by a first terminal, transmitting, in response to a trigger of an authentication start to the first terminal, a code image authentication start request and authentication start trigger information to at least one first processor;

a step of, by the at least one first processor, generating a first token based on reception of the code image authentication start request;

a step of, by the at least one first processor, generating a code image key and storing in at least one storage the code image key in association with the first token;

a step of, by the at least one first processor, generating a code image including the code image key and storing the code image at a predetermined URL of the at least one storage;

a step of, by the at least one first processor, transmitting the first token and the URL at which the code image is stored to the first terminal;

a step of, by the first terminal, accessing the received URL, acquiring a code image, displaying the code image on a screen of the first terminal, and transmitting the received first token to the at least one first processor by asynchronous communication;

a step of, by the at least one first processor, registering the received first token as a key in at least one second processor;

a step of, by a second terminal, reading the code image displayed on the screen of the first terminal and acquiring the code image key;

a step of, by the second terminal, transmitting a login request, a unique ID of the second terminal, and the code image key to the at least one first processor;

a step of, by the at least one first processor, checking whether the received unique ID of the second terminal is a unique ID of the second terminal registered in advance;

a step of, when the received unique ID of the second terminal is the unique ID of the second terminal registered in advance, checking, by the at least one first processor, whether the received code image key is stored in the at least one storage;

a step of, when the received code image key is stored in the at least one storage, by the at least one first processor, retrieving the first token stored in the at least one storage using the received code image key as a key and transmitting a first response code to the at least one second processor using the retrieved first token as a key;

a step of, by the at least one second processor, transmitting the first response code to the at least one first processor that registers the first token as the key in the at least one second processor; and a step of, by the at least one first processor, transmitting the received first response code to the first terminal by the asynchronous communication.

14. The authentication method according to claim 13, further comprising a step of, by the at least one first processor, generating a registration key and storing in the at least one storage the registration key in association with the first token.

15. The authentication method according to claim 13, further comprising:

when the first response code is a second token and the received code image key is stored in the at least one storage, a step of, by the at least one first processor, generating the second token and storing the second token in the at least one storage;

a step of, by the first terminal, transmitting the second token received from the at least one first processor to the at least one first processor; and a step of, by the at least one first processor, checking whether the received second token is stored in the at least one storage.

16. The authentication method according to claim 13, further comprising:

a step of, by the at least one first processor, transmitting a logout preparation request and the logout trigger information to the first terminal when the at least one first processor transmits the received first response code to the first terminal by the asynchronous communication;

a step of, when receiving the logout preparation request, transmitting, by the first terminal, the logout trigger information received together with the logout preparation request to the at least one first processor;

a step of, by the at least one first processor, generating a logout token based on reception of the logout preparation request and storing in the at least one storage the logout token in association with the logout trigger information;

a step of, by the at least one first processor, transmitting the logout token to the first terminal;

a step of, by the first terminal, transmitting the received logout token to the at least one first processor by the asynchronous communication;

a step of, by the at least one first processor, registering the received logout token as a key in the at least one second processor;

a step of, by the second terminal, transmitting a logout request and logout trigger preparation information to the at least one first processor;

a step of, by the at least one first processor, (i) acquiring the logout trigger information stored in association with the received logout trigger preparation information from the at least one storage in which the logout trigger preparation information and the logout trigger information are stored in association with each other, (ii) retrieving the logout token stored in the at least one storage using the acquired logout trigger information as a key and (iii) acquiring the logout token;

a step of, by the at least one first processor, transmitting a second response code to the at least one second processor using the acquired logout token as a key;

a step of, by the at least one second processor, transmitting, in response to reception of the second response code using the logout token as the key, the second response code to the at least one first processor that registers the logout token as the key; and a step of, by the at least one first processor, transmitting the received second response code to the first terminal by the asynchronous communication.

17. The authentication method according to claim 13, wherein
in the step of generating the code image and storing in the at least one storage the code image key in association with the first toke, the at least one first processor stores the code image key in association with the first token in the at least one storage only for a predetermined time.

18. The authentication method according to claim 13, wherein at least one of i) the first token, ii) the code image key, or iii) a combination thereof is a one-time token and/or key.

19. The authentication method according to claim 15, wherein
the step of, by the at least one first processor, generating the second token and storing the second token in the at least one storage is a step of, by the at least one first processor, acquiring user identification information stored in the at least one storage in association with the unique ID of the second terminal or user identification information stored in the at least one storage in association with the first token, generating the second token, and storing in the at least one storage the second token and the user identification information in association with each other,
the step of, by the at least one first processor, checking whether the received second token is stored in the at least one storage includes retrieving the user identification information stored in the at least one storage using the received second token as a key, and
the authentication method further comprises a step of, when the user identification information is acquired as a result of the retrieval, transmitting, by the at least one first processor, the retrieved user identification information to the first terminal.

20. The authentication method according to claim 19, wherein
the first terminal is a game terminal,
the trigger of the authentication start to the first terminal is pressing of a game start button by a user in the first terminal, and
the first terminal starts a game when receiving the user identification information.

21. The authentication method according to claim 19, wherein the trigger of the authentication start to the first terminal is a communication start of an IC chip of an IC-chip mounted device of a user and the first terminal.

22. An authentication method comprising:
a step of, by at least one first processor, receiving a code image authentication start request and authentication start trigger information from a first terminal;

a step of, by the at least one first processor, generating a first token based on reception of the code image authentication start request;

a step of, by the at least one first processor, generating a code image key and storing in at least one storage the code image key in association with the first token;

a step of, by the at least one first processor, generating a code image including the code image key and storing the code image at a predetermined URL of the at least one storage;

a step of, by the at least one first processor, transmitting the first token and the URL at which the code image is stored to the first terminal;

a step of, by the at least one first processor, registering the first token received from the first terminal, which receives the first token from the at least one first processor, as a key in at least one second processor;

a step of, by the at least one first processor, receiving a login request, a unique ID of a second terminal, and the code image key from the second terminal that reads the code image displayed on a screen of the first terminal and acquires the code image key, the first terminal accessing the received URL and acquiring the code image;

a step of, by the at least one first processor, checking whether the received unique ID of the second terminal is a unique ID of the second terminal registered in advance;

a step of, when the received unique ID of the second terminal is the unique ID of the second terminal registered in advance, checking, by the at least one first processor, whether the received code image key is stored in the at least one storage;

a step of, when the received code image key is stored in the at least one storage, retrieving, by the at least one first processor, the first token stored in the at least one storage using the received code image key as a key and transmitting a first response code to the at least one second processor using the retrieved first token as a key;

a step of, by the at least one second processor, transmitting the first response code to the at least one first processor that registers the first token as the key in the at least one second processor; and a step of, by the at least one first processor, transmitting the received first response code to the first terminal by asynchronous communication.

23. The authentication method according to claim 22, further comprising a step of, by the at least one first processor, generating a registration key and storing in the at least one storage the registration key in association with the first token.

24. The authentication method according to claim 22, further comprising:
a step of, when the first response code is a second token and the received code image key is stored in the at least one storage, generating, by the at least one first processor, the second token and storing the second token in the at least one storage;

a step of, by the at least one first processor, receiving, from the first terminal, the second token received by the asynchronous communication; and a step of, by the at least one first processor, checking whether the received second token is stored in the at least one storage.

25. The authentication system according to claim 3, wherein logout trigger preparation information and logout trigger information are stored in the at least one storage in association with each other, and wherein the at least one first processor transmits a logout preparation request and the logout trigger information to the first terminal when a result of the check by the at least one first processor is affirmative;

when receiving the logout preparation request, the first terminal transmits the received logout trigger information together with the logout preparation request to the at least one first processor;

the at least one first processor generates a logout token based on reception of the logout preparation request and stores in the at least one storage the logout token in association with the logout trigger information;

the at least one first processor transmits the logout token to the first terminal;

the first terminal transmits the received logout token to the at least one first processor by the asynchronous communication;

the at least one first processor registers the received logout token in the at least one second processor as a key;

the second terminal transmits a logout request and the logout trigger preparation information to the at least one first processor;

the at least one first processor (i) acquires the logout trigger information stored in association with the received logout trigger preparation information from the at least one storage; (ii) retrieves the logout token stored in the at least one storage using the received logout trigger information as a key and acquires the logout token; and (iii) transmits a second response code to the at least one second processor using the acquired logout token as a key, the at least one second processor transmits, in response to reception of the second response code received using the logout token as the key, the second response code to the at least one first processor that registers the logout token as the key, and the at least one first processor transmits the received second response code to the first terminal by the asynchronous communication.

26. The authentication method according to claim 15, further comprising:

a step of, by the at least one first processor, transmitting a logout preparation request and the logout trigger information to the first terminal when a result of the check by the at least one first processor is affirmative;

a step of, when receiving the logout preparation request, transmitting, by the first terminal, the logout trigger information received together with the logout preparation request to the at least one first processor;

a step of, by the at least one first processor, generating a logout token based on reception of the logout preparation request and storing in the at least one storage the logout token in association with the logout trigger information;

a step of, by the at least one first processor, transmitting the logout token to the first terminal;

a step of, by the first terminal, transmitting the received logout token to the at least one first processor by the asynchronous communication;

a step of, by the at least one first processor, registering the received logout token as a key in the at least one second processor;

a step of, by the second terminal, transmitting a logout request and logout trigger preparation information to the at least one first processor;

a step of, by the at least one first processor, (i) acquiring the logout trigger information stored in association with the received logout trigger preparation information from the at least one storage in which the logout trigger preparation information and the logout trigger information are stored in association with each other (ii) retrieving the logout token stored in the at least one storage using the acquired logout trigger information as a key and (iii) acquiring the logout token;

a step of, by the at least one first processor, transmitting a second response code to the at least one second processor using the acquired logout token as a key;

a step of, by the at least one second processor, transmitting, in response to reception of the second response code using the logout token as the key, the second response code to the at least one first processor that registers the logout token as the key; and a step of, by the at least one first processor, transmitting the received second response code to the first terminal by the asynchronous communication.

* * * * *